United States Patent
Kim et al.

(10) Patent No.: US 12,200,152 B2
(45) Date of Patent: Jan. 14, 2025

(54) ELECTRONIC DEVICE HAVING ANTENNAS

(71) Applicant: LG ELECTRONICS INC., Seoul (KR)

(72) Inventors: Dongjin Kim, Seoul (KR); Youngbae Kwon, Seoul (KR); Sungwon Kim, Seoul (KR); Byungwoon Jung, Seoul (KR); Jihun Ha, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/556,637

(22) PCT Filed: Apr. 21, 2021

(86) PCT No.: PCT/KR2021/004997
§ 371 (c)(1),
(2) Date: Oct. 20, 2023

(87) PCT Pub. No.: WO2022/225079
PCT Pub. Date: Oct. 27, 2022

(65) Prior Publication Data
US 2024/0267444 A1 Aug. 8, 2024

(51) Int. Cl.
*H04M 1/02* (2006.01)
*H01Q 1/24* (2006.01)
(Continued)

(52) U.S. Cl.
CPC .......... *H04M 1/0235* (2013.01); *H01Q 1/243* (2013.01); *H01Q 21/28* (2013.01); *H04B 1/401* (2013.01); *H04M 1/0249* (2013.01)

(58) Field of Classification Search
CPC .. H04M 1/0235; H04M 1/0249; H01Q 1/243; H01Q 21/28; H04B 1/401
See application file for complete search history.

(56) References Cited

U.S. PATENT DOCUMENTS

2011/0250935 A1* 10/2011 Kakitsu ............... H04M 1/0237
455/575.4
2012/0001822 A1* 1/2012 Liu ....................... H01Q 1/243
343/852
(Continued)

FOREIGN PATENT DOCUMENTS

CN 208386613 1/2019
JP 2006303719 11/2006
(Continued)

OTHER PUBLICATIONS

PCT International Application No. PCT/KR2021/004997, International Search Report dated Jan. 14, 2022, 2 pages.
(Continued)

*Primary Examiner* — Yuwen Pan
*Assistant Examiner* — Fatuma G Sherif
(74) *Attorney, Agent, or Firm* — LEE, HONG, DEGERMAN, KANG & WAIMEY

(57) ABSTRACT

Provided is a mobile terminal changing in size according to one embodiment. The mobile terminal comprises: a slide metal part; a front metal part formed to be coupled to the slide metal part; and a coupling link formed to couple the slide metal part and the front metal part in a folded state or an extended state. A plurality of antennas are disposed on the left surface, the right surface and the lower surface of the slide metal part, and at least one surface of the slide metal part is ground-connected to a PCB, which is accommodated in the slide metal part, at a plurality of points, and thus a difference in the lengths of ground paths is reduced in accordance with a relative movement to reduce a change in antenna performance of the plurality of antennas due to the relative movement.

20 Claims, 44 Drawing Sheets

(51) Int. Cl.
*H01Q 21/28* (2006.01)
*H04B 1/401* (2015.01)

(56) References Cited

U.S. PATENT DOCUMENTS

2012/0115336 A1    5/2012  Kanazawa et al.
2018/0090821 A1*  3/2018  Lee ........................ H01Q 9/42
2019/0356040 A1* 11/2019  Kim ....................... H01Q 9/42

FOREIGN PATENT DOCUMENTS

| KR | 101453907 | 10/2014 |
| KR | 1020190115888 | 10/2019 |
| KR | 1020190143029 | 12/2019 |
| KR | 1020200017541 | 2/2020 |
| KR | 1020200117959 | 10/2020 |

OTHER PUBLICATIONS

Korean Intellectual Property Office Application No. 10-2023-7031535, Office Action dated Jan. 22, 2024, 5 pages.

* cited by examiner

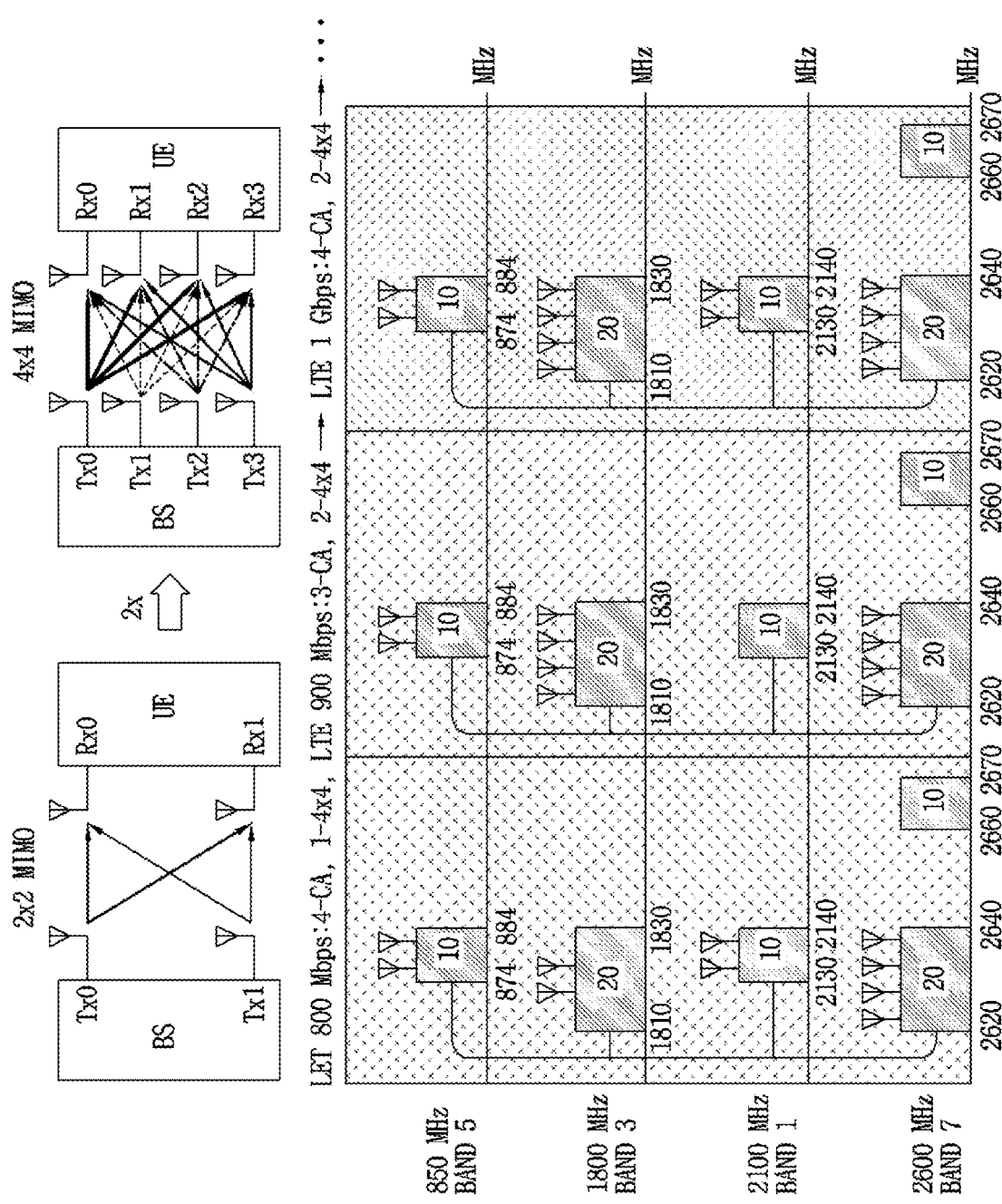

FIG. 5B

| SUBCARRIER SPACING: $f_o \times 2^\mu$, $f_o$ = 15kHz AND SCALING VALUE $2^\mu \in \{-2, 0, 1, 2,..., 5\}$ | | | | | | | |
|---|---|---|---|---|---|---|---|
| $\mu$ | -2 | 0 | 1 | 2 | 3 | 4 | 5 |
| SUBCARRIER SPACING [kHz] | 3.75 | 15 | 30 | 60 | 120 | 240 | 480 |
| LENGTH OF OFDM SYMBOL [$\mu s$] | 266.67 | 66.67 | 33.33 | 16.67 | 8.333 | 4.17 | 2.08 |

15kHz 1 SLOT(14 SYMBOLS) : 1ms SUBFRAME

| 0 | 1 | 2 | 3 | 4 | 5 | 6 | 7 | 8 | 9 | 10 | 11 | 12 | 13 |

| 0 | 1 | 2 | 3 | 4 | 5 | 6 | 7 | 8 | 9 | 10 | 11 | 12 | 13 | 30kHz 1 SLOT(14 SYMBOLS) : 0.5ms

| 0 | 1 | 15kHz 1 SLOT(2 SYMBOLS) : 0.2ms

| 0 | 1 | 2 | 3 | 30kHz MINI SLOT(4 SYMBOLS) : 0.2ms

| 0 | 1 | 2 | 3 | 4 | 5 | 6 | 60kHz MINI SLOT(7 SYMBOLS) : 0.125ms (a)　　　(b)

(a)　　　(b)

(a)

(b)

(a) Upper ANT (R1)

Lower ANT (R2)

[Close state]

(b)

Front Metal (102)
183a
Side PCB
183b
Slide Metal (101)

(a)

GP2  GP3  GP1

(b)

Close #1

(a)

Open (b)

Close #2

(c)

Antenna Switch Topology

GND Switch Topology

[Close State]

GND Clip #1 : RF short
GND Clip #2, #3 : RF Open / DC Short (a)

[Open State]

GND Clip #1, #2, #3 : RF & DC short (b)

(a)

(b)

[Close State]

(a)

[Open State]

(b)

[Close State]

GND Clip #1 : RF tuning
GND Clip #2, #3 : RF Open / DC Short (a)

[Open State]

GND Clip #2, #3 : RF & DC short (b)

(a)

(b)

ELECTRONIC DEVICE HAVING ANTENNAS

CROSS-REFERENCE TO RELATED APPLICATION(S)

This application is the National Stage filing under 35 U.S.C. 371 of International Application No. PCT/KR2021/004997, filed on Apr. 21, 2021, the contents of which are all incorporated by reference herein in its entirety.

TECHNICAL FIELD

The present disclosure relates to an electronic device having antennas. One particular implementation relates to an electronic device having antennas in an electronic device that changes in size.

BACKGROUND ART

Electronic devices may be classified into mobile/portable terminals and stationary terminals according to mobility. Also, electronic devices may be classified into handheld types and vehicle mount types according to whether or not a user can directly carry.

Functions of electronic devices are diversifying. Examples of such functions include data and voice communications, capturing images and video via a camera, recording audio, playing music files via a speaker system, and displaying images and video on a display. Some electronic devices include additional functionality which supports electronic game playing, while other terminals are configured as multimedia players. Specifically, in recent time, mobile terminals can receive multicast signals to allow viewing of video or television programs As it becomes multifunctional, an electronic device can be allowed to capture still images or moving images, play music or video files, play games, and the like, so as to be implemented as an integrated multimedia player.

Efforts are ongoing to support and increase the functionality of electronic devices. Such efforts include software and hardware improvements, as well as changes and improvements in the structural components.

In addition to those attempts, the electronic devices provide various services in recent years by virtue of commercialization of wireless communication systems using an LTE communication technology. In the future, it is expected that a wireless communication system using a 5G communication technology will be commercialized to provide various services. Meanwhile, some of LTE frequency bands may be allocated for 5G communication services.

In this regard, electronic devices may be configured to provide 5G communication services in various frequency bands. Recently, attempts have been made to provide 5G communication services using a Sub6 band that is a band of 6 GHz or less. In the future, however, it is also expected to provide 5G communication services by using a millimeter-wave (mmWave) band in addition to the Sub6 band for a faster data rate.

Meanwhile, electronic devices supporting 4G and 5G communication services may be provided in various form factors. As an example of the form factor for the electronic device, a rollable device may be considered. Metal rim frames of electronic devices having various form factors may have an integral structure or a variable structure. In this regard, a rollable device having an integral frame structure has a difficulty in implementing a rollable display.

The rollable display may be configured to have a display region which is decreased or increased by a variable mechanism structure. When metal frames of a rollable device having a variable mechanism structure is used as antennas, it is difficult to secure antenna performance owing to the metal frames separately provided from each other.

Also, as the rollable device changes in size, the configuration of a ground region varies. When a physical length of a ground region is reduced due to the retraction of the rollable device, antenna performance at a low band (LB) may be deteriorated.

DISCLOSURE OF INVENTION

Technical Problem

The present disclosure is directed to solving the aforementioned problems and other drawbacks. One aspect of the present disclosure is to provide a disposition of antennas in rim regions of an electronic device even when a form factor changes.

Another aspect of the present disclosure is to provide a disposition of antennas in rim regions in a rollable device which has a display rollable to one side.

Still another aspect of the present disclosure is to provide a disposition of antennas in rim regions in a vertical rollable device.

Still another aspect of the present disclosure is to secure antenna performance of a predetermined level or higher while overcoming an antenna design space limitation.

Still another aspect of the present disclosure is to provide an antenna feeding structure in which a change in antenna characteristics is insensitive to a change in size of a mobile terminal.

Still another aspect of the present disclosure is to secure antenna performance at a low band (LB) even when a rollable device is reduced in size.

Solution to Problem

To achieve the above or other aspects, a mobile terminal a mobile terminal that changes in size according to an embodiment is provided. The mobile terminal may include a slide metal part, a front metal part coupled to the slide metal part, and a coupling link to couple the slide metal part and the front metal part to each other in a folded state and an unfolded state. A plurality of antennas may be disposed on the left side surface, the right side surface, and the bottom side surface of the slide metal part. At least one side surface of the slide metal part may be connected to a PCB received in the slide metal part at a plurality of points, to reduce a difference in lengths of ground paths according to the relative movement so as to decrease a change in antenna performance of the plurality of antennas according to the relative movement.

According to an embodiment, the slide metal part may include a left side surface, a right side surface, and a bottom side surface defining appearance of the mobile terminal. The front metal part may include including an upper side surface and a front portion defining the appearance of the mobile terminal and may be coupled to the slide metal part.

According to an embodiment, the coupling link may have one end and another end connected to the slide metal part and the front metal part, to couple the slide metal part and the front metal part to each other in a folded state and an unfolded state according to a relative movement between the slide metal part and the front metal part.

According to an embodiment, a spring contact part may be disposed on the front portion of the front metal part to electrically connect the slide metal part and the front metal part in a spring contact manner, and a contact point where the spring contact part is in contact with the slide metal part may be higher than the plurality of points as the slide metal part moves in a downward direction.

According to an embodiment, the slide metal part may include a first metal housing having the left side surface and the right side surface defining the appearance of the mobile terminal, and a second metal housing having the left lateral side surface, the right lateral side surface, and the bottom side surface defining the appearance. Here, a first conductive member and a second conductive member of the second metal housing each may include a first sub member disposed on the bottom side surface and a second sub member disposed on the left or right lateral side surface.

According to one embodiment, the mobile terminal may further include a first printed circuit board (PCB) having a wireless communication unit, a second PCB electrically connected to the first PCB and received in one side surface of the slide metal part, a third PCB electrically connected to the second PCB and received in another side surface of the slide metal part, and a display having a first region that is exposed to a front surface in a retracted state of the mobile terminal, and a second region that is an expanded region exposed to the front surface in an expanded state of the mobile terminal.

According to one embodiment, the first conductive member may operate as a first antenna through a feed portion, and may be connected to a ground at a first point through the second PCB and a switch, and the second conductive member operates as a second antenna through a second feed portion. The mobile terminal may further include a third conductive member disposed between the first conductive member and the second conductive member with being spaced by slits.

According to one embodiment, the mobile terminal may further include a fourth conductive member disposed on the left side surface of the first metal housing, and a fifth conductive member disposed on the right side surface. The fourth conductive member and the fifth conductive member may operate as a third antenna and a fourth antenna, respectively. The fourth conductive member may be connected to a ground at a second point through the second PCB and a second switch.

According to one embodiment, the mobile terminal may further include a processor operably coupled to the wireless communication unit, and configured to determine whether the mobile terminal is in a first or second state in which the display region is retracted or expanded according to the relative movement. The processor may control, in the first state, the switch such that the slide metal part is not electrically connected to the front metal part at the first point through the second PCB, and control the second switch such that the slide metal part is electrically connected to the front metal part at the second point through the second PCB.

According to one embodiment, the length of the ground path, in the first state, may be determined as a sum of a first length from a first contact point by the spring contact part in the first state to one point of the upper side surface of the front metal part and a second length from the second point to the first contact point.

According to one embodiment, the processor may control, in the second state, the switch such that the slide metal part is electrically connected to the front metal part at the first point through the second PCB, and control the second switch such that the slide metal part is electrically connected to the front metal part at the second point through the second PCB.

According to one embodiment, the length of the ground path, in the second state, may be determined as a sum of a first length from a second contact point by the spring contact part in the second state to one point of the upper side surface of the front metal part and a third length from the first point to the second contact point. The second point may be disposed between a first contact point by the spring contact part in the first state and the second contact point by the spring contact part in the first state, such that a difference between the second length and the third length is less than a threshold value.

According to one embodiment, the fourth conductive member may be further connected to a ground at a third point through the second PCB and a third switch, and the processor, in the first state, may control the third switch such that the slide metal part is not electrically connected to the front metal part at the third point through the second PCB.

According to one embodiment, the fourth conductive member may be further connected to a ground at a third point through the second PCB and a third switch, and the processor, in the second state, may control the first switch, the second switch, and the third switch such that the slide metal part is electrically connected to the front metal part through the second PCB at the first point, the second point, and the third point.

Advantageous Effects of Invention

According to the present disclosure, in an electronic device whose form factor varies, an antenna design space limitation can be overcome.

According to the present disclosure, in a rollable device in which a display rolls to one side, an antenna design space limitation can be overcome.

According to the present disclosure, in a vertical rollable device, a wireless platform design structure including an antenna disposition can be provided.

According to the present disclosure, separated metal rims can be used for implementing a display sliding part, thereby overcoming an antenna design space limitation and securing antenna performance of a predetermined level or higher.

According to the present disclosure, antenna performance at a low band (LB) can be secured even when a rollable device is reduced in size.

According to the present disclosure, antenna performance at a low band (LB) can be improved by elongating a ground (GND) current path in a closed state of a relatively small vertical device.

According to the present disclosure, wireless performance deviation can be improved by varying a GND condition of an antenna in an open/closed state.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

BRIEF DESCRIPTION OF DRAWINGS

FIG. 2C is a view illustrating a MIMO configuration and a MIMO+carrier aggregation (CA) configuration between a UE and a base station (BS) in accordance with one embodiment.

FIG. 5B shows a change in a slot length according to a change in a subcarrier spacing in the NR.

MODE FOR THE INVENTION

Figure 1A:
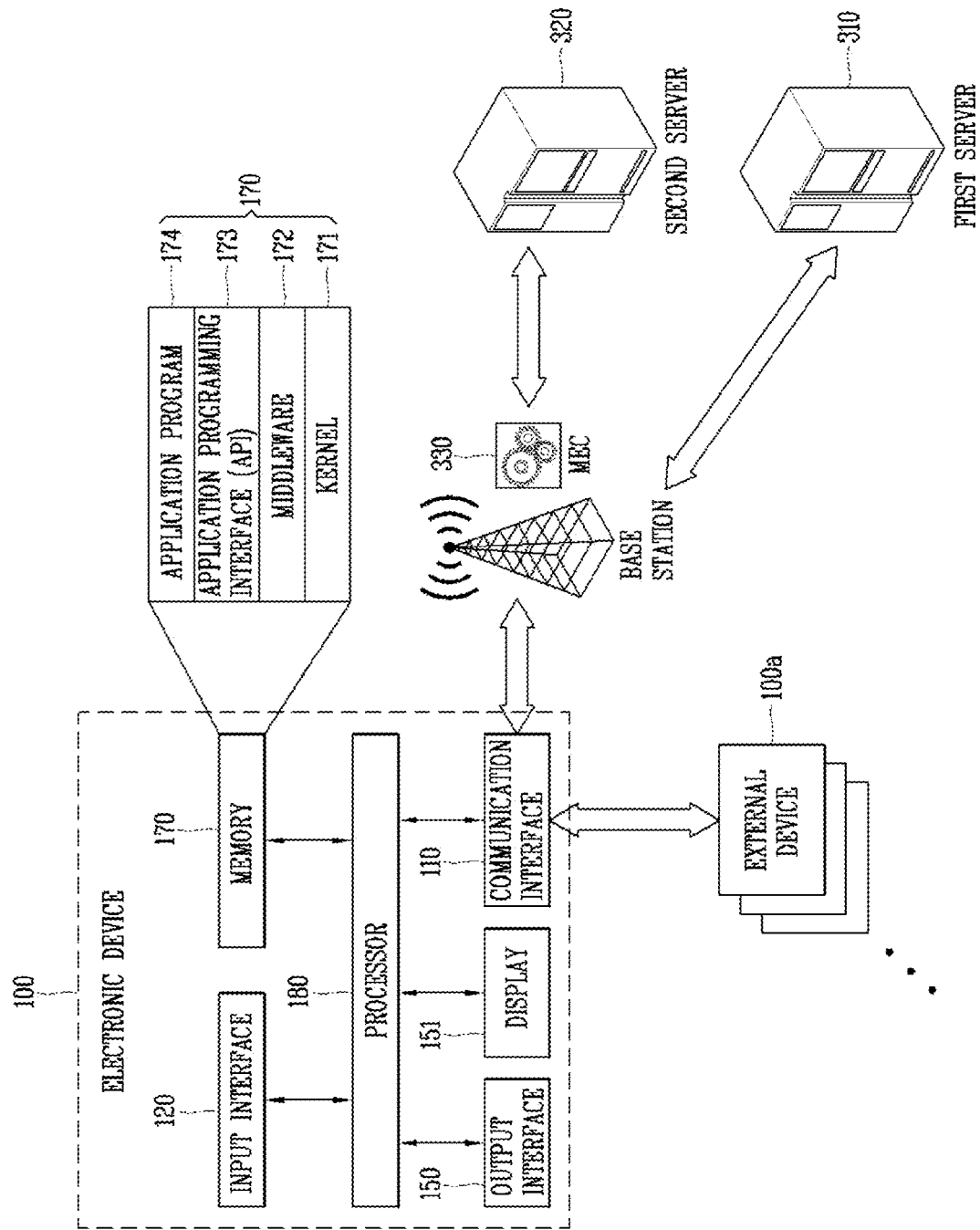
FIG. 1A is a view illustrating a configuration for describing an electronic device in accordance with one embodiment, and an interface between the electronic device and an external device or server.

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. A suffix "module" or "unit" used for elements disclosed in the following description is merely intended for easy description of the specification, and the suffix itself is not intended to give any special meaning or function. In describing the embodiments disclosed herein, moreover, the detailed description will be omitted when specific description for publicly known technologies to which the invention pertains is judged to obscure the gist of the present disclosure. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Electronic devices presented herein may be implemented using a variety of different types of terminals. Examples of such devices include cellular phones, smart phones, user equipment, laptop computers, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, digital signages, and the like.

Figure 1B:
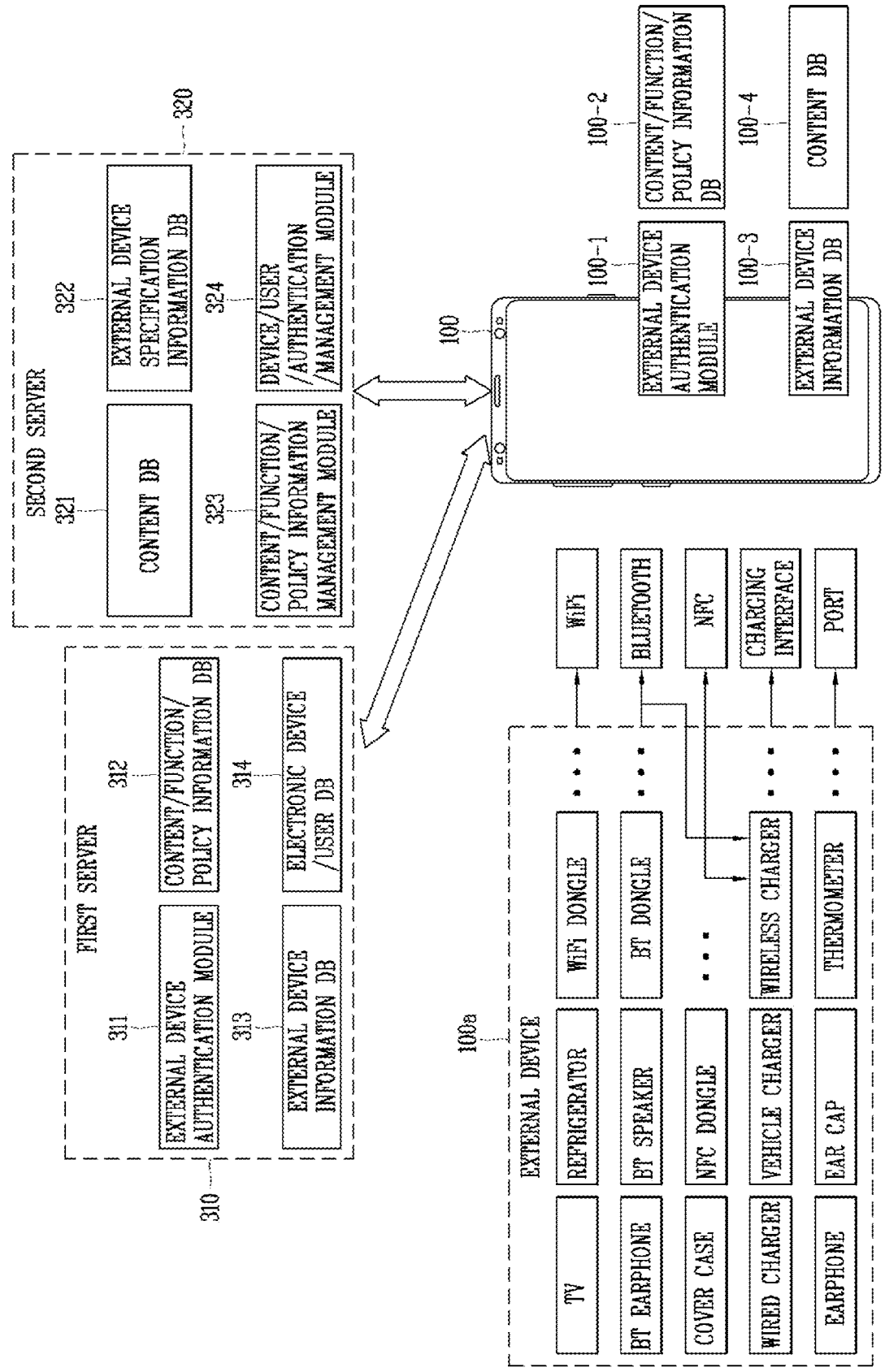
FIG. 1B is a view illustrating a detailed configuration in which the electronic device according to the one embodiment is interfaced with an external device or a server.
Figure 1C:
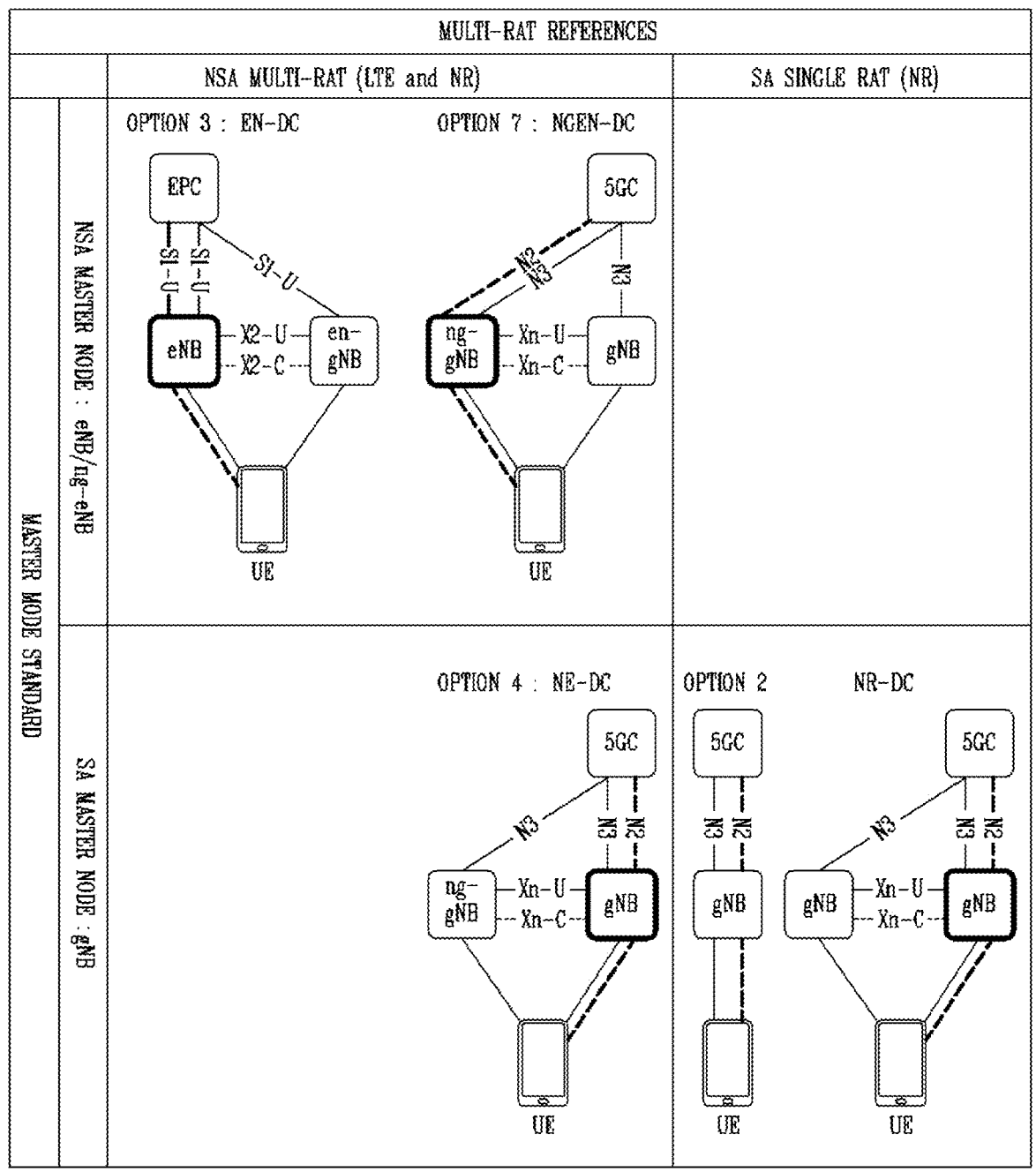
FIG. 1C is a view illustrating a configuration in which the electronic device according to the one embodiment is interfaced with a plurality of base stations or network entities.

Referring to FIGS. 1A to 1C, FIG. 1A is a view illustrating a configuration for describing an electronic device in accordance with one embodiment, and an interface between the electronic device and an external device or server. FIG. 1B is a view illustrating a detailed configuration in which the electronic device according to the one embodiment is interfaced with an external device or a server. FIG. 1C is a view illustrating a configuration in which the electronic device according to the one embodiment is interfaced with a plurality of base stations or network entities.

Figure 2A:
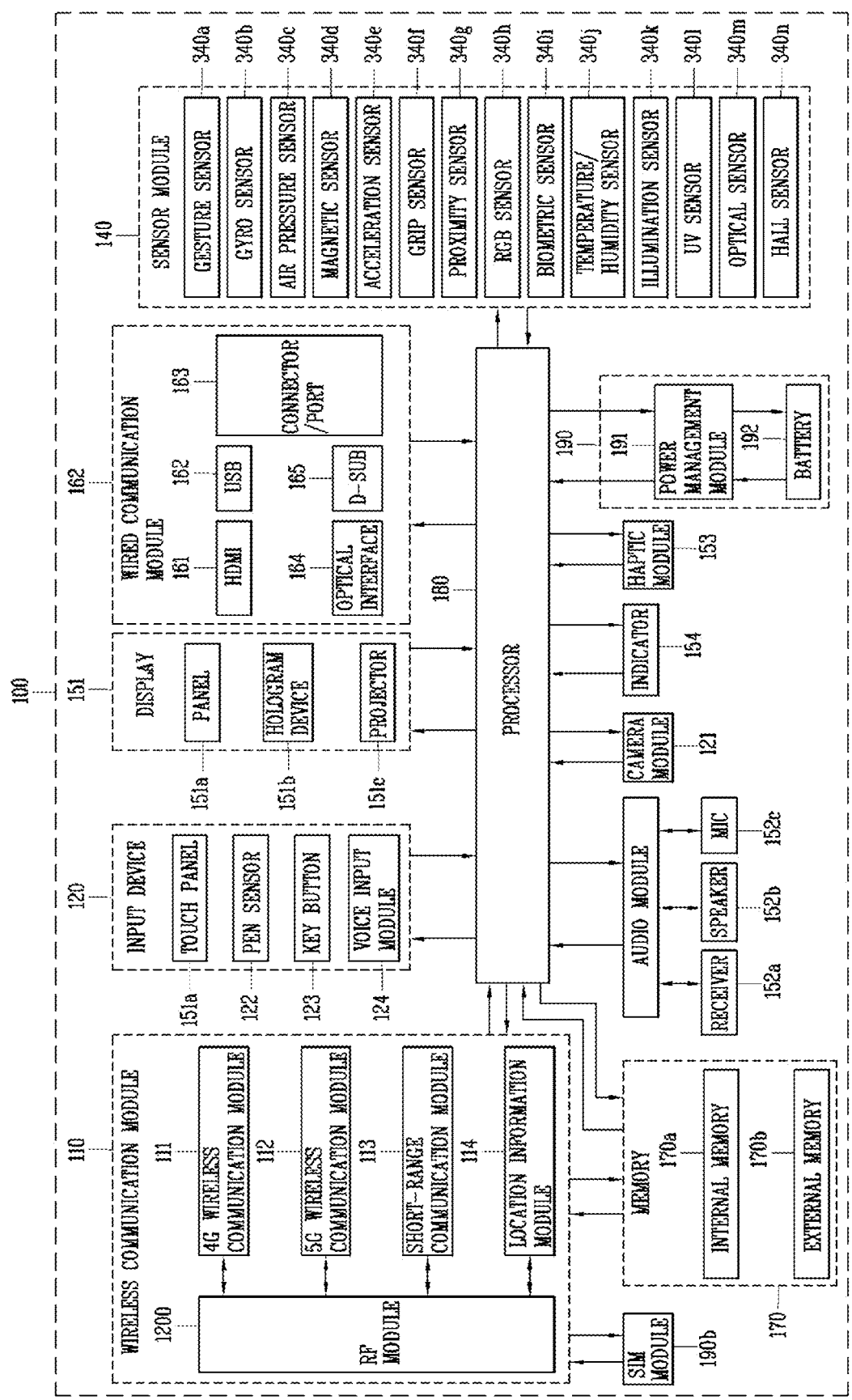
FIG. 2A is a view illustrating a detailed configuration of the electronic device of FIG. 1A.
Figure 2B:
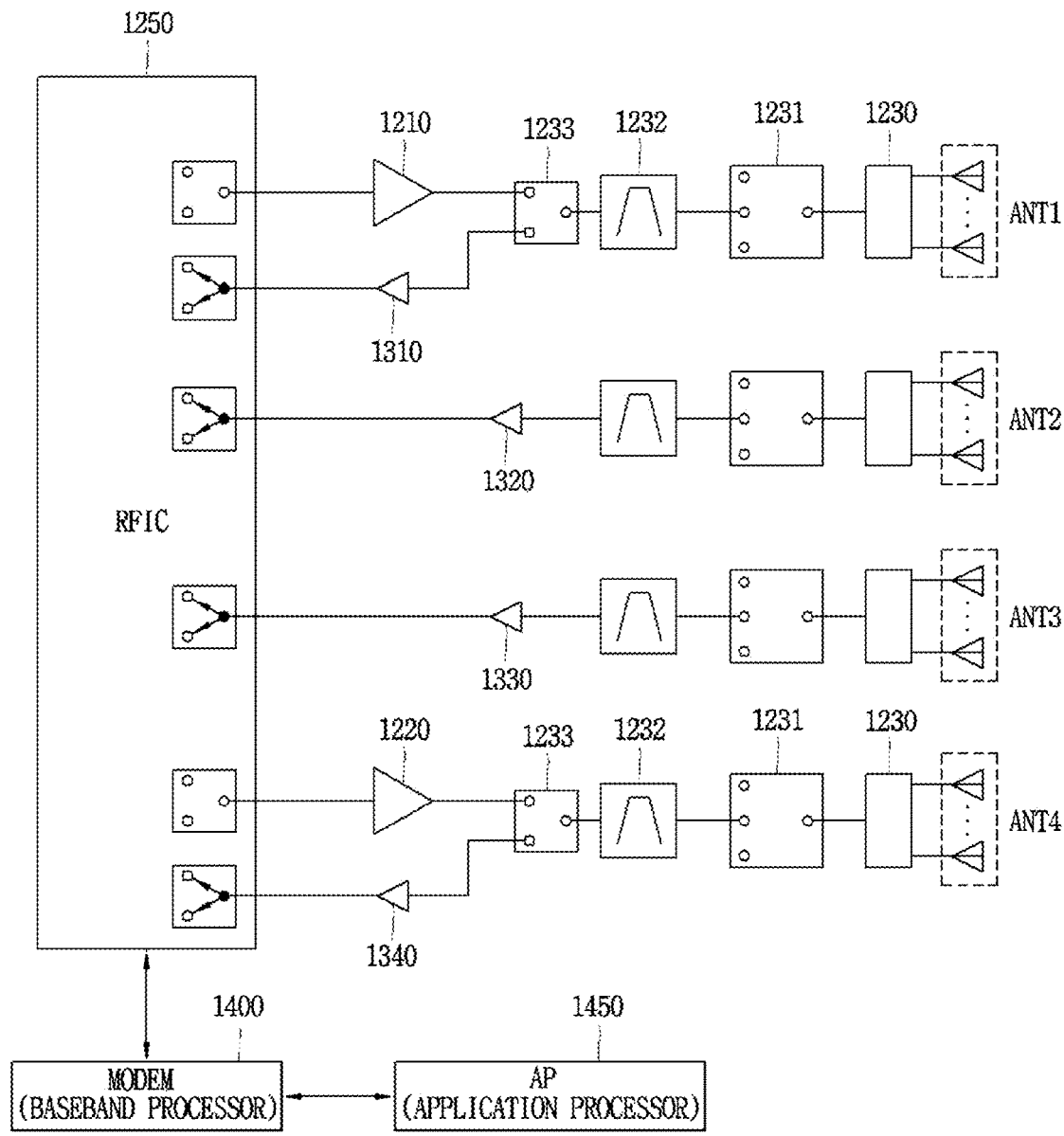
FIG. 2B is a view illustrating a configuration of a wireless communication unit of the electronic device operable in a plurality of wireless communication systems according to an embodiment.

Meanwhile, referring to FIGS. 2A to 2B, FIG. 2A is a view illustrating a detailed configuration of the electronic device of FIG. 1A. FIGS. 2B and 2C are conceptual views illustrating one example of an electronic device according to the present disclosure, viewed from different directions.

Referring to FIG. 1A, the electronic device 100 may include a communication interface 110, an input interface (or an input device) 120, an output interface (or an output device) 150, and a processor 180. Here, the communication interface 110 may refer to the wireless communication module 110. The electronic device 100 may further include a display 151 and a memory 170. It is understood that implementing all of the illustrated components illustrated in FIG. 1A is not a requirement, and that greater or fewer components may alternatively be implemented.

In more detail, among others, the wireless communication module 110 may typically include one or more modules which permit communications such as wireless communications between the electronic device 100 and a wireless communication system, communications between the electronic device 100 and another electronic device, or communications between the electronic device 100 and an external server. Further, the wireless communication module 110 may typically include one or more modules which connect the electronic device 100 to one or more networks. Here, the one or more networks may be, for example, a 4G communication network and a 5G communication network.

Referring to FIGS. 1A and 2A, the wireless communication module 110 may include at least one of a 4G wireless communication module 111, a 5G wireless communication module 112, a short-range communication module 113, and a location information module 114. The 4G wireless communication module 111, the 5G wireless communication module 112, the short-range communication module 113, and the location information module 114 may be implemented as a baseband processor such as a modem. In one example, the 4G wireless communication module 111, the 5G wireless communication module 112, the short-range communication module 113, and the location information module 114 may be implemented as a transceiver circuit operating in an IF band and a baseband processor. The RF module 1200 may be implemented as an RF transceiver circuit operating in an RF frequency band of each communication system. However, the present disclosure may not be limited thereto. Each of the 4G wireless communication module 111, the 5G wireless communication module 112, the short-range communication module 113, and the location information module 114 may include an RF module.

The 4G wireless communication module 111 may perform transmission and reception of 4G signals with a 4G base station through a 4G mobile communication network. In this case, the 4G wireless communication module 111 may transmit at least one 4G transmission signal to the 4G base station. In addition, the 4G wireless communication module 111 may receive at least one 4G reception signal from the 4G base station. In this regard, Uplink (UL) Multi-input and Multi-output (MIMO) may be performed by a plurality of 4G transmission signals transmitted to the 4G base station. In addition, Downlink (DL) MIMO may be performed by a plurality of 4G reception signals received from the 4G base station.

The 5G wireless communication module 112 may perform transmission and reception of 5G signals with a 5G base station through a 5G mobile communication network. Here, the 4G base station and the 5G base station may have a Non-Stand-Alone (NSA) architecture. For example, the 4G base station and the 5G base station may be a co-located structure in which the stations are disposed at the same location in a cell. Alternatively, the 5G base station may be disposed in a Stand-Alone (SA) structure at a separate location from the 4G base station.

The 5G wireless communication module 112 may perform transmission and reception of 5G signals with a 5G base station through a 5G mobile communication network.

In this case, the 5G wireless communication module 112 may transmit at least one 5G transmission signal to the 5G base station. In addition, the 5G wireless communication module 112 may receive at least one 5G reception signal from the 5G base station.

In this instance, 5G and 4G networks may use the same frequency band, and this may be referred to as LTE refarming. In some examples, a Sub6 frequency band, which is a range of 6 GHz or less, may be used as the 5G frequency band.

In contrast, a millimeter-wave (mmWave) band may be used as the 5G frequency band to perform wideband high-speed communication. When the mmWave band is used, the electronic device 100 may perform beamforming for communication coverage expansion with a base station.

On the other hand, regardless of the 5G frequency band, 5G communication systems can support a larger number of multi-input multi-output (MIMO) to improve a transmission rate. In this instance, UL MIMO may be performed by a plurality of 5G transmission signals transmitted to a 5G base station. In addition, DL MIMO may be performed by a plurality of 5G reception signals received from the 5G base station.

On the other hand, the wireless communication module 110 may be in a Dual Connectivity (DC) state with the 4G base station and the 5G base station through the 4G wireless communication module 111 and the 5G wireless communication module 112. As such, the dual connectivity to the 4G base station and the 5G base station may be referred to as EUTRAN NR DC (EN-DC). Here, EUTRAN is an abbreviated form of "Evolved Universal Telecommunication Radio Access Network," and refers to a 4G wireless communication system. Also, NR is an abbreviated form of "New Radio" and refers to a 5G wireless communication system.

When the 4G base station and 5G base station are disposed in a co-located structure, throughput improvement can be achieved by inter-Carrier Aggregation (inter-CA). Accordingly, when the 4G base station and the 5G base station are disposed in the EN-DC state, the 4G reception signal and the 5G reception signal may be simultaneously received through the 4G wireless communication module 111 and the 5G wireless communication module 112.

The short-range communication module 113 is configured to facilitate short-range communications. Suitable technologies for implementing such short-range communications include Bluetooth, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the electronic device 100 and a wireless communication system, communications between the electronic device 100 and another electronic device, or communications between the electronic device and a network where another electronic device (or an external server) is located, via wireless area network. One example of the wireless area networks is a wireless personal area network.

Short-range communication between electronic devices may be performed using the 4G wireless communication module 111 and the 5G wireless communication module 112. In one implementation, short-range communication may be performed between electronic devices in a device-to-device (D2D) manner without passing through base stations.

Meanwhile, for transmission rate improvement and communication system convergence, Carrier Aggregation (CA) may be carried out using at least one of the 4G wireless communication module 111 and the 5G wireless communication module 112 and a WiFi communication module. In this regard, 4G+WiFi CA may be performed using the 4G wireless communication module 111 and the Wi-Fi communication module 113. Or, 5G+WiFi CA may be performed using the 5G wireless communication module 112 and the Wi-Fi communication module 113.

The location information module 114 may be generally configured to detect, calculate, derive, or otherwise identify a position (or current position) of the electronic device. As an example, the location information module 115 includes a Global Position System (GPS) module, a Wi-Fi module, or both. For example, when the electronic device uses a GPS module, a position of the electronic device may be acquired using a signal sent from a GPS satellite. As another example, when the electronic device uses the Wi-Fi module, a position of the electronic device can be acquired based on information related to a wireless Access Point (AP) which transmits or receives a wireless signal to or from the Wi-Fi module. If desired, the location information module 114 may alternatively or additionally function with any of the other modules of the wireless communication module 110 to obtain data related to the position of the electronic device. The location information module 114 is a module used for acquiring the position (or the current position) and may not be limited to a module for directly calculating or acquiring the position of the electronic device.

Specifically, when the electronic device utilizes the 5G wireless communication module, the position of the electronic device may be acquired based on information related to the 5G base station which performs radio signal transmission or reception with the 5G wireless communication module. In particular, since the 5G base station of the mmWave band is deployed in a small cell having a narrow coverage, it is advantageous to acquire the position of the electronic device.

The input device 120 may include a pen sensor 1200, a key button 123, a voice input module 124, a touch panel 151*a*, and the like. The input device 120 may include a camera module 121 or an image input unit for obtaining images or video, a microphone 152*c* or an audio input unit for inputting an audio signal, and a user input unit 123 (for example, a touch key, a mechanical key, and the like) for allowing a user to input information. Data (for example, audio, video, image, and the like) may be obtained by the input device 120 and may be analyzed and processed according to user commands.

The camera module 121 is a device capable of capturing still images and moving images. According to one embodiment, the camera module 121 may include one or more image sensors (e.g., a front sensor or a rear sensor), a lens, an image signal processor (ISP), or a flash (e.g., LED or lamp).

The sensor module 140 may typically be implemented using one or more sensors configured to sense internal information of the electronic device, the surrounding environment of the electronic device, user information, and the like. For example, the sensor module 140 includes at least one of a gesture sensor 340*a*, a gyro sensor 340*b*, an air pressure sensor 340*c*, a magnetic sensor 340*d*, an acceleration sensor 340*e*, a grip sensor 340*f*, and a proximity sensor 340*g*, a color sensor 340*h* (e.g., RGB (red, green, blue) sensor), a bio-sensor 340*i*, a temperature/humidity sensor 340*j*, an illuminance sensor 340*k*, an ultra violet (UV) sensor

340*l*, a light sensor 340*m*, and a hall sensor 340*n*. The sensor module 140 may also include at least one of a finger scan sensor, an ultrasonic sensor, an optical sensor (for example, camera 121), a microphone (see 152*c*), a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The electronic device disclosed herein may be configured to utilize information obtained from one or more sensors, and combinations thereof.

The output interface 150 may typically be configured to output various types of information, such as audio, video, tactile output, and the like. The output interface 150 may be shown having at least one of a display 151, an audio module 152, a haptic module 153, and an indicator 154.

The display 151 may have an inter-layered structure or an integrated structure with a touch sensor in order to implement a touch screen. The touch screen may function as the user input unit 123 which provides an input interface between the electronic device 100 and the user and simultaneously provide an output interface between the electronic device 100 and a user. For example, the display 151 may include a liquid crystal display (LCD), a light emitting diode (LED) display, an organic light emitting diode (OLED) display, a micro electromechanical systems (MEMS) display, or an electronic paper. For example, the display 151 may display various contents (e.g., text, images, videos, icons, and/or symbols, etc.). The display 151 may include a touch screen, and may receive, for example, a touch, gesture, proximity, or hovering input using an electronic pen or a part of the user's body.

Meanwhile, the display 151 may include a touch panel 151*a*, a hologram device 151*b*, a projector 151*c*, and/or a control circuit for controlling them. In this regard, the panel may be implemented to be flexible, transparent, or wearable. The panel may include the touch panel 151*a* and one or more modules. The hologram device 151*b* may display a stereoscopic image in the air by using light interference. The projector 151*c* may display an image by projecting light onto a screen. The screen may be located inside or outside the electronic device 100, for example.

The audio module 152 may interwork with the receiver 152*a*, the speaker 152*b*, and the microphone 152*c*. Meanwhile, the haptic module 153 may convert an electrical signal into a mechanical vibration, and generate a vibration or a haptic effect (e.g., pressure, texture). The electronic device may include a mobile TV supporting device (e.g., a GPU) that may process media data as per, e.g., digital multimedia broadcasting (DMB), digital video broadcasting (DVB), or mediaFlo™ standards. The indicator 154 may indicate a particular state of the electronic device 100 or a part (e.g., the processor 310) of the electronic device, including, e.g., a booting state, a message state, or a recharging state.

The wired communication module 160 which may be implemented as an interface unit may serve as a passage with various types of external devices connected to the electronic device 100. The wired communication module 160 may include an HDMI 162, a USB 162, a connector/port 163, an optical interface 164, or a D-subminiature (D-sub) 165. can do. The wired communication module 160, for example, may include any of wired or wireless ports, external power supply ports, wired or wireless data ports, memory card ports, ports for connecting a device having an identification module, audio input/output (I/O) ports, video I/O ports, earphone ports, and the like. The electronic device 100 may perform assorted control functions associated with a connected external device, in response to the external device being connected to the wired communication module 160.

The memory 170 is typically implemented to store data to support various functions or features of the electronic device 100. For instance, the memory 170 may be configured to store application programs executed in the electronic device 100, data or instructions for operations of the electronic device 100, and the like. At least some of these application programs may be downloaded from an external server (e.g., a first server 310 or a second server 320) through wireless communication. Other application programs may be installed within the electronic device 100 at the time of manufacturing or shipping, which is typically the case for basic functions of the electronic device 100 (for example, receiving a call, placing a call, receiving a message, sending a message, and the like). Application programs may be stored in the memory 170, installed in the electronic device 100, and executed by the processor 180 to perform an operation (or function) for the electronic device 100.

In this regard, the first server 310 may be referred to as an authentication server, and the second server 320 may be referred to as a content server. The first server 310 and/or the second server 320 may be interfaced with the electronic device through a base station. Meanwhile, a part of the second server 320 corresponding to the content server may be implemented as a mobile edge cloud (MEC) 330 in units of base stations. This can implement a distributed network through the second server 320 implemented as the mobile edge cloud (MEC) 330, and shorten content transmission delay.

The memory Memory 170 may include a volatile memory and/or a non-volatile memory. The memory 170 may also include an internal memory 170*a* and an external memory 170*b*. The memory 170 may store, for example, commands or data related to at least one of other components of the electronic device 100. According to an implementation, the memory 170 may store software and/or a program 240. For example, the program 240 may include a kernel 171, middleware 172, an application programming interface (API) 173, or an application program (or "application") 174, and the like. At least some of the kernel 171, the middleware 172, and the API 174 may be referred to as an operating system (OS).

The kernel 171 may control or manage system resources (e.g., the bus, the memory 170, or the processor 180) that are used for executing operations or functions implemented in other programs (e.g., the middleware 172, the API 173, or the application program 174). In addition, the kernel 171 may provide an interface to control or manage system resources by accessing individual components of the electronic device 100 in the middleware 172, the API 173, or the application program 174.

The middleware 172 may play an intermediary so that the API 173 or the application program 174 communicates with the kernel 171 to exchange data. Also, the middleware 172 may process one or more task requests received from the application program 247 according to priorities. In one embodiment, the middleware 172 may give at least one of the application programs 174 a priority to use the system resources (e.g., the bus, the memory 170, or the processor 180) of the electronic device 100, and process one or more task requests. The API 173 is an interface for the application program 174 to control functions provided by the kernel 171 or the middleware 1723, and for example, may include at least one interface or function (e.g., command) for file control, window control, image processing, or text control.

The processor 180 may typically function to control an overall operation of the electronic device 100, in addition to the operations associated with the application programs. The processor 180 may provide or process information or functions appropriate for a user by processing signals, data, information, and the like, which are input or output by the aforementioned various components, or activating application programs stored in the memory 170. Furthermore, the processor 180 may control at least part of the components illustrated in FIGS. 1A and 2A, in order to execute the application programs stored in the memory 170. In addition, the processor 180 may control a combination of at least two of those components included in the electronic device 100 to activate the application program.

The processor 180 may include one or more of a central processing unit (CPU), an application processor (AP), an image signal processor (ISP), a communication processor (CP), and a low power processor (e.g., sensor hub). For example, the processor 180 may execute a control of at least one of other components of the electronic device 100 and/or an operation or data processing related to communication.

The power supply unit 190 may be configured to receive external power or provide internal power in order to supply appropriate power required for operating elements and components included in the electronic device 100. The power supply unit 190 may include a power management module 191 and a battery 192, and the battery 192 may be a built-in battery or a replaceable battery. The power management module 191 may include a power management integrated circuit (PMIC), a charger IC, or a battery or fuel gauge. The PMIC may employ a wired and/or wireless charging method. The wireless charging method may include, for example, a magnetic resonance method, a magnetic induction method or an electromagnetic wave method, and may further include an additional circuit for wireless charging, for example, a coil loop, a resonance circuit, or a rectifier. The battery gauge may measure, for example, a remaining battery level, and voltage, current, or temperature during charging. For example, the battery 192 may include a rechargeable cell and/or a solar cell.

Each of the external device 100a, the first server 310, and the second server 320 may be the same or different type of device (e.g., external device or server) as or from the electronic device 100. According to an embodiment, all or some of operations executed on the electronic device 100 may be executed on another or multiple other electronic devices (e.g., the external device 100a, the first server 310 and the second server 320. According to an implementation, when the electronic device 100 should perform a specific function or service automatically or at a request, the electronic device 100 may request another device (e.g., the external device 100a, the first server 310, and the second server 320) to perform at least some functions associated therewith, instead of executing the function or service on its own or additionally. The another electronic device (e.g., the external device 100a, the first server 310, and the second server 320) may execute the requested function or additional function and transfer a result of the execution to the electronic device 100. The electronic device 100 may provide the requested function or service by processing the received result as it is or additionally. For this purpose, for example, cloud computing, distributed computing, client-server computing, or mobile edge cloud (MEC) technology may be used.

At least some of the components may cooperably operate to implement an operation, a control or a control method of an electronic device according to various embodiments disclosed herein. Also, the operation, the control or the control method of the electronic device may be implemented on the electronic device by an activation of at least one application program stored in the memory 170.

Referring to FIGS. 1A and 1B, a wireless communication system may include an electronic device 100, at least one external device 100a, a first server 310, and a second server 320. The electronic device 100 may be functionally connected to at least one external device 100a, and may control contents or functions of the electronic device 100 based on information received from the at least one external device 100a. According to an embodiment, the electronic device 100 may use the servers 310 and 320 to perform authentication for determining whether the at least one external device 100 includes or generates information conforming to a predetermined rule. Also, the electronic device 100 may display contents or control functions differently by controlling the electronic device 100 based on the authentication result. According to an embodiment, the electronic device 100 may be connected to at least one external device 100a through a wired or wireless communication interface to receive or transmit information. For example, the electronic device 100 and the at least one external device 100a may transmit or receive information through near field communication (NFC), a charger (e.g., universal serial bus (USB)-C), ear jack, Bluetooth (BT), wireless fidelity (WiFi), or the like.

The electronic device 100 may include at least one of an external device authentication module 100-1, a content/function/policy information DB 100-2, an external device information DB 100-3, or a content DB 104. The at least one external device 100a, which is an assistant device linked with the electronic device 100, may be a device designed for various purposes, such as convenience of use, more attractive appearance, enhancement of usability, etc. of the electronic device 100. At least one external device 100a may or may not be in physical contact with the electronic device 100. According to one embodiment, the at least one external device 100a may be functionally connected to the electronic device 100 using a wired/wireless communication module to control information for controlling content or a function in the electronic device 100.

According to one embodiment, the at least one external device 100a may include an authentication module for encrypting or decrypting at least one of various types of information included in external device information or storage and manage such information in a physical/virtual memory area which is not accessible directly from outside. According to one embodiment, the at least one external device 100a may perform communication with the electronic device 100 or may provide information through communication between the external devices. According to one embodiment, the at least one external device may be functionally connected to the server 410 or 320. In various embodiments, the at least one external device 100a may be various types of products such as a cover case, an NFC dongle, a car charger, an earphone, an ear cap (e.g., an accessory device mounted on a mobile phone audio connector), a thermometer, an electronic pen, a BT earphone, a BT speaker, a BT dongle, a TV, a refrigerator, and a WiFi dongle.

In this regard, for example, the external device 100a such as a wireless charger may supply power to the electronic device 100 using a charging interface such as a coil. In this case, control information may be exchanged between the external device 100a and the electronic device 100 through in-band communication through a charging interface such as a coil. Meanwhile, control information may be exchanged between the external device 100a and the electronic device 100 through out-of-band communication such as Bluetooth or NFC.

Meanwhile, the first server 310 may include a server or a cloud device for services related to the at least one external device 100a or a hub device for controlling services in a smart home environment. The first server 310 may include at least one of an external device authentication module 311, a content/function/policy information DB 312, an external device information DB 313, and an electronic device/user DB 314. The first server 310 may be referred to as an authentication management server, an authentication server, or an authentication-related server. The second server 320 may include a server or a cloud device for providing a service or content, or a hub device for providing a service in a smart home environment. The second server 320 may include at least one of a content DB 321, an external device specification information DB 322, a content/function/policy information management module 323, or a device/user authentication/management module 324. The second server 130 may be referred to as a content management server, a content server, or a content-related server.

On the other hand, the electronic device 100 described herein may maintain a connection state between a 4G base station (eNB) and a 5G base station (eNB) through the 4G wireless communication module 111 and/or the 5G wireless communication module 112. In this regard, as described above, FIG. 1C illustrates a configuration in which the electronic device 100 is interfaced with a plurality of base stations or network entities.

Referring to FIG. 1C, 4G/5G deployment options are shown. With regard to 4G/5G deployment, when multi-RAT of 4G LTE and 5G NR is supported in a non-standalone (NSA) mode, it may be implemented as EN-DC in option 3 or NGEN-DC in option 5. On the other hand, when multi-RAT is supported in a standalone (SA) mode, it may be implemented as NE-DC in option 4. In addition, when single RAT is supported in a standalone (SA) mode, it may be implemented as NR-DC in option 2.

The NR frequency band is defined as a frequency range of two types (FR1, FR2). The FR1 is a sub-6 GHz range, and the FR2 is a range of above 6 GHz, which may denote millimeter waves (mmWs).

Operating bands for dual connectivity may be specified to operate in EN-DC, NGEN-DC, or NR-DC configuration. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

With regard to the base station type, the eNB is a 4G base station, which is also called an LTE eNB, and is based on the Rel-8-Rel-14 standard. On the other hand, ng-eNB is an eNB capable of interworking with a 5GC and gNB, which is also called an eLTE eNB, and is based on the Rel-15 standard. Furthermore, the gNB is a 5G base station interworking with a 5G NR and 5GC, which is also called an NR gNB, and is based on the Rel-15 standard. In addition, the en-gNB is a gNB capable of interworking with an EPC and an eNB, also called an NR gNB, and is based on the Rel-15 standard. With regard to the Dual Connectivity (DC) type, option 3 represents E-UTRA-NR Dual Connectivity (EN-DC). Option 7 represents NG-RAN E-UTRA-NR Dual Connectivity (NGEN-DC). Option 4 represents NR-E-UTRA Dual Connectivity (NE-DC). Option 2 represents NR-NR Dual Connectivity (NR-DC). In this regard, the technical features of double connection according to option 2 through option 7 are as follows.

Option 2: Independent 5G services may be provided with only a 5G system (5GC, gNB). In addition to enhanced Mobile Broadband (eMBB), Ultra-Reliable Low-Latency Communication (URLLC) and Massive Machine Type Communication (mMTC) may be possible, and 5GC features such as network slicing, MEC support, mobility on demand, and access-agnostic may be available to provide a full 5G service. Initially, due to coverage limitations, it may be used as a hot spot, an enterprise or overlay network, and when it is out of a 5G NR coverage, EPC-5GC interworking is required. A 5G NR full coverage may be provided, and dual connectivity (NR-DC) may be supported between gNBs using a plurality of 5G frequencies.

Option 3: This is a case where only a gNB is introduced into the existing LTE infrastructure. The core is an EPC and the gNB is an en-gNB that can interwork with the EPC and the eNB. The dual connectivity (EN-DC) is supported between the eNB and the en-gNB, and the master node is an eNB. An eNB, which is a control anchor of an en-gNB, processes control signaling for network access, connection configuration, handover, etc. of a UE, and user traffic may be transmitted through the eNB and/or the en-gNB. It is an option that is mainly applied to a first stage of 5G migration, as an operator operating an LTE nationwide network is able to quickly build a 5G network with the introduction of the en-gNB and minimal LTE upgrade without 5GC.

There are three types of option 3, which are options 3/3a/3x, depending on the user traffic split schemes. Bearer split is applied to options 3/3x, but is not applied to option 3a. The main scheme is option 3x.

Option 3: Only an eNB is connected to an EPC and an en-gNB is connected only to the eNB. User traffic may be split at a master node (eNB) and transmitted simultaneously to LTE and NR.

Option 3a: Both the eNB and the gNB are connected to the EPC, and thus user traffic is directly transferred from the EPC to the gNB. User traffic is transmitted to LTE or NR.

Option 3x: It is a combination of option 3 and option 3a, which differs from Option 3 in that user traffic is split at the secondary node (gNB).

The advantages of option 3 are i) that LTE can be used as a capacity booster for eMBB services, and ii) the terminal is always connected to LTE to provide service continuity through LTE even if it is out of 5G coverage or NR quality deteriorates so as to provide stable communication.

Option 4: 5GC is introduced, and still interworking with LTE, but independent 5G communication is possible. Core is 5GC, and the eNB is an ng-eNB capable of interworking with 5GC and a gNB. Dual connectivity (NE-DC) is supported between an ng-eNB and a gNB, and the master node is the gNB. LTE may be used as a capacity booster when 5G NR coverage is fully extended. There are two types of option 4, which are option 4/4a. The main scheme is option 4a. The main scheme is option 4a.

Option 7: 5GC is introduced, and still interworking with LTE, and 5G communication relies on LTE. Core is 5GC, and the eNB is an ng-eNB capable of interworking with 5GC and a gNB. Dual connectivity (NGEN-DC) is supported between an ng-eNB and a gNB, and the master node is the eNB. 5GC features may be used, and when 5G coverage is insufficient yet, service continuity may be provided using an eNB as the master node similar to option 3. There are three types of option 7, which are options 7/7a/7x, depending on the user traffic split schemes. Bearer split is applied to options 7/7x, but is not applied to option 7a. The main scheme is option 7x.

Hereinafter, description will be given of embodiments of a multi-communication system and an electronic device having the same, specifically, an antenna in a heterogeneous radio system and an electronic device having the same according to the present disclosure, with reference to the accompanying drawings. It will be apparent to those skilled in the art that the present disclosure may be embodied in other specific forms without departing from the idea or essential characteristics thereof.

Hereinafter, detailed operations and functions of an electronic device having a plurality of antennas according to one implementation that includes the 4G/5G communication modules as illustrated in FIG. 2A will be discussed.

In a 5G communication system according to an embodiment, a 5G frequency band may be a higher frequency band than a sub-6 band. For example, the 5G frequency band may be an mmWave band but is not limited thereto, and may be changed depending on applications.

FIG. 2B is a view illustrating a configuration of a wireless communication unit of the electronic device operable in a plurality of wireless communication systems according to an embodiment. Referring to FIG. 2B, the electronic device may include a first power amplifier 1210, a second power amplifier 1220, and an RFIC 1250. In addition, the electronic device may further include a modem 400 and an application processor (AP) 500. Here, the modem 400 and the application processor (AP) 500 may be physically implemented on a single chip, and may be implemented in a logically and functionally separated form. However, the present disclosure may not be limited thereto and may be implemented in the form of a chip that is physically separated according to an application.

Meanwhile, the electronic device includes a plurality of low noise amplifiers (LNAs) 1310 to 1340 in the receiver. Here, the first power amplifier 1210, the second power amplifier 1220, the RFIC 1250, and the plurality of low noise amplifiers 310 to 340 are all operable in a first communication system and a second communication system. In this case, the first communication system and the second communication system may be a 4G communication system and a 5G communication system, respectively.

As illustrated in FIG. 2B, the RFIC 1250 may be configured as a 4G/5G integrated type, but the present disclosure may not be limited thereto. The RFIC 250 may be configured as a 4G/5G separate type according to an application. When the RFIC 1250 is integrally configured to serve for 4G and 5G, this configuration may be advantageous in terms of synchronization between 4G and 5G circuits as well as simplification of control signaling by the modem 1400.

On the other hand, when the RFIC 1250 is separable into two parts for 4G and 5G, respectively, these two parts may be referred to as a 4G RFIC and a 5G RFIC, respectively. In particular, when there is a great difference between the 5G band and the 4G band, such as when the 5G band is configured as a millimeter wave band, the RFIC 1250 may be configured to be separable into two parts for 4G and 5G, respectively. As such, when the RFIC 1250 is configured as the 4G/5G separate type, there may be an advantage that the RF characteristics can be optimized for each of the 4G band and the 5G band.

Meanwhile, even when the RFIC 1250 is configured as a 4G/5G separation type, the 4G RFIC and the 5G RFIC may be logically and functionally separated but physically implemented on a single chip.

On the other hand, the application processor (AP) 1450 may be configured to control the operation of each component of the electronic device. Specifically, the application processor (AP) 1450 may control the operation of each component of the electronic device through the modem 1400.

For example, the modem 1400 may be controlled through a power management IC (PMIC) for low power operation of the electronic device. Accordingly, the modem 1400 may operate power circuits of a transmitter and a receiver through the RFIC 1250 in a low power mode.

In this regard, when it is determined that the electronic device is in an idle mode, the application processor (AP) 500 may control the RFIC 1250 through the modem 300 as follows. For example, when the electronic device is in an idle mode, the application processor 280 may control the RFIC 1250 through the modem 400, such that at least one of the first and second power amplifiers 110 and 120 operates in the low power mode or is turned off.

According to another embodiment, the application processor (AP) 500 may control the modem 400 to provide wireless communication capable of performing low power communication when the electronic device is in a low battery mode. For example, when the electronic device is connected to a plurality of entities among a 4G base station, a 5G base station, and an access point, the application processor (AP) 1450 may control the modem 1400 to enable wireless communication at the lowest power. Accordingly, even though a throughput is slightly sacrificed, the application processor (AP) 500 may control the modem 1400 and the RFIC 1250 to perform short-range communication using only the short-range communication module 113.

According to another embodiment, when a remaining battery capacity of the electronic device is equal to or greater than a threshold value, the application processor 1450 may control the modem 300 to select an optimal wireless interface. For example, the application processor (AP) 1450 may control the modem 1400 to receive data through both the 4G base station and the 5G base station according to the remaining battery level and the available radio resource information. In this case, the application processor (AP) 1450 may receive the remaining battery capacity information from the PMIC, and the available radio resource information from the modem 1400. Accordingly, when the remaining battery capacity and the available radio resources are sufficient, the application processor (AP) 500 may control the modem 1400 and the RFIC 1250 to receive data through both the 4G base station and 5G base station.

Meanwhile, in a multi-transceiving system of FIG. 2B, a transmitter and a receiver of each radio system may be integrated into a single transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system.

In addition, when separated for each communication system, different communication systems cannot be controlled as needed, or because this may lead to a system delay, resources cannot be efficiently allocated. On the other hand, in the multi-transceiving system as illustrated in FIG. 2, different communication systems can be controlled as needed, system delay can be minimized, and resources can be efficiently allocated.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

On the other hand, two different wireless communication systems may be implemented with one antenna using an antenna that serves for both transmission and reception by integrating a transmission unit and a reception unit. In this case, 4×4 MIMO may be implemented using four antennas as illustrated in FIG. 2B. At this time, 4×4 DL MIMO may be performed through downlink (DL).

In this regard, MIMO is a key technology to improve the throughput. It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

Meanwhile, when the 5G band is a Sub6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,c}$, a lower limit $P_{CMAX\_L,c}$ and an upper limit $P_{CMAX\_H,c}$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

On the other hand, a switch-type splitter or power divider is embedded in RFIC corresponding to the RFIC 1250. Accordingly, a separate component does not need to be placed outside, thereby improving component mounting performance. In detail, a transmitter (TX) of two different communication systems can be selected by using a single pole double throw (SPDT) type switch provided in the RFIC corresponding to the controller 1250.

In addition, the electronic device that is operable in the plurality of wireless communication systems according to an embodiment may further include a duplexer 1231, a filter 1232, and a switch 1233.

The duplexer 1231 may be configured to separate signals into a signal in a transmission band and a signal in a reception band. In this case, the signals in the transmission band that are transmitted through the first and second power amplifiers 1210 and 1220 are applied to the first and fourth antennas ANT1 and ANT4, respectively, through a first output port of the duplexer 1231. On the contrary, signals in a reception band received through the antennas ANT1 and ANT4 are received by the low noise amplifiers 310 and 340 through a second output port of the duplexer 1231.

The filter 1232 may be configured to allow a signal in the transmission band or the reception band to pass through and to block a signal in a band other than the transmission band and the reception band. In this case, the filter 1232 may include a transmission filter connected to the first output port of the duplexer 1231 and a reception filter connected to the second output port of the duplexer 1231. Alternatively, the filter 1232 may be configured to pass only the signal in the transmission band or only the signal in the reception band according to a control signal.

The switch 1233 may be configured to transmit only one of a transmission signal and a reception signal. In an embodiment of the present disclosure, the switch 1233 may be configured in a single-pole double-throw (SPDT) type to separate a transmission signal and a reception signal in a time division duplex (TDD) scheme. In this case, the transmission signal and the reception signal are signals of the same frequency band, and thus the duplexer 1231 may be implemented as a type of circulator.

Meanwhile, in another implementation of the present invention, the switch 1233 may also be applied to a frequency division multiplex (FDD) scheme. In this case, the switch 1233 may be configured in the form of a double-pole double-throw (DPDT) to connect or block a transmission signal and a reception signal, respectively. On the other hand, the transmission signal and the reception signal may be separated by the duplexer 1231, and thus the switch 1233 is not necessarily required.

Meanwhile, the electronic device according to the implementation may further include a modem 1400 corresponding to the controller. In this case, the RFIC 1250 and the modem 1400 may be referred to as a first controller (or a first processor) and a second controller (a second processor), respectively. On the other hand, the RFIC 1250 and the modem 1400 may be implemented as physically separated circuits. Alternatively, the RFIC 1250 and the modem 1400 may be logically or functionally distinguished from each other on one physical circuit.

The modem 1400 may perform controlling of signal transmission and reception and processing of signals through different communication systems using the RFID 1250. The modem 1400 may acquire control information from the 4G base station and/or the 5G base station. Here, the control information may be received through a physical downlink control channel (PDCCH), but may not be limited thereto.

The modem 1400 may control the RFIC 1250 to transmit and/or receive signals through the first communication system and/or the second communication system at a specific time and frequency resources. Accordingly, the RFIC 1250 may control transmission circuits including the first and second power amplifiers 1210 and 1220 to transmit a 4G signal or a 5G signal at a specific time interval. In addition, the RFIC 1250 may control reception circuits including the first to fourth low noise amplifiers 1310 to 1340 to receive a 4G signal or a 5G signal at a specific time interval.

Meanwhile, in a multi-transceiving system of FIG. 2B, a transmitter and a receiver of each radio system may be integrated into a single transceiver. This has an advantage of eliminating a circuitry part where two types of system signals are integrated with each other at an RF front-end.

In addition, since the front-end component can be controlled by the integrated transceiver, the front-end component can be more efficiently integrated than that in a case where the transceiving system is separated for each communication system. The multi-transceiving system as shown in FIG. 2B may control other communication systems as needed, thereby minimizing system delay due to this, and thus there is an advantage in that efficient resource allocation is possible.

Meanwhile, the first power amplifier 1210 and the second power amplifier 1220 may operate in at least one of the first and second communication systems. In this regard, when the 5G communication system operates in the 4G band or the Sub-6 band, the first and second power amplifiers 1210 and 1220 can operate in both the first and second communication systems.

On the other hand, when the 5G communication system operates in a millimeter wave (mmWave) band, one of the first and second power amplifiers 1210 and 1220 may operate in the 4G band and the other in the millimeter-wave band.

Figure 5A:
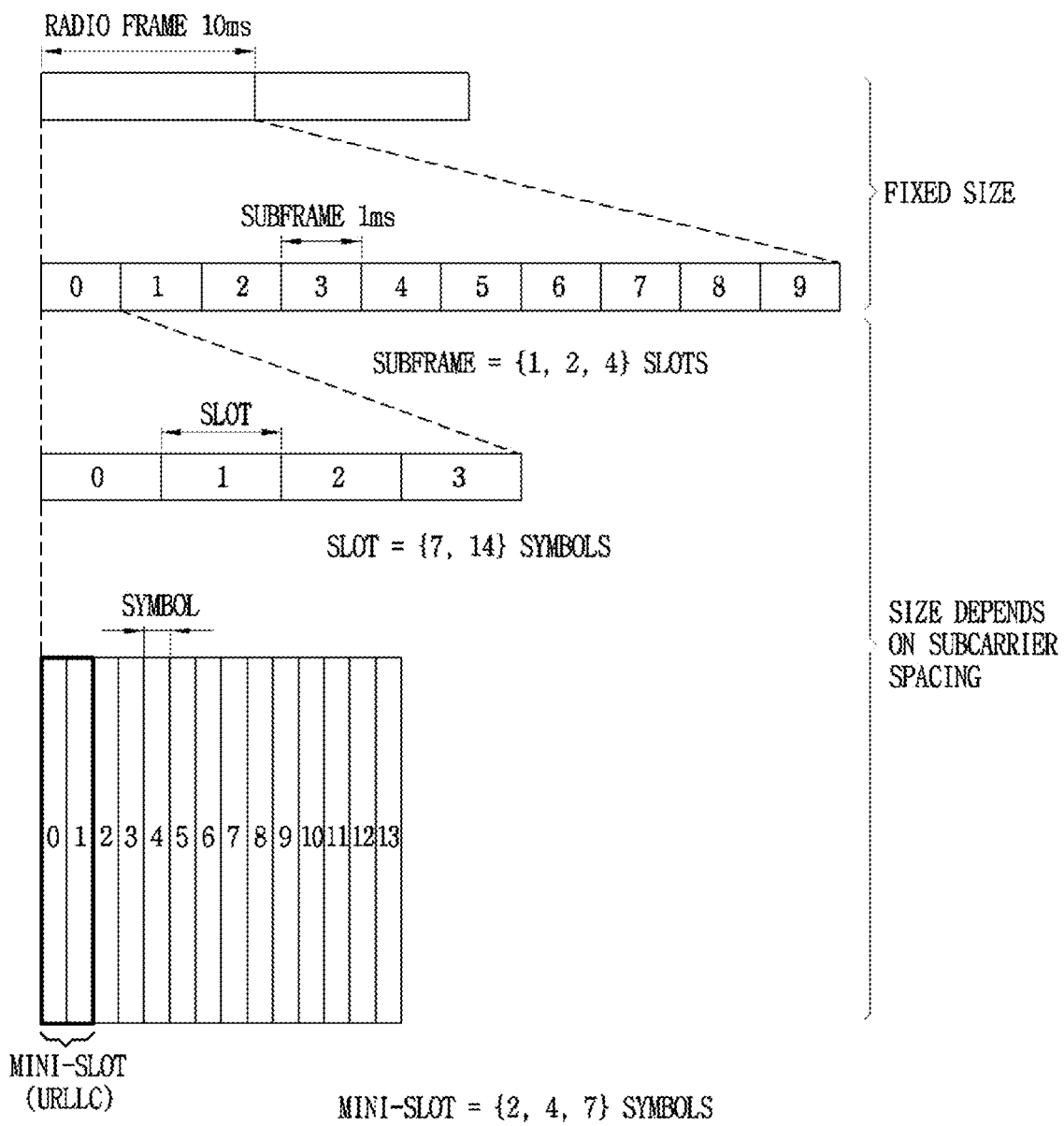
FIG. 5A is a view illustrating an example of a frame structure in NR.

On the other hand, two different wireless communication systems may be implemented with one antenna using an antenna that serves for both transmission and reception by integrating a transmission unit and a reception unit. Here, 4×4 MIMO may be implemented using four antennas as shown in FIG. 5A. In this case, 4×4 DL MIMO may be performed through downlink (DL).

In this regard, MIMO is a key technology to improve the throughput. In this regard, FIG. 2C is a diagram illustrating a MIMO configuration and a MIMO+carrier aggregation (CA) configuration between a UE and a base station (BS) in accordance with one embodiment. Referring to FIG. 2C, 4×4 MIMO requires four Tx antennas at the base station and four Rx antennas at the UE. In addition, if the four antennas of the base station operate as Rx antennas, the four antennas of the UE operate as Tx antennas. Thus, 4×4 MIMO can double a data rate (or capacity) compared to 2×2 MIMO.

It uses multiple antennas both on the transmitter and receiver sides, so as to enable multi-layer data transmission. NR supports multi-layer data transmission for a single UE (single-user MIMO) with a maximum of eight transmission layers for DL and four for UL. NR also supports multi-layer data transmission to multiple UEs on different layers (multi-user MIMO) using a maximum of twelve transmission layers for DL and UL transmissions.

Reference Signals (RSs) are specified by assuming multi-layer transmissions. For demodulation of date/control information for both uplink and downlink, demodulation RS (DM-RS) is supported. For measurement of channel state information of downlink, channel state information RS (CSI-RS) is supported. CSI-RS is also used for mobility measurement, measurement of gNB transmission beamforming, and frequency/time tracking. The CSI-RS used for the frequency/time tracking is named as tracking RS (TRS). In a high frequency range, phase noise is a problem that degrades the transmission performance. A phase tracking reference signal (PT-RS) is applied with respect to PDSCH and PUSCH to enable a receiver to track the phase and mitigate performance loss due to the phase noise. For uplink channel sounding, sounding RS (SRS) is supported.

For UL multi-layer data transmission, both codebook based precoding and non-codebook based precoding are supported. In codebook based UL transmission, precoding matrix applied for PUSCH transmission is selected by gNB. In non-codebook based UL transmission, precoded multiple SRS are transmitted and then the gNB selects a desired transmission layer for PUSCH based on the reception of the SRS.

Since NR supports a multi-beam operation where every signal/channel is transmitted on directional beam, beamforming is an important technique for achieving higher throughput and sufficient coverage especially in a high frequency range. For DL transmission beamforming, a gNB applies transmission beamforming to SS/PBCH block and/or CSI-RS transmissions, and a UE measures reference signal received power on a physical layer (L1-RSRP) on the configured SS/PBCH block and/or CSI-RS resource. The UE reports an SS/PBCH block or CSI-RS resource with a maximum L1-RSRP value as L1-RSRP beam reporting. The gNB may decide gNB transmission beamforming for the UE based on the reported L1-RSRP. For PDCCH/PDSCH transmission, the gNB informs the UE that the gNB transmission beamforming applied to a certain SS/PBCH block or CSI-RS resource is applied to the PDCCH/PDSCH transmission so that the UE can apply reception beamforming which fits into the gNB transmission beamforming. For UL transmission beamforming, two mechanisms are supported. In one of the mechanisms, the UE transmits multiple SRS symbols with different UE transmission beamforming so that the gNB can measure them and identify the best UE transmission beamforming. In another mechanism, the UE generates UL transmission beamforming which is the same as DL reception beamforming used for SS/PBCH block or CSI-RS resource reception. In addition, beam failure recovery (BFR) is supported to achieve quick recovery from the beam failure. The UE can identify the beam failure and informs the gNB of the index of SS/PBCH block or CSI-RS resource as new candidate beam.

For DL channel state information (CSI) acquisition, NR supports two precoding matrix indicator (PMI) definitions, type I and II codebooks that provide different levels of CSI granularity.

With respect to carrier aggregation (CA), 5-CA that aggregates up to 5 bands may be applied. The CA may be applied in combination with MIMO. Referring to FIG. 2C, 4-CA and 1-4×4 MIMO (2.6 GHZ) may support up to 800 Mbps. In this regard, 4-CA may be supported for Bands 1, 3, 5, and 7. Bands 1, 3, 5, and 7 may have bandwidths of 10, 20, 10, and 20 MHz, respectively. 4×4 MIMO may be applied to Band 7.

Meanwhile, 3-CA and 2-4×4 MIMO (2.6 GHz and 1.8 GHZ) may support up to 900 Mbps. 3-CA may be supported for Bands 3, 5, and 7. 4×4 MIMO may be applied to Band 7.

Meanwhile, 4-CA and 2-4×4 MIMO supporting 1 Gbps may be supported. 4-CA may be supported for Bands 1, 3, 5, and 7. Bands 1, 3, 5, and 7 may have bandwidths of 10, 20, 10, and 20 MHz, respectively. 4×4 MIMO may be applied to Bands 3 and 7. In addition, 5-CA and 3-4×4 MIMO supporting 1.2 Gbps may be supported.

By aggregating 5 carriers and applying 256 QAM and 4×4 MIMO in all bands, a data rate can be improved up to 1.4 Gbps. However, a 4.5G or 5G data rate may be gradually improved depending on processing performance of a UE in use (e.g., the number of data streams that can be simultaneously processed).

The combination of CA and MIMO may be applied to 5G NR in addition to 4G LTE. CA and MIMO for 4G LTE or 5G NR may be referred to as intra-CA+MIMO. On the other hand, CA and MIMO for both 4G LTE and 5G NR may be referred to as inter-CA+MIMO.

Meanwhile, when the 5G band is a Sub6 band, first to fourth antennas ANT1 to ANT4 may be configured to operate in both the 4G band and the 5G band. In this regard, UL-MIMO and/or DL-MIMO may be performed through the first to fourth antennas ANT1 to ANT4.

In the case of PC2 UE having two transmitting antennas in a closed-loop spatial multiplexing scheme, maximum output power for all transmission bandwidths in a channel bandwidth may be specified. These maximum output power requirements may comply with the specified UL-MIMO configuration. For UE supporting UL-MIMO, the maximum output power may be measured as the sum of maximum output power at each UE antenna connector. A measurement period may be defined as at least one subframe (1 ms), but is not limited thereto. In the case of UE having two transmitting antennas in a closed-loop spatial multiplexing scheme, the maximum power reduction (MPR) allowable for maximum output power may be specified. In the case of UE having two transmitting antennas in a closed loop spatial multiplexing scheme, a specific additional maximum output power reduction (A-MPR) value may be applied to specific maximum output power. In the case of UE supporting UL-MIMO, transmission power may be configured for each UE. Definitions of the configured maximum output power $P_{CMAX,c}$, a lower limit $P_{CMAX\_L,c}$ and an upper limit $P_{CMAX\_H,c}$ may be applied to the UE supporting UL-MIMO.

Regarding the output power adjustment (dynamics) for UL-MIMO, the minimum output power for the UL-MIMO, transmission OFF power, transmission ON/OFF time mask, and power control may be applied. For UE having two transmitting antennas in a closed-loop spatial multiplexing scheme, the minimum output power is defined as the sum of an average power of each transmitting antenna in one subframe (1 ms). It may be controlled so that the minimum output power does not exceed a specific value.

If a 5G band is a mmWave band, UL-MIMO and/or DL-MIMO may be performed in the mmWave band through the first to fourth antennas ANT1 to ANT4. The operating band for UL-MIMO may be at least one of n257, n258, n260, and n261 bands. Transmission power for UL-MIMO may be defined. UE maximum power for UL-MIMO may be defined for each power class (PC). For PC1 UE, the UE maximum power may be defined as the maximum output power radiated by the UE using UL-MIMO for all transmission bandwidths within a channel bandwidth for non-CA configuration.

For each of PC1 UE to PC4 UE, the UE minimum peak EIRP (dBm) for UL-MIMO, UE maximum power limit, and UE spherical coverage may be defined for each band. In relation to these requirements, a measurement period may be at least one subframe (1 ms).

Meanwhile, a channel bandwidth for UL-MIMO and UE maximum power for modulation may be defined for each power class (PC). Regarding the output power adjustment (dynamics) for UL-MIMO, the minimum output power for the UL-MIMO, transmission OFF power, transmission ON/OFF time mask, and power control may be applied.

Each of the first to fourth antennas ANT1 to ANT4 may be configured as an array antenna. Meanwhile, 2×2 MIMO may be implemented using two antennas connected to the first power amplifier 1210 and the second power amplifier 1220 among the four antennas. At this time, 2×2 UL MIMO (2 Tx) may be performed through uplink (UL). Alternatively, the present disclosure is not limited to 2×2 UL MIMO, and may also be implemented as 1 Tx or 4 Tx. In this case, when the 5G communication system is implemented with 1 Tx, only one of the first and second power amplifiers 1210, 1220 may operate in the 5G band. Meanwhile, when the 5G communication system is implemented with 4Tx, an additional power amplifier operating in the 5G band may be further provided. Alternatively, a transmission signal may be branched in each of one or two transmission paths, and the branched transmission signal may be connected to a plurality of antennas.

Figure 3A:
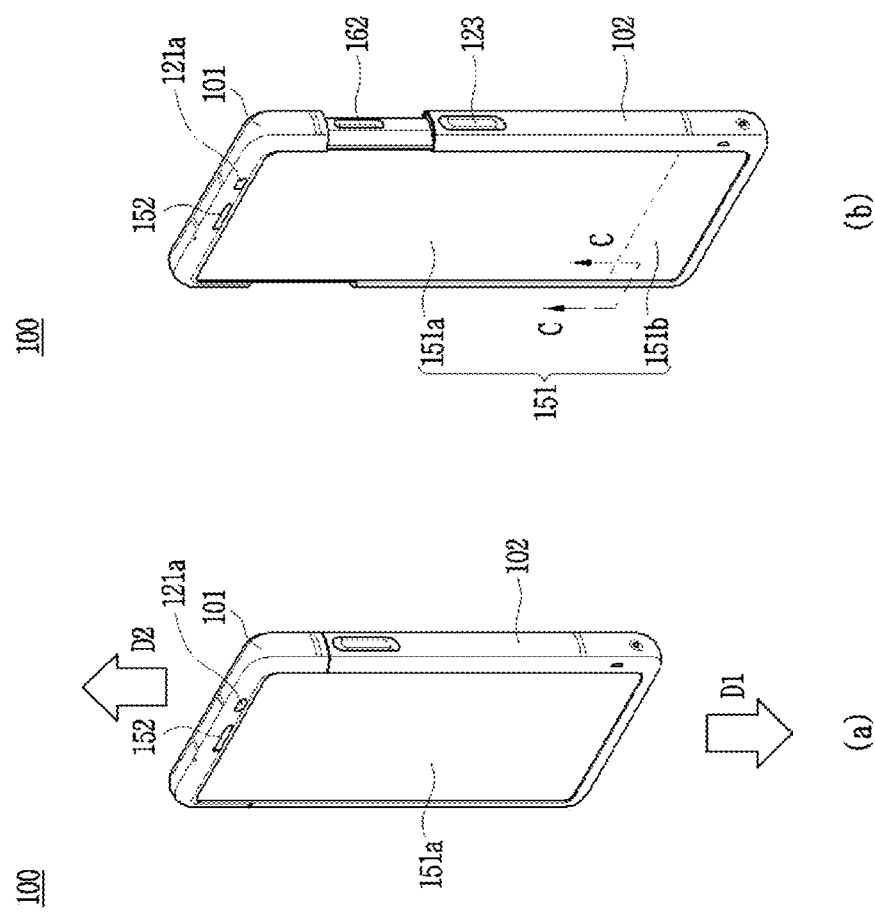
FIGS. 3A and 3B are views illustrating a mobile terminal 100 that may change in size.
Figure 3B:
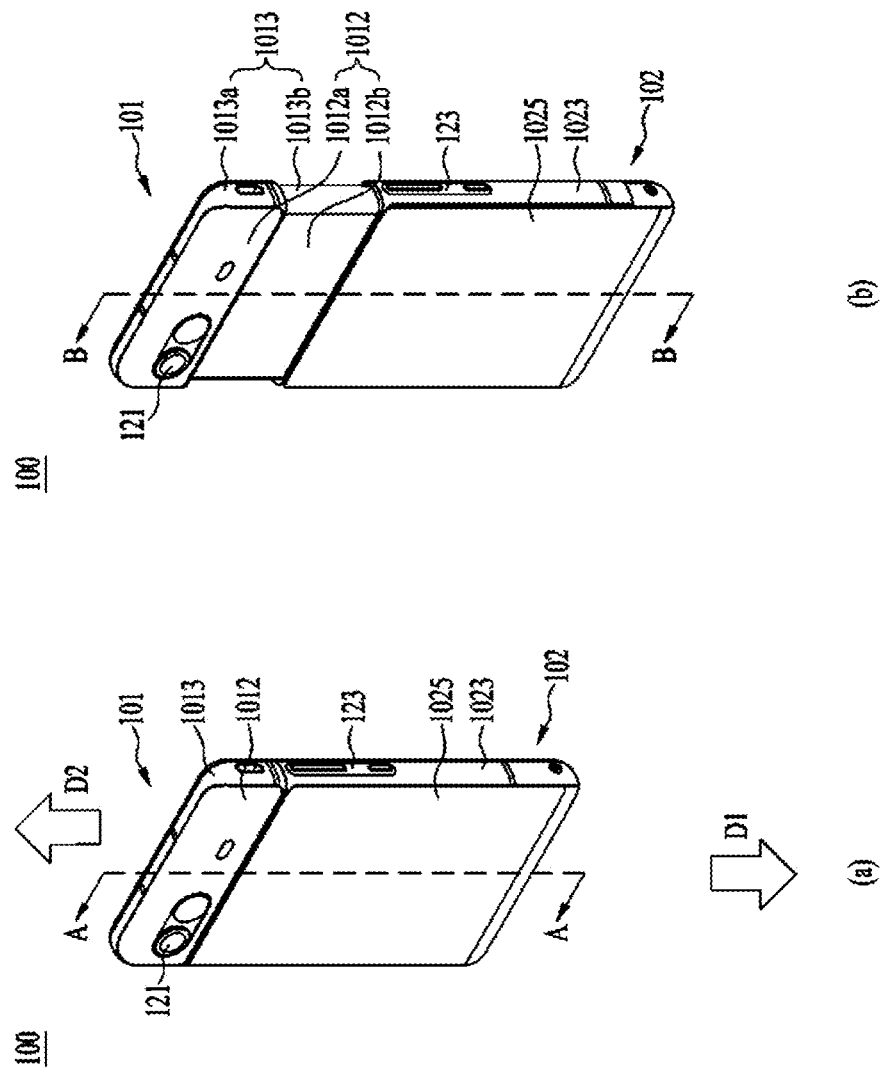

FIGS. 3A and 3B are views illustrating a mobile terminal 100 that may change in size. FIG. 3A is a front view of a first state and a second state of the mobile terminal 100, and FIG. 3B is a rear view of the first state and the second state of the mobile terminal 100. The mobile terminal 100 includes frames 101 and 102 that slide relative to each other to change a size of the mobile terminal 100. The frames include a first frame 101, and a second frame 102 that is slidable relative to the first frame 101. When the second frame 102 moves in a first direction D1, the mobile terminal 100 is switched to an expanded state (second state). On the other hand, when the second frame 102 moves in a second direction opposite to the first direction, the mobile terminal 100 is switched to a retracted state (first state).

The movement of the second frame 102 is a relative movement to the first frame 101. Based on the second frame 102, the mobile terminal 100 is switched to the expanded second state when the first frame 101 is slid in the second direction D2, while being switched to the retracted first state when the first frame 101 is slid in the first direction D1.

As in the embodiment of the present disclosure, when the first frame 101 and the second frame 102 are disposed up and down, since a user grips the lower second frame 102, the first frame 101 moves upward from the user's perspective, and thus it may be recognized that the mobile terminal 100 is expanded upward.

In the following description, a direction that the mobile terminal 100 and the display 151 extend or enlarge is referred to as the first direction D1, a direction that the mobile terminal 100 and the display 151 are contracted, retracted or reduced to be switched from the second state to the first state is referred to as the second direction, and directions perpendicular to the first and second directions are referred to as third and fourth directions. In the drawings, the first and second directions are vertical and the third and fourth directions are horizontal, but the first and second directions may be horizontal and the third and fourth directions may be vertical depending on the placement of the mobile terminal 100.

(a) of FIG. 3A and (a) of FIB. 3B illustrate the first state as the retracted state, and (b) of FIG. 3A and (b) of FIG. 3B illustrate the second state as the expanded state. As in the state that the second frame 102 is expanded by sliding in the first direction, an overlap portion is present between the first frame 101 and the second frame 102.

In the first state, the first frame 101 and the second frame 102 may be configured such that one of the first frame 101 and the second frame 102 is located outside while surrounding the other, or may be configured in a shape in which the first frame 101 has a portion located outside and the second frame 102 has a portion located outside.

In order to expand the mobile terminal 100 by moving the second frame 102 relative to the first frame 101, the first frame 101 and the second frame 102 partially overlap each other. At least one of the first frame 101 or the second frame 102 may include a portion that is located inside in the retracted state of the mobile terminal 100 and then exposed to outside when the mobile terminal 100 is expanded. A rear surface and side surfaces of the mobile terminal 100 may include portions that are located inside another member in the first state and selectively exposed when switched to the second state. In the embodiment, the externally-exposed portion of the second frame may be constant, and the first frame may include an always externally-exposed portion and a selectively-exposed portion.

As illustrated in (b) of FIG. 3, an extended front surface of the mobile terminal in the extended second state is covered with the display 151, such that the inside of the mobile terminal 100 is not exposed.

Depending on whether the frames 101 and 102 of the mobile terminal 100 expand, an area of the display 151 located on the front surface of the mobile terminal 100 may vary. A front surface of the display 151 may have a larger area in the second state than that in the first state. The display 151 includes a fixed part 151a that is fixed to a front surface of the first frame 101 and always located on the front surface of the mobile terminal 100 regardless of the state of the mobile terminal 100, and a variable part 151b that is located on the front surface or a rear surface depending on whether the fixed part 151a and the mobile terminal 100 expand.

The fixed part 151a is coupled to the front surface of the first frame 101 of the display 151 and always located on the front surface, so as to define a portion of a front surface portion. The fixed part 151a is fixed to the first frame 101 and thus maintains a constant shape without a change in a bent (or curved) degree (level). On the other hand, the variable part 151b indicates a bent portion which changes in angle or position. In the second state of the mobile terminal, the variable part moves to the front surface such that the fixed part and the variable part are all located on the front surface portion.

The variable part 151b includes side surface portions located in a lateral (surface) direction of the mobile terminal 100, and positions of the side surface portions vary depending on the position of the second frame 102. With respect to the side surface portions, an area of a region of the variable part located on the front surface and an area of a region located on the rear surface vary. The variable part 151b may partially be a front surface portion and partially be a rear surface portion depending on the first state and the second state.

With respect to the mobile terminal 100, the variable part 151b is located in the first direction with respect to the fixed part 151a, and an end portion of the variable part 151b is bent toward the rear surface of the mobile terminal 100 to be slid on the rear surface of the second frame 102.

A slide frame 103 is coupled to the end portion of the variable part 151b of the display 151 such that the end portion is guided to be slid on the rear surface of the second frame 102. The slide frame 103 moves in the first direction on the second frame 102 at the same time when the second frame 102 moves in the first direction. Therefore, the slide frame 103 moves with respect to the first frame 101 by a distance twice a movement distance with respect to the second frame 102.

In such a way, the display 151 may be configured as a flexible display 151 that is bent such that the variable part 151b of the display 151 can move toward the front surface or the rear surface. The flexible display 151 is a display that can be maintained in a flat state like the existing flat display, and also can be bent, curved, folded, twisted, or rolled like paper. The flexible display 151 denotes a solid display that is manufactured on a thin and flexible substrate and thus is light and not breakable. The flexible display 151 may be bent in a specific direction like paper. The flexible display according to the present disclosure may be disposed such that a radius of curvature thereof changes in the first direction.

In addition, an electronic paper is a display to which general ink characteristics are applied, and is different from the existing flat panel display in view of using reflected light. The electronic paper may change information by using a twist ball or electrophoresis (electrophoresis) using a capsule. In a state where the flexible display 151 is not deformed (e.g., a state having an infinite radius of curvature, hereinafter, referred to as a default state), the display region of the flexible display is flat. When the default state is switched to a state where the flexible display is deformed by an external force (e.g., a state having a finite radius of curvature, hereinafter, referred to as a deformed state), the display region may be curved. As illustrated in the drawing, information displayed in the deformed state may be visual information output on a curved surface. Such visual information is realized by independently controlling an emission of unit pixels (sub-pixels) arranged in a matrix form. The unit pixel denotes an elementary unit for representing one color. In this case, when an external force is applied to the flexible display 151, the flexible display 151 may be deformed from the default state as a flat state into a curved state not the flat state.

Meanwhile, the flexible display unit 151 may be combined with a touch sensor to implement a flexible touch screen. When a touch is input to the flexible touch screen, the controller 180 (see FIG. 1) may perform a control corresponding to the touch input. The flexible touch screen may be configured to sense a touch input even in the deformed state as well as the default state.

A touch sensor senses a touch (or a touch input) applied to the touch screen using at least one of a variety of touch methods. Examples of such touch methods include a resistive type, a capacitive type, an infrared type, an ultrasonic type, and a magnetic field type, among others.

As one example, the touch sensor may be configured to convert changes of pressure applied to a specific part of the display 151 or capacitance occurring at the specific part, into electric input signals. The touch sensor may be configured to detect a touch position, a touch area, touch pressure, touch capacitance, and the like, by a touch object applying a touch onto the touch screen.

On the other hand, the mobile terminal 100 may include a deformation sensor which senses the deformation of the flexible display 151. The deformation sensor may be included in the sensing unit 140 (see FIG. 2A).

The deformation sensor may be provided in the flexible display 151 or cases (a first frame 101 and a second frame 102 to be described later) to sense information related to the deformation of the flexible display 151. Here, the information related to the deformation of the flexible display 151 may be a deformed direction, a deformed degree, a deformed position, a deformed time, an acceleration that the deformed flexible display 151 is restored, and the like. In addition to those, such information may be various information which can be sensed in response to curving of the flexible display 151.

In addition, the controller 180 may change information displayed on the flexible display 151 or generate a control signal for controlling the function of the mobile terminal 100 based on the information related to the deformation of the flexible display 151 detected by the deformation detecting unit.

The deformation of the flexible display 151 may vary depending on the positions of the first frame 101 and the second frame 102. As illustrated in FIG. 3A, since a position where the flexible display 151 is bent is determined according to the positions of the first frame 101 and the second frame 102, a position where the flexible display 151 is to be bent and an area of the flexible display 151 on the front surface may be calculated not by the deformation detecting unit of the flexible display 151 but according to the positions of the first frame 101 and the second frame 102.

The switching of the state (first or second state) of the flexible display 151, namely, the change in the size of the display 151 on the front surface and the rear surface of the mobile terminal 100 according to the change in the size of the mobile terminal 100 may be manually performed by force applied by the user, but the present disclosure may not be limited to the manual method. For example, when the mobile terminal 100 or the flexible display 151 is in the first state, the flexible display 151 may be deformed to the second state by a command of the user or an application, without external force applied by the user. In this way, to automatically deform the flexible display 151 without external force, the mobile terminal 100 may include a driving unit 200 to be explained later.

The flexible display 151 is bent by 180 degrees while rolling around a side portion of the mobile terminal 100 in the first direction. Accordingly, one portion of the flexible display 151 is disposed on the front surface of the mobile terminal, based on the side portion of the mobile terminal 100, and another portion of the flexible display 151 is disposed on the rear surface of the mobile terminal 100. For convenience of explanation, the portion of the flexible display unit 151 located on the front surface is referred to as a front surface portion, and the another portion located on the rear surface is referred to as a rear surface portion. The mobile terminal, as illustrated in FIG. 3A, may be expanded in the first direction or retracted in the second direction opposite to the first direction. In this case, a region of the flexible display 151 located on the front surface changes. That is, the front surface portion and the rear surface portion may change in size depending on the change in the state of the mobile terminal.

Also, the flexible display 151 may be rolled onto or unrolled from the side portion of the mobile terminal in the first direction. Accordingly, the portion disposed on the rear surface of the mobile terminal 100 may be moved, so as to adjust the size of the region of the display unit 151 disposed on the front surface of the mobile terminal 100. Since the flexible display 151 has a fixed area and one continuous body, when the area of the front surface portion increases, the area of the rear surface portion decreases. Thus, the display 151 may be rolled into the second frame 102 movable relative to the first frame 101, more precisely, into the side portion of the second frame 102 in the first direction. The display 151 may be pulled out (withdrawn) from or pushed (inserted) into the second frame 102 while being rolled on the second frame 102 along a moving direction of the second frame 102, so as to adjust the area of the display 151 on the front surface of the mobile terminal 100.

The variable part 151*b* requires a support structure on the rear surface in order to maintain the flat state because it is flexible. A rolling hinge may be further provided to support the rear surface of the variable part 151*b*. The rolling hinge may be bendable while the variable part 151*b* is bent and may allow the variable part 151*b* to be maintained in the flat state.

The rolling hinge 104 may be located on the rear surface of the variable part 151*b* of the display 151, and may support the variable part 151*b* to be bent in the first direction but maintained flat without being bent in the third direction. The rolling hinge 104 may include a plurality of support bars extending in the third direction. The plurality of support bars may be disposed in parallel in the first direction. The rolling hinge 104 may be bent together with the variable part 151*b* through a change in angle between the support bars. Both end portions of the support bar may include slide hooks that guide the movement of the display 151 while moving along slide rails disposed on the second frame 102.

A rolling seat located between the support bar and the display 151 may include a cuff pattern configured by a plurality of slits which extend in the third direction to facilitate the deformation in the first direction. The cuff pattern, which has the slits extending in the third direction and are disposed in a zigzag form, restricts the deformation in the third direction while allowing bending in the first direction.

The second frame 102 may include a roll bracket 1028 (see FIG. 4) having a curved surface therein. There is no limitation in position of the roll bracket 1028, but the roll bracket 1028 may be disposed on the end portion of the second frame 102 in the first direction in order to provide a screen with the largest size on the front surface. The roll bracket 1028 may have a bar-like shape that has a curved surface, on which the display 151 can be rolled, and extends in the third direction perpendicular to the first direction.

Also, in order to suppress damage on the display 151 rolled on the roll bracket 1028, a side frame 1024 may be disposed on the end portion of the second frame 102 in the first direction.

Figure 4A:
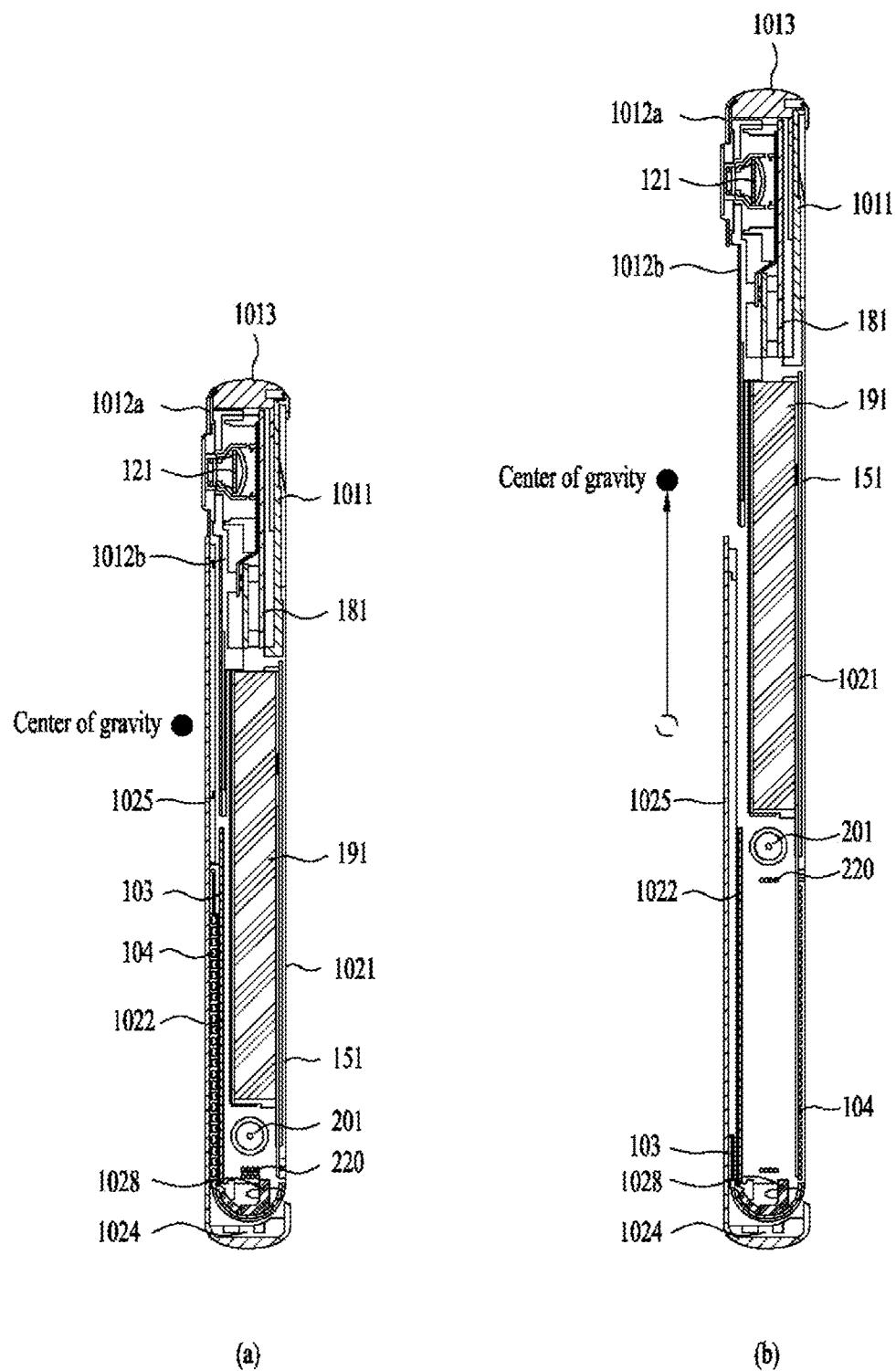
FIG. 4A is a lateral sectional view according to one embodiment of the present disclosure, which illustrate a section taken along the line A-A, and a section taken along the line B-B of FIG. 3B.
Figure 4B:
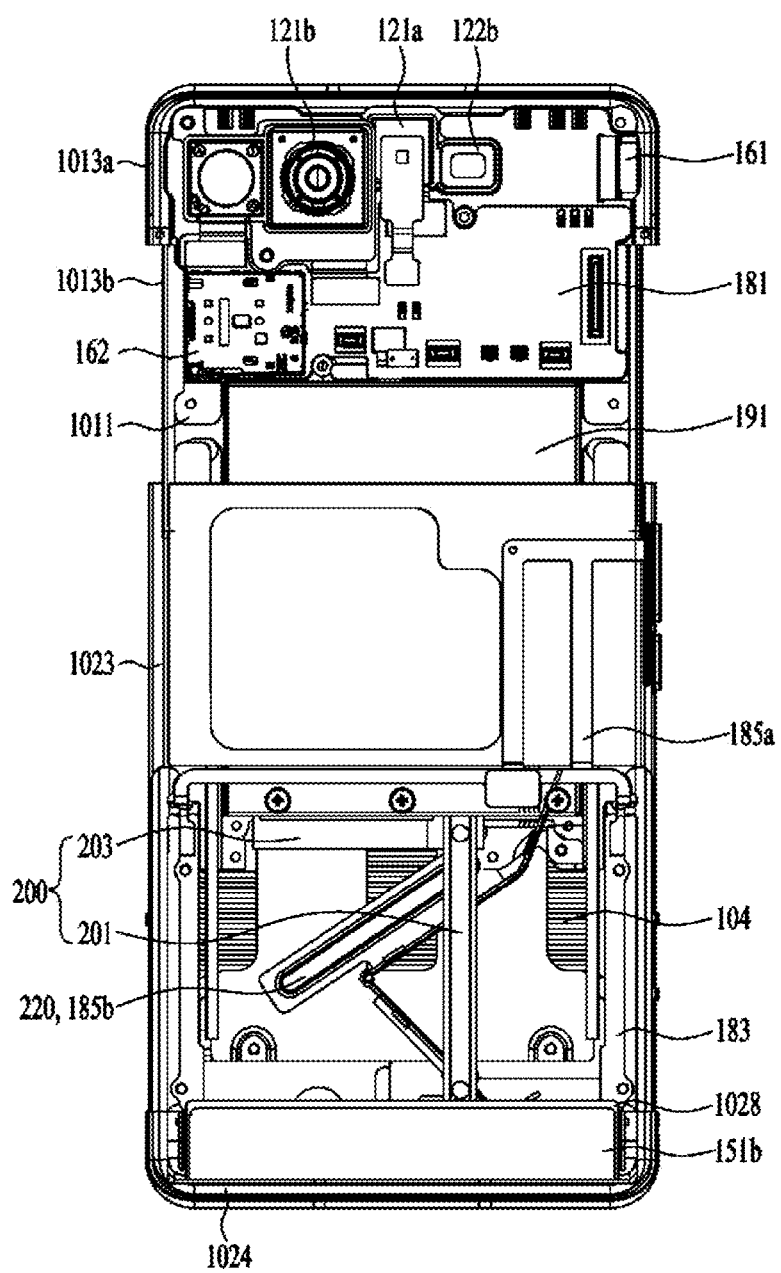
FIG. 4B is a rear view illustrating internal components in a second state of the embodiment of FIG. 4A.

FIG. 4A is a lateral sectional view according to one embodiment of the present disclosure, which illustrate a section taken along the line A-A, and a section taken along the line B-B of FIG. 3B. FIG. 4B is a rear view illustrating internal components in a second state of the embodiment of FIG. 4A. This embodiment illustrates an example in which a battery 191 is mounted in the first frame 101. The battery 191 may be disposed between a first front portion 1011 and a first rear portion 1012 of the first frame 101, and a space open to the bottom of the rear portion 1012 in the second state may be covered with a rear cover 1025.

As in the embodiment of the present disclosure, when the battery 191 is located in the first frame 101, types of components to be mounted in the second frame 102 may be limited, for example, to side antennas and the user input unit 123 or a coil antenna 114 on the rear surface because most of components are located in the first frame 101. Also, since the battery 191 and the main substrate 181 are disposed in the first frame 101, the configuration of a signal connection part 185*b* for connecting each component can be more simplified.

In this embodiment, when the mobile terminal 100 is switched to the second state, an empty space is defined below the battery 191. The second frame 102 which surrounds front and rear sides of the battery 191 moves in the first direction, and supports the rear surface of the variable part 151*b* which has moved to the front surface. The second frame 102 located on the rear surface of the variable part 151*b* forms an empty space therein in the second state. Accordingly, when great force is applied to the front surface, a bending phenomenon may occur. In order to increase support force of the second frame 102, a support link 220 that is unfolded at an expanded portion may further be disposed. The support link 220 is folded in the first state to minimize a mounting space and unfolded in the second state to reinforce rigidity of the expanded portion.

Since the battery 191 is located in the first frame 101, the driving unit 200 may be located in the first direction compared to the battery 191 and may guide the sliding motion between the first frame 101 and the second frame 102.

In this embodiment, a drive motor 201 is located in the first frame 101, a rack gear 203 is located in the second frame 102. The rack gear 203 and the second frame 102 move in the first direction relative to the first frame 101. Since the drive motor 201 is biased to the first direction, the drive motor 201 may be located in the first frame 101 and the rack gear 203 in the second frame, in consideration of a movement space of the rack gear 203.

As in the embodiment, when the battery 191 is disposed in the first frame 101, most of components are disposed in the first frame 101. When the mobile terminal 100 is expanded, the center of gravity is biased to one side. In particular, as in the present disclosure, when the first frame 101 and the second frame 102 are disposed up and down, the center of gravity is moved upward as illustrated in (b) of FIG. 4A, upon an upward movement of the first frame 101. In the state where the user grips the lower portion (second frame) of the mobile terminal, when the center of gravity is moved upward, the user may easily drop the mobile terminal from the hand.

To solve the problem, it is necessary to dispose components inside the frame to be dispersively located in the second state, in order to minimize the movement of the center of gravity even in the second state.

Figure 4C:
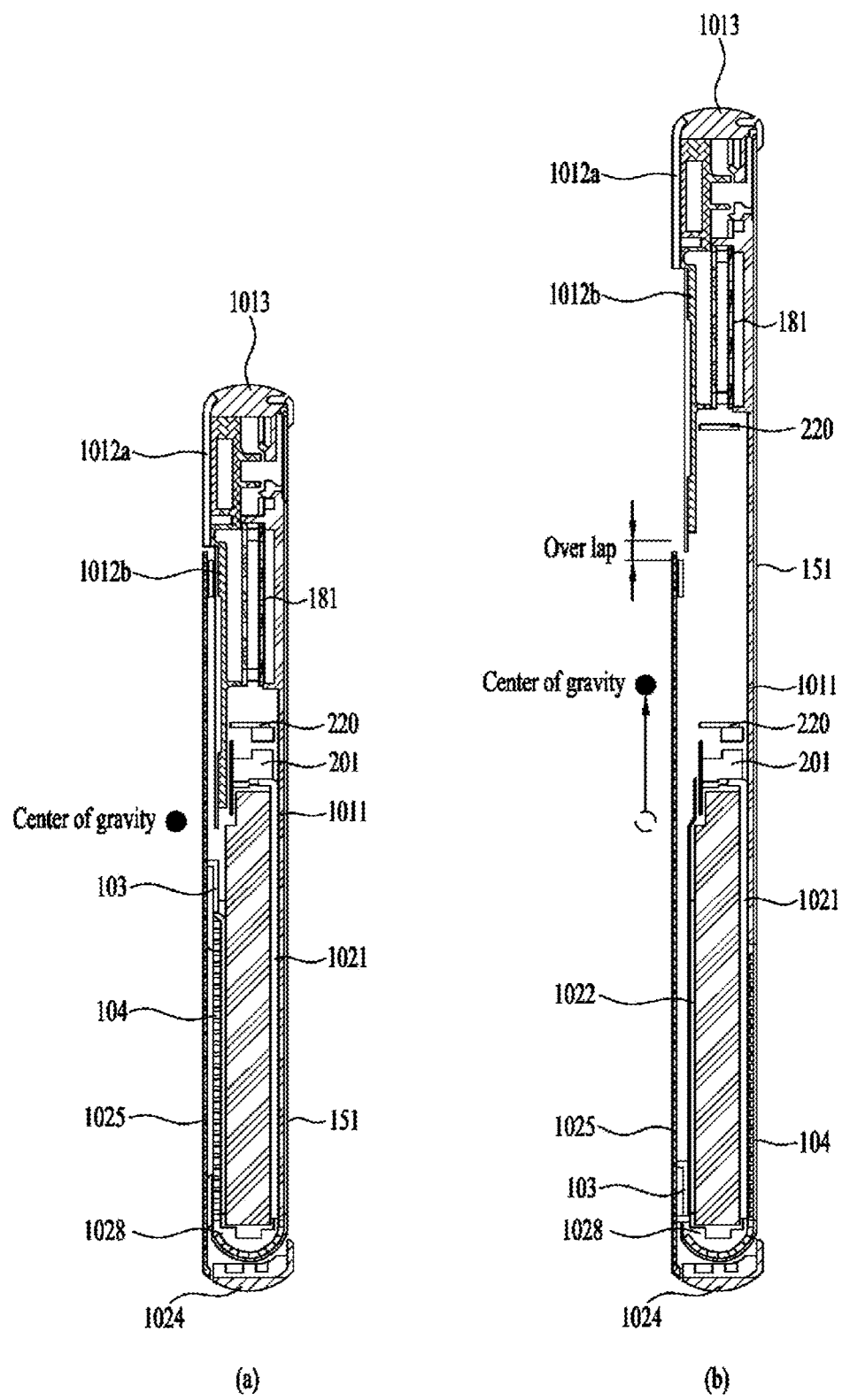
FIG. 4C illustrates another embodiment of the sectional views taken along the lines A-A and B-B of FIG. 3A.
Figure 4D:
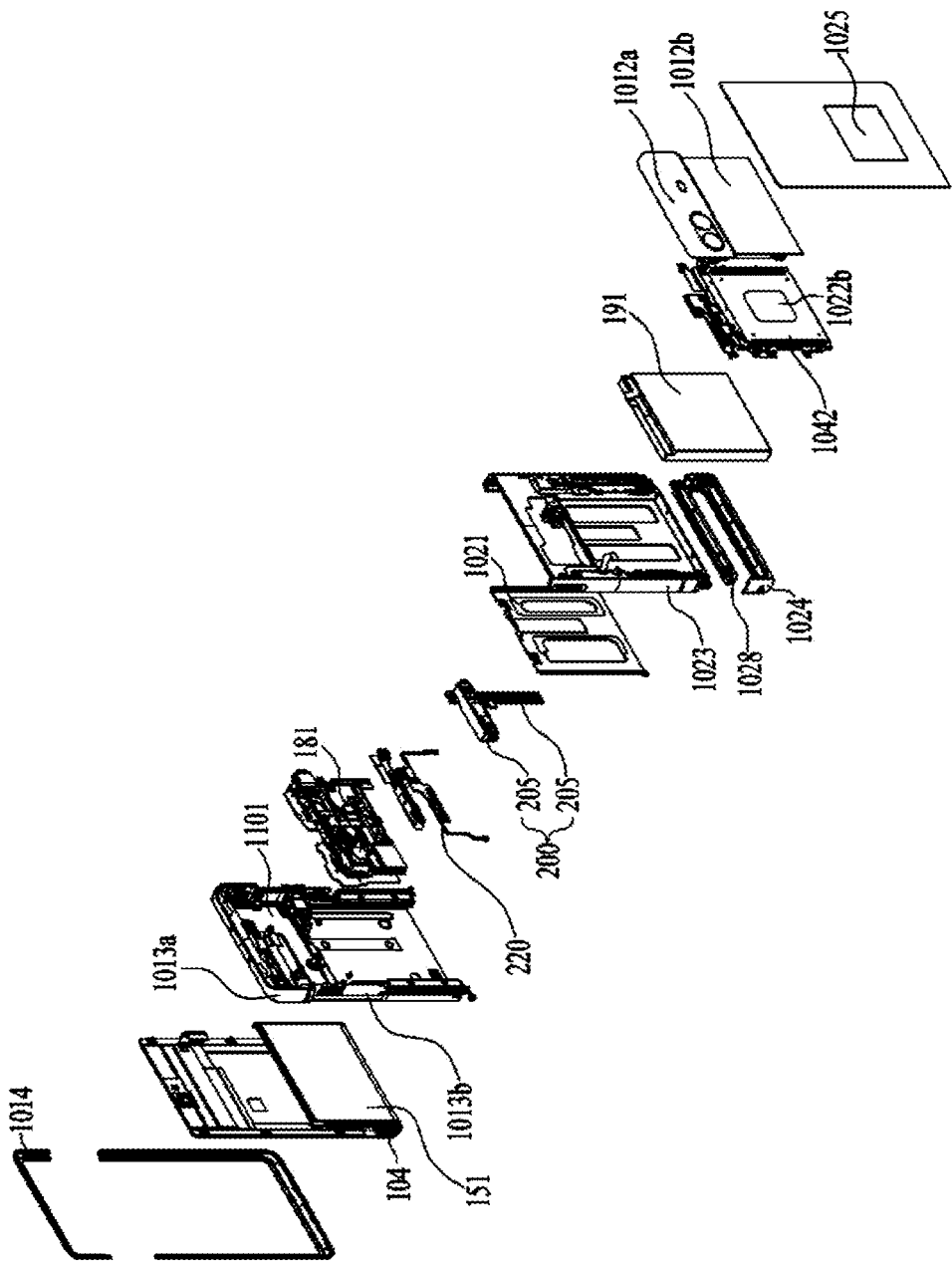
FIG. 4D is an exploded perspective view of the embodiment of FIG. 4C.

As illustrated in FIG. 4C, the battery 191 may be disposed in the second frame of the mobile terminal 100 to minimize the movement of the center of gravity when switched to the second state. FIG. 4C illustrates another embodiment of the sectional views taken along the lines A-A and B-B of FIG. 3A, and FIG. 4D is an exploded perspective view of the embodiment of FIG. 4C.

Hereinafter, each component of the mobile terminal 100 according to the embodiment will be described in more detail, with reference to FIGS. 4C and 4D.

The first frame 101 includes a first front portion 1011 located on the front of the mobile terminal 100 and coupled with the fixed part 151a of the display 151, and a first rear portion 1012 located on the rear of the mobile terminal 100. The first rear portion 1012 may include a first rear surface 1012a that is always exposed to the outside, and a second rear surface 1012b that is exposed to the outside only in the expanded state. The second rear surface 1012b, as illustrated in FIG. 3, is not exposed to the outside in the first state by being covered with the rear cover 1025 of the second frame 102, and exposed to the outside in the second state.

The second frame 102 includes a second front portion 1021 located on the front, and a second rear portion 1022 located on the rear of the mobile terminal 100. The second front portion 1021 is located on a rear surface of the first front portion 1011 in the first state, and is pulled out in the second state from the first front portion 1011 in the first direction.

The display 151 may not be fixed to the second frame 102 but may change in position on the second frame 102, in response to the sliding motion of the second frame 102. The variable part 151b of the display 151 is located on the rear surface and the side surfaces of the second frame in the first state of the mobile terminal 100. The variable part 151b located on the rear surface moves to the front surface of the second frame in the second state.

The second front portion 1021 supports the variable part 151b, which has moved to the front, in the second state. The second rear portion 1022 supports the variable part 151b, which has moved to the rear, in the first state.

The slide frame 103 that is coupled to the end portion of the display 151 to guide the sliding of the display 151 moves on the rear surface of the second rear portion 1022. The display 151 coupled to the slide frame 103 is a moving part that slides in response to the movement of the slide frame 103 and is disposed to always face the rear surface of the mobile terminal 100. Since the moving part does not move toward the front surface, it may limit an area of the front surface of the display 151, and pull the variable part 151b moved to the front surface such that the variable part 151b can be fixed in the flat state.

The second frame 102 may further include the rear cover 1025 that covers the variable part 151b located on the rear surface of the second rear portion 1022. When the end portion of the display 151, namely, the moving part is exposed to the outside, the display 151 may be likely to be damaged. The rear cover 1025 may suppress the rear surface portion of the display 151 from being exposed directly to the outside. The second rear portion 1022 may include a guide member (not illustrated) that guides the sliding of the slide frame 103 which moves on the rear surface of the second rear portion 1022. The rear cover 1025 may cover the guide member not to be exposed to the outside.

The rear cover 1025 may be made of an opaque material, and may also include a transparent material. The transparent rear cover 1025 may provide information to the user by utilizing the display 151 located on the rear surface in the first state.

For example, when the user photographs a direction, in which the user is located, using a rear camera, the user may view a preview image of the camera through the display 151 located on the rear surface. Or, when the mobile terminal 100 is placed such that the rear surface faces upward, an alarm or the like may be provided through the display 151 located on the rear surface.

However, since the second rear portion 1022 may be visually exposed through the rear cover 1025 in the second state, the rear cover 1025 may be coated (tinted) to lower transparency such that the inside is visible only when the display 151 is turned on, namely, when light is emitted from the inside.

The rear cover 1025 may extend in the second direction from a portion where it covers the rear surface part of the display, so as to cover a second rear surface 1012b of the first frame 101. As illustrated in (a) of FIG. 3B, the rear cover 1025 may cover the second rear surface 1012b as well as the first rear surface 1012a in the first state, and define appearance of the rear surface of the mobile terminal 100.

As illustrated in (b) of FIG. 3B, when switched to the second state, the second rear surface 1012b is exposed to the rear surface of the mobile terminal 100. In order for the internal components of the mobile terminal 100 not to be exposed, as illustrated in (b) of FIG. 4C, at least portions of the second rear surface 1012b and the rear cover 1025 may overlap each other even in the second state.

Referring to (a) of FIG. 4C, the second rear surface 1012b and the variable part 151b of the display may be disposed to be adjacent in the first direction without overlapping each other. When the second rear surface 1012b and the display 151 overlap each other, the second rear surface 1012b is supposed to be inserted into the mobile terminal 100 by the sum of thicknesses of the display 151, the rolling hinge 104, and the second rear portion 1022.

In this case, a mounting space inside the first frame 101 may be reduced and a great step may be formed between the first rear surface 1012*a* and the second rear surface 1012*b*. This may cause the user to feel uncomfortable when gripping the expanded mobile terminal 100.

Therefore, in the present disclosure, the display 151 and the second rear portion 1022 may be disposed up and down, and a portion externally exposed by being expanded in the second state and a portion where the display 151 is located in the first state may be separated from each other in the first direction.

An extension portion of the rear cover 1025 that covers the second rear surface 1012*a* in the first state covers internal components that are exposed as the second rear portion 1022 moves in the second state. The second rear surface may cover the rear surface of the first frame 101 exposed in response to the movement of the rear cover 1025. A length of the second rear surface 1012*a* in the first direction may be longer than or equal to a movement distance of the second frame 102.

The mobile terminal 100 according to the present disclosure may include the frames 101 and 102 in which components are mounted, and the frames 101 and 102 may vary in size in the first direction, as illustrated in FIG. 2. At least one of the frames 101 and 102 may relatively move so as to change in size in the first direction. The frames 101 and 102 has electronic components mounted inside thereof and the flexible display disposed outside.

Since the mobile terminal 100 includes the flexible display 151, the flexible display 151 may be coupled in a manner of covering the front surface and the rear surface of the frames 101 and 102. The frames may include the first frame 101 and the second frame 102 moving relative to the first frame 101 in the first direction. The first frame 101 and the second frame 102 each include a front portion, a rear portion, and side portions, which are coupled all together.

First, the first frame 101 may correspond to a main body of the mobile terminal 100, and define a space between the first front portion 1011 and the first rear surface 1012*a* for accommodating various components. Also, the first frame 101 may accommodate the second frame 102, which is movably coupled to the first frame 101, in the space. In more detail, the first frame 101 may include the first front portion 1011 disposed on the front of the mobile terminal 100 to support the front surface portion of the display 151, and the first rear surface 1012 disposed on the rear of the mobile terminal to mount various components thereon.

The first front portion 1011 and the first rear portion 1012 may be spaced apart from each other by a predetermined gap to define a predetermined space, and may be connected by the first side portion 1013. The first side portion 1013 may also be formed integrally with the first rear portion 1012 or the first front portion 1011. The camera 121, the audio output module 152, the input/output terminal, and the controller 180 which are components of the mobile terminal 100 may be accommodated in the inner space of the first frame 101. For example, the controller 180 may be a main substrate 181 that includes a processor and an electronic circuit for controlling operations of the mobile terminal 100.

The battery 191 as the power supply unit 190 occupies the largest region of the mobile terminal 100. As the number of components of the mobile terminal 100 increases and a usage time of the display 151 extends, the capacity of the battery 191 becomes important. Accordingly, even if other components are reduced in size, the battery 191 is getting larger. Since the weight of the battery 191 as well as the occupied space increases, the center of gravity of the mobile terminal 100 may change depending on the position of the battery 191.

As illustrated in FIG. 4C, in the embodiment of the present disclosure, the battery 191 may be disposed on the second frame 102, thereby minimizing the shift of the center of gravity when the mobile terminal 100 is expanded. When the battery 191 is mounted on the first frame 101, the center of gravity is almost similar to a sliding distance of the frames 101 and 102. However, in the embodiment of the present disclosure, the weight of the battery 191 may be distributed to the first frame 101 and the second frame 102, such that the center of gravity can be located in a middle portion in the expanded state. As illustrated in the embodiment of FIG. 4A, when the battery 191 is located in the first frame 101, the inner space of the second frame 102 becomes empty in the expanded state of the mobile terminal 100. This causes a problem of weak support force for the rear surface of the variable part 151*b*. The support bars of the rolling hinge 104 located on the rear surface of the variable part 151*b* and the second front portion 1021 can support the variable part 151*b*, but the support force may be limitedly applied. This may cause bending deformation when strong force is applied to the front surface.

Also, the battery 191 may be disposed between the second front portion 1021 and the second rear portion 1022 of the second frame 102 so as to support the rear surface of the variable part 151*b* which has moved to the front surface of the mobile terminal 100. When the battery 191 is located on the rear surface of the second front portion 1021, the variable part 151*b* moved to the front may be maintained in the flat state.

Referring to FIGS. 3B and 4D, the side portion of the first frame 101 may include a first side surface 1013*a* that is always exposed, and a second side surface 1013*b* that is selectively exposed. The second side portion 1023 defining the side surface of the second frame 102 covers the second side surface 1013*b* in the first state, and exposes the second side surface 1013*b* in the second state.

The second side surface 1013*b* may be located only in a portion which is externally exposed in the second state, and an overlap section between the second side surface 1013*b* and the second side portion 1023 of the second frame 102 can be minimized.

In the inner space of the second side portion 1023 which does not overlap the second side surface 1013*b*, guide rails 231 and 232 for guiding the sliding motion of the frames 101 and 102, auxiliary substrates 183*a* and 183*b* connected to components of the second frame 102, or the like may be disposed. The first side surface 1013*a* and the second side surface 1013*b* are located between the first front portion 1011 and the first and second rear surfaces 1012*a* and 1012*b*, to define the inner space of the first frame 101. Here, since the first side surface 1013*a* is always externally exposed, antennas and the like can be implemented. A SIM card tray insertion hole 162 which does not have to be always exposed may be disposed in the second side surface 1013*b*.

The second side portion 1023 may define a component mounting space therein together with the second front portion 1021 and the second rear portion 1022, and define appearance of the mobile terminal 100 together with the rear cover 1025. The second side portion 1023, as illustrated in FIG. 3A, may have the same height as the rear cover 1025. A front bezel 1014 that covers a front periphery of the display 151 may further be provided. The front bezel 1014 fixes the end portion of the display 151 to the first frame 101 and the second frame 102.

The front bezel 1014 may include a first bezel adjacent to the first side surface 1013a of the first frame, and a second bezel adjacent to the second side portion 1023 of the second frame. The first bezel and the second bezel may be connected in the first state as illustrated in (a) of FIG. 3A, and disconnected in the second state as illustrated in (b) of FIG. 3B.

Meanwhile, referring to FIGS. 1A and 2A, a 5G wireless communication system, that is, 5G new radio access technology (NR) may be provided. In this regard, as more communication devices demand larger communication capacities, there is a need for improved mobile broadband communication as compared to the related art radio access technology. In addition, massive MTC (Machine Type Communications), which connects a plurality of devices and objects to provide various services anytime and anywhere, is also one of major issues to be considered in next-generation communication. Furthermore, communication system design in consideration of services/terminals that are sensitive to reliability and latency is being discussed. As described above, introduction of next-generation radio access technology in consideration of enhanced mobile broadband communication (eMBB), massive MTC (mMTC), ultra-reliable and low latency communication (URLLC), and the like, is being discussed, and the relevant technology is referred to herein as NR for the sake of convenience. The NR is an expression showing an example of 5G radio access technology (RAT).

A new RAT system including the NR uses an OFDM transmission scheme or a similar transmission scheme. The new RAT system may follow OFDM parameters different from OFDM parameters of LTE. Alternatively, the new RAT system may follow the existing numerology of LTE/LTE-A as it is but have a larger system bandwidth (e.g., 100 MHz). Alternatively, a single cell may support a plurality of numerologies. In other words, terminals operating with different numerologies may coexist in a single cell.

In this regard, in the case of 4G LTE, since the maximum bandwidth of the system is limited to 20 MHz, a single sub-carrier spacing (SCS) of 15 kHz is used. However, since 5G NR supports a channel bandwidth between 5 MHz and 400 MHZ, FFT processing complexity may increase to process the entire bandwidth through a single subcarrier spacing. Accordingly, the subcarrier spacing used for each frequency band may be extended and applied.

A numerology corresponds to one subcarrier spacing in the frequency domain. Different numerologies may be defined by scaling a reference subcarrier spacing with an integer N. In this regard, FIG. 5A shows an example of a frame structure in NR. FIG. 5B is a view illustrating a change in a slot length in accordance with a change in a subcarrier spacing in the NR.

An NR system may support a number of numerologies. Here, a numerology may be defined by a subcarrier spacing and a cyclic prefix overhead. Here, a plurality of subcarrier spacings may be derived by scaling a basic subcarrier spacing to an integer N (or µ). Furthermore, even when it is assumed that a very low subcarrier spacing is not used at a very high carrier frequency, the used numerology may be selected independently of the frequency band. In addition, in an NR system, various frame structures according to a number of numerologies may be supported.

Hereinafter, an Orthogonal Frequency Division Multiplexing (OFDM) numerology and frame structure that can be considered in the NR system will be described. A number of OFDM numerologies supported in the NR system may be defined as shown in Table 1 below.

TABLE 1

| m | $\Delta f = 2\mu * 15$ [kHz] | Cyclic prefix (CP) |
|---|---|---|
| 0 | 15 | Normal |
| 1 | 30 | Normal |
| 2 | 60 | Normal, Extended |
| 3 | 120 | Normal |
| 4 | 240 | Normal |

NR supports a number of numerologies (or subcarrier spacings (SCSs)) for supporting various 5G services. For example, NR supports a wide area in traditional cellular bands when the SCS is 15 kHz, and supports a dense-urban, a lower latency and a wider carrier bandwidth when the SCS is 30 kHz/60 kHz, and supports a bandwidth greater than 24.25 GHz to overcome phase noise when the SCS is 60 kHz or higher.

The NR frequency band is defined as a frequency range of two types (FR1, FR2). The FR1 is a sub-6 GHz range, and the FR2 is a range of above 6 GHZ, which may denote millimeter waves (mmWs).

Table 2 below shows the definition of the NR frequency band.

TABLE 2

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

With regard to a frame structure in a NR system, the sizes of various fields in the time domain are expressed in multiples of a specific time unit. FIG. 3A illustrates an example of an SCS of 60 kHz, in which one subframe may include four slots. One subframe={1,2,4} slots shown in FIG. 3 is an example, in which the number of slot(s) that can be included in one subframe may be one, two or four. In addition, a mini-slot may include two, four, or seven symbols or may include more or fewer symbols.

Referring to FIG. 5B, a subcarrier spacing of 5G NR phase I and a length of an OFDM symbol corresponding to the spacing are shown. Each subcarrier spacing is extended by a multiplier of two, and the symbol length is inversely reduced. In FR1, subcarrier spacings of 15 kHz, 30 kHz, and 60 kHz are available, depending on the frequency band/bandwidth. In FR2, 60 kHz and 120 kHz may be used for data channels, and 240 kHz may be used for synchronization signals.

In 5G NR, a basic unit of scheduling may be defined as a slot, and the number of OFDM symbols included in a single slot may be limited to 14 as shown in FIG. 3A or 3B regardless of the subcarrier spacing. Referring to FIG. 3A, when a wide subcarrier spacing is used, the length of one slot may decrease in inverse proportion to the subcarrier spacing, thereby reducing transmission delay in a wireless section. In addition, in order to efficiently support ultra-reliable low latency communication (uRLLC), mini-slot (e.g., 2, 4, 7 symbols) unit scheduling may be supported, as described above, in addition to slot-based scheduling.

In consideration of the foregoing technical features, slots in 5G NR described herein may be provided at the same interval as those in 4G LTE or may be provided with slots of various sizes. For an example, in 5G NR, the slot interval may be configured to be 0.5 ms equal to that of 4G LTE. For another example, the slot interval in 5G NR may be configured to be 0.25 ms, which is a narrower interval than that of 4G LTE.

In this regard, the 4G communication system and the 5G communication system may be referred to as a first communication system and a second communication system, respectively. Accordingly, a first signal (first information) of the first communication system may be a signal (information) in a 5G NR frame having a slot interval that is scalable to 0.25 ms, 0.5 ms, and the like. On the contrary, a second signal (second information) of the second communication system may be a signal (information) in a 4G LTE frame having a fixed slot interval of 0.5 ms.

Meanwhile, the first signal of the first communication system may be transmitted and/or received through a maximum bandwidth of 20 MHz. On the contrary, the second signal of the second communication system may be transmitted and/or received through a variable channel bandwidth of 5 MHz to 400 MHz. In this regard, the first signal of the first communication system may be FFT-processed at a single sub-carrier spacing (SCS) of 15 kHz.

On the other hand, the second signal of the second communication system may be FFT-processed at subcarrier spacings of 15 kHz, 30 kHz, and 60 kHz according to the frequency band/bandwidth. In this case, the second signal of the second communication system may be modulated and frequency-converted into a FR1 band and transmitted through a 5G Sub-6 antenna. Meanwhile, the FR1 band signal received through the 5G Sub-6 antenna may be frequency-converted and demodulated. Then, the second signal of the second communication system may be IFFT-processed at subcarrier spacings of 15 kHz, 30 kHz, and 60 kHz according to the frequency band/bandwidth.

On the other hand, the second signal of the second communication system may be FFT-processed at spacings of 60 kHz, 120 kHz, and 240 kHz according to the frequency band/bandwidth and data/synchronous channel. In this case, the second signal of the second communication system may be modulated in a FR2 band and transmitted through a 5G mmWave antenna. Meanwhile, the FR2 band signal received through the 5G mmWave antenna may be frequency-converted and demodulated. Then, the second signal of the second communication system may be IFFT-processed through subcarrier spacings of 60 kHz, 120 kHz, and 240 kHz according to the frequency band/bandwidth and data/synchronous channel.

In 5G NR, symbol-level time alignment may be used for transmission schemes using various slot lengths, mini-slots, and different subcarrier spacings. Accordingly, the present disclosure provides flexibility to efficiently multiplex various communication services such as enhancement mobile broadband (eMBB) and ultra-reliable low latency communication (uRLLC) in the time domain and the frequency domain. In addition, unlike 4G LTE, 5G NR may define uplink/downlink resource allocation at a symbol level within a single slot as shown in FIG. 3. In order to reduce a hybrid automatic repeat request (HARQ) delay, a slot structure capable of directly transmitting HARQ ACK/NACK in a transmission slot may be defined. This slot structure may be referred to as a self-contained structure.

Unlike 4G LTE, 5G NR may support a common frame structure constituting an FDD or TDD frame through a combination of various slots. Accordingly, a dynamic TDD scheme may be adopted to freely dynamically adjust the transmission direction of individual cells according to traffic characteristics.

On the other hand, a detailed operation and function of the electronic device having a plurality of antennas according to an embodiment provided with a multi-transceiving system as shown in FIG. 2B will be discussed below.

Figure 6A:
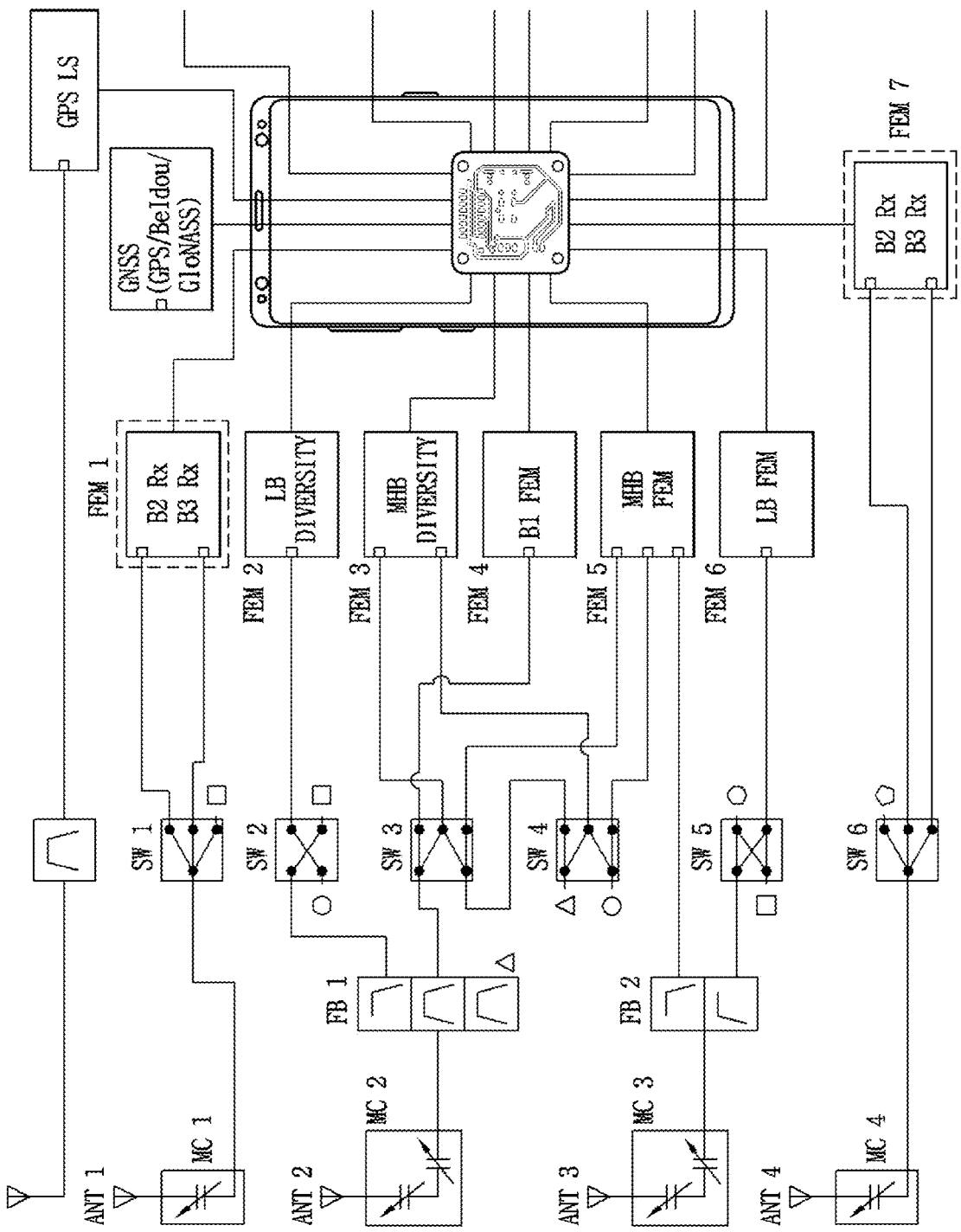
FIG. 6A is a view illustrating a configuration in which a plurality of antennas and transceiver circuits according to an embodiment are operably coupled to a processor.

In a 5G communication system according to an embodiment, the 5G frequency band may be a Sub-6 band. In this regard, FIG. 6A is a configuration diagram in which a plurality of antennas and transceiver circuits according to an embodiment are coupled to a processor in an operable manner. FIG. 7B is a configuration diagram in which antennas and transceiver circuits are additionally coupled to a processor in an operable manner in the configuration diagram in FIG. 6A.

Figure 6B:
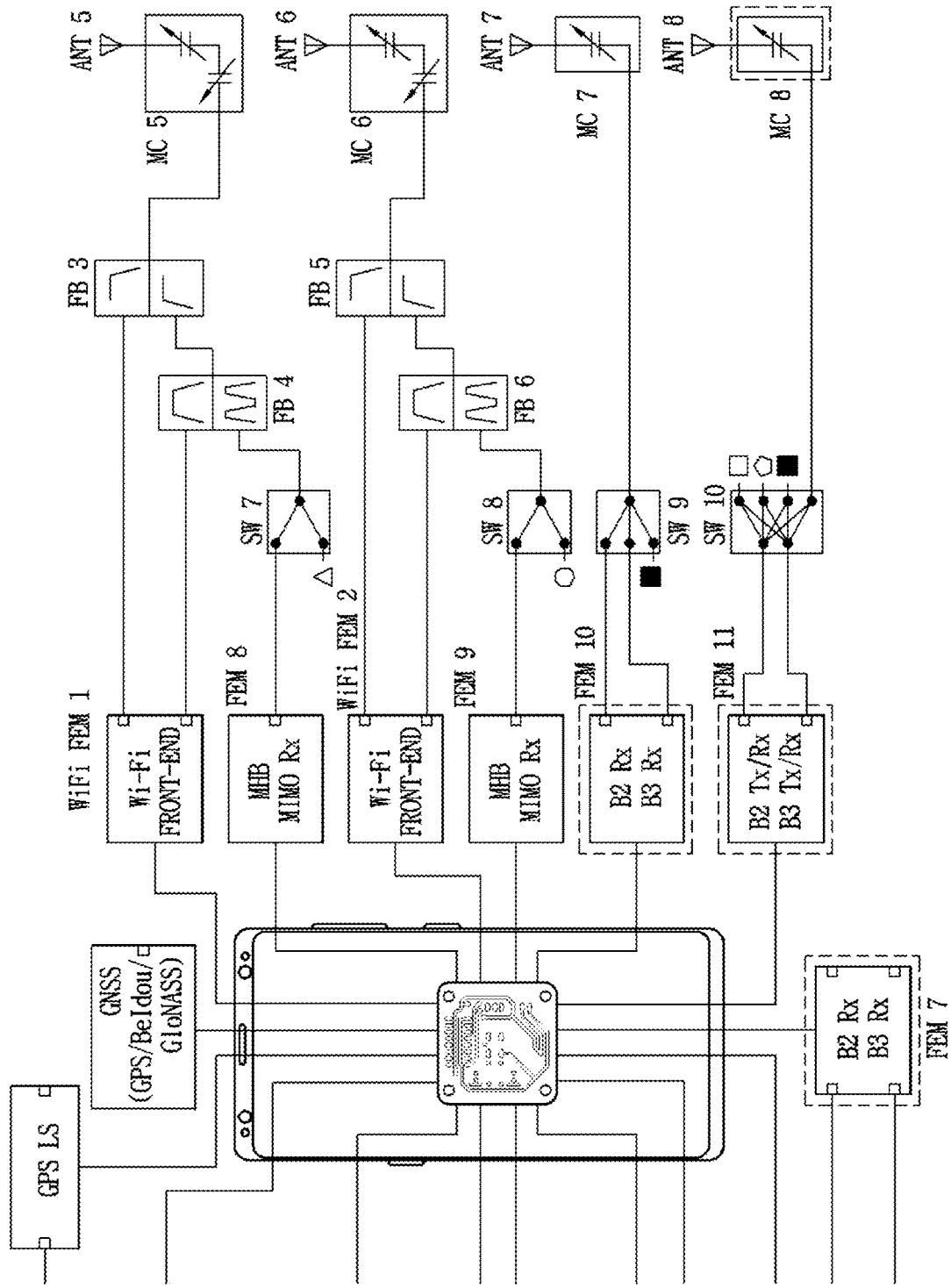
FIG. 6B is a configuration diagram in which antennas and transceiver circuits are additionally coupled to a processor in an operable manner in the configuration diagram in FIG. 6A.

Referring to FIGS. 6A and 6B, the electronic device may include a plurality of antennas ANT1 to ANT4 and front end modules FEM1 to FEM7 operating in a 4G band and/or a 5G band. In this regard, a plurality of switches SW1 to SW6 may be arranged between the plurality of antennas ANT1 to ANT4 and the front end modules FEM1 to FEM7.

Referring to FIGS. 6A and 6B, the electronic device may include a plurality of antennas ANT5 to ANT8 and front end modules FEM8 to FEM11 operating in a 4G band and/or a 5G band. In this regard, a plurality of switches SW7 to SW10 may be arranged between the plurality of antennas ANT1 to ANT4 and the front end modules FEM8 to FEM11.

Meanwhile, a plurality of signals that can be branched through the plurality of antennas ANT1 to ANT8 may be transmitted to the input of the front-end modules FEM1 to FEM11 or to the plurality of switches SW1 to SW10 through one or more filters.

For an example, the first antenna ANT1 may be configured to receive signals in a 5G band. In this case, the first antenna ANT1 may be configured to receive a second signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the first antenna ANT1 may also operate as a transmitting antenna as well as a receiving antenna.

In this regard, the first switch SW1 may be configured as an SP2T switch or an SP3T switch. When implemented as an SP3T switch, one output port may be used as a test port. The first and second output ports of the first switch SW1 may be connected to the inputs of the first front-end module FEM1.

In one example, the second antenna ANT2 may be configured to transmit and/or receive signals in a 4G band and/or a 5G band. In this case, the second antenna ANT2 may be configured to transmit/receive a first signal of a first band B1. Here, the first band B1 may be an n41 band, but the present disclosure is not limited thereto, and the first band B1 may be changed according to an application.

Meanwhile, the second antenna ANT2 may operate at a low band LB. In addition, the second antenna ANT2 may be configured to operate in a mid band MB and/or a high band HB. Here, the middle band MB and high band HB may be referred to as MHB.

A first output of the first filter bank FB1 connected to the second antenna ANT2 may be connected to the second switch SW2. Meanwhile, a second output of the first filter bank (FB1) connected to the second antenna (ANT2) may be connected to the third switch (SW3). Furthermore, a third output of the first filter bank FB1 connected to the second antenna ANT2 may be connected to the fourth switch SW4.

Accordingly, an output of the second switch SW2 may be connected to an input of the second front-end module FEM2 operating in the low band LB. Meanwhile, a second output of the third switch SW3 may be connected to an input of the third front-end module FEM3 operating in the MHB band. In addition, a first output of the third switch SW3 may be connected to an input of a fourth front-end module FEM4 operating in a first 5G band B1. Furthermore, a third output of the third switch SW3 may be connected to an input of the fifth front-end module FEM5 operating in the MHB band operating in the first 5G band B1.

In this regard, a first output of the fourth switch SW4 may be connected to an input of the third switch SW3. Meanwhile, a second output of the fourth switch SW4 may be connected to an input of the third front-end module FEM3. In addition, a third output of the fourth switch SW4 may be connected to an input of the fifth front-end module FEM5.

For an example, the third antenna ANT3 may be configured to transmit and/or receive signals in the LB band and/or the MHB band. In this regard, a first output of the second filter bank FB2 connected to the second antenna ANT2 may be connected to an input of the fifth front-end module FEM5 operating in the MHB band. Meanwhile, a second output of the second filter bank FB2 connected to the second antenna ANT2 may be connected to the fifth switch SW5.

In this regard, an output of the fifth switch SW5 may be connected to an input of the sixth front end module FEM6 operating in the LB band.

For an example, the fourth antenna ANT4 may be configured to transmit and/or receive a signal in a 5G band. In this regard, the fourth antenna ANT4 may be configured such that the second band B2 that is a transmission band and the third band B3 that is a reception band are frequency-division multiplexed (FDM). Here, the second band B2 may be an n77 band and the third band B3 may be an n79 band, but the present disclosure is not limited thereto. The second band B2 and the third band B3 may be changed according to an application.

In this regard, the fourth antenna ANT4 may be connected to the sixth switch SW6, and one of the outputs of the sixth switch SW6 may be connected to a reception port of the seventh front-end module FEM7. Meanwhile, another one of the outputs of the sixth switch SW6 may be connected to the transmission port of the seventh front-end module FEM7.

For an example, the fifth antenna ANT5 may be configured to transmit and/or receive signals in a WiFi band. Furthermore, the fifth antenna (ANT5) may be configured to transmit and/or receive signals in the MHB band.

In this regard, the fifth antenna ANT5 may be connected to the third filter bank FB3, and a first output of the third filter bank FB3 may be connected to a first WiFi module (WiFi FEM1). On the other hand, a second output of the third filter bank FB3 may be connected to a fourth filter bank FB4. In addition, a first output of the fourth filter bank FB4 may be connected to the first WiFi module (WiFi FEM1). Meanwhile, a second output of the fourth filter bank FB4 may be connected to the eighth front-end module FEM8 operating in the MHB band through the seventh switch SW7. Therefore, the sixth antenna ANT5 may be configured to receive the WiFi band and 4G/5G band signals.

Similarly, the sixth antenna ANT6 may be configured to transmit and/or receive signals in a WiFi band. Furthermore, the sixth antenna ANT6 may be configured to transmit and/or receive signals in the MHB band.

In this regard, the sixth antenna ANT6 may be connected to a fifth filter bank FB5, and a first output of the fifth filter bank FB5 may be connected to a second WiFi module (WiFi FEM2). On the other hand, a second output of the fifth filter bank FB5 may be connected to a sixth filter bank FB6. In addition, a first output of the sixth filter bank FB6 may be connected to a second WiFi module (WiFi FEM2). A second output of the sixth filter bank FB6 may be connected to the ninth front-end module FEM9 operating in the MHB band through the eighth switch SW8. Therefore, the sixth antenna ANT6 may be configured to receive the WiFi band and 4G/5G band signals.

Referring to FIGS. 3B, 6A, and 6B, the baseband processor 1400 may control antennas and the transceiver circuit 1250 to perform multi-input and multi-output (MIMO) or diversity in the MHB band. In this regard, the second antenna ANT2 and the third antenna ANT3 adjacent thereto may be used in a diversity mode for transmitting and/or receiving the same information as a first signal and a second signal. On the contrary, antennas disposed on different side surfaces may be used in the MIMO mode in which first information is included in the first signal and second information is included in the second signal. For an example, the baseband processor 1400 may perform MIMO through the second antenna ANT2 and the fifth antenna ANT5. In another example, the baseband processor 1400 may perform MIMO through the second antenna ANT2 and the sixth antenna ANT6.

For an example, the seventh antenna ANT7 may be configured to receive signals in a 5G band. In this case, the seventh antenna ANT7 may be configured to receive a third signal of a second band B2 and a third signal of a third band B3. Here, the second band B2 may be an n77 band and the third band B3 may be an n79 band, but the present disclosure is not limited thereto. The second band B2 and the third band B3 may be changed according to an application. Meanwhile, the seventh antenna ANT7 may also operate as a transmitting antenna as well as a receiving antenna.

In this regard, the ninth switch SW9 may be configured as an SP2T switch or an SP3T switch. When implemented as an SP3T switch, one output port may be used as a test port. On the other hand, the first and second output ports of the ninth switch SW9 may be connected to the inputs of the tenth front-end module FEM10.

For an example, the eighth antenna ANT8 may be configured to transmit and/or receive signals in the 4G band and/or the 5G band. In this case, the eighth antenna ANT8 may be configured to transmit/receive a signal of the second band B2. In addition, the eighth antenna ANT8 may be configured to transmit/receive a signal of the third band B3. Here, the second band B2 may be an n77 band and the third band B3 may be an n79 band, but the present disclosure is not limited thereto. The second band B2 and the third band B3 may be changed according to an application. In this regard, the eighth antenna ANT8 may be connected to the eleventh front-end module FEM11 through the tenth switch SW10.

Meanwhile, the antennas ANT1 to ANT8 may be connected to impedance matching circuits MC1 to MC8 to operate in a plurality of bands. In this regard, when operating in adjacent bands such as the first antenna ANT1, the fourth antenna ANT4, the seventh antenna ANT7 and the eighth antenna ANT8, only one variable element may be used. In this case, the variable element may be a variable capacitor that varies a capacitance by varying a voltage.

On the contrary, when operating in spaced bands such as the second antenna ANT2, the third antenna ANT3, the fifth antenna ANT5, and the sixth antenna ANT6, only two or more variable elements may be used. In this case, two or more variable elements may be two or more variable capacitors or a combination of a variable inductor and a variable capacitor.

Referring to FIGS. 2B, 6A, and 6B, the baseband processor 1400 may perform MIMO through at least one of the second band B2 and the third band B3 in a 5G band. In this regard, the baseband processor 1400 may perform MIMO through at least two of the first antenna ANT1, the fourth antenna ANT4, the seventh antenna ANT7, and the eighth antenna ANT8 in the second band B2. On the other hand, the baseband processor 1400 may perform MIMO through at least two of the first antenna ANT1, the fourth antenna ANT4, the seventh antenna ANT7, and the eighth antenna ANT8 in the third band B3. Therefore, the baseband processor 1400 may control the plurality of antennas and the transceiver circuit 1250 to support MIMO up to 4RX as well as 2RX in the 5G band.

Figure 7A:
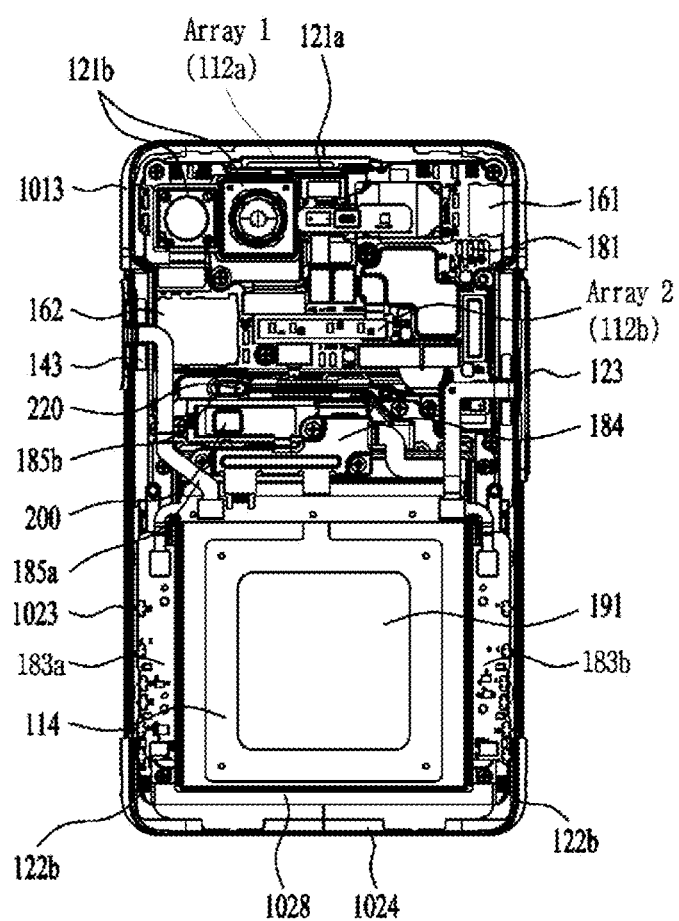
FIGS. 7A and 7B are views illustrating internal components in a first state and a second state of the mobile terminal 100.
Figure 7B:
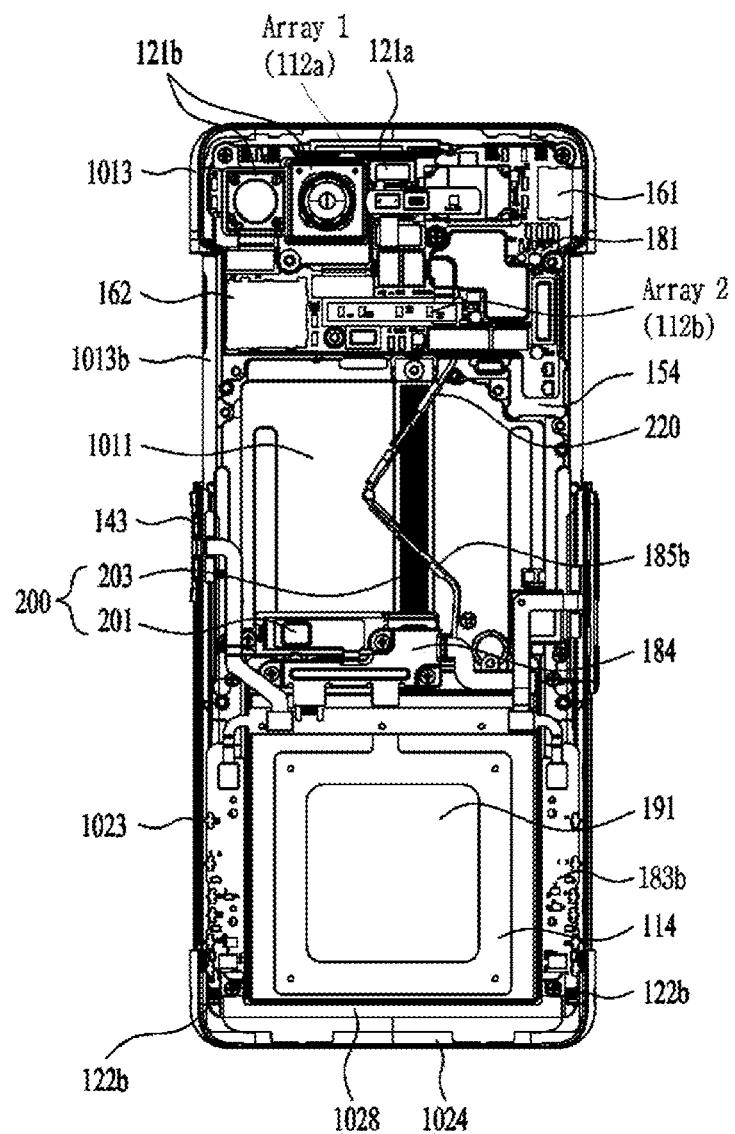

FIGS. 7A and 7B are views illustrating internal components in a first state and a second state of the mobile terminal 100. FIGS. 7A and 7B illustrate the internal components by removing the rear portions 1012 and 1022 and the rear cover 125 covering the display 151 and the rear surface of the mobile terminal 100. FIG. 7A shows the first state and FIG. 7B shows the second state. The main substrate 181, the battery 191, cameras 121a and 121b, the vibration module 154, the microphone 122a, the audio output module 152, the rack gear 203 of the driving unit 200, and the like are mounted on the first frame 101. The battery 191, the user input unit, the coil antenna 114, the mobile communication antenna 112, the microphone 122b, and the motor 201 and a pinion gear (not shown) of the driving unit 200 may be mounted on the second frame 102.

The main substrate 181 may be located on the first frame 101, and the cameras 121a and 121b, the vibration module 154, and the interface units 161 and 162 may be mounted on the main substrate 181. The cameras may include a main camera 121b facing the rear surface of the mobile terminal 100, and a camera 121a facing the front surface of the mobile terminal 100. To dispose the front camera 121a, an area that is partially deactivated may be included in the upper end of the display 151. Meanwhile, antennas 112a and 112b and the like may be disposed on the main substrate 181 or a separate substrate.

A cable terminal 161 for charging or data transmission may be located on the first side surface 1013a to be used even in the first state of the mobile terminal 100. A card mounting unit 162 for mounting a USIM or memory card is not usually used, and thus may be disposed adjacent to the second side surface 1013b which is open only in the second state.

A plurality of mobile communication antennas may be implemented using the first side surface 1013a. Meanwhile, array antennas 112a and 112b for mmWave signals may be disposed in different regions of the mobile terminal 100. The array antennas 112a and 112b may be disposed to face the upper end and the rear surface of the mobile terminal, respectively. Accordingly, beams may be radiated from the array antennas 112a and 112b toward the upper portion and the rear surface of the mobile terminal, respectively.

The driving unit 200 which applies sliding force between the first frame 101 and the second frame 102 includes a driving motor 201, a pinion gear (not shown) that rotates by rotational force supplied from the driving motor 201, and a rack gear 203 engaged with the pinion gear to perform a linear motion. The driving motor 201 and the rack gear 203 may be coupled to different frames. The driving motor 201 according to the embodiment may be located on the second frame 102 and the rack gear 203 on the pinion gear, but they may be disposed in an opposite way.

However, since the user grips the second frame 102, the driving motor 201 may be more stably driven when it is located in the second frame 102 than when located in the first frame 101.

The driving unit 200 may be located above the battery 191 to minimize the length of the short rack gear 203 and enable a stable sliding motion. Since the driving unit 200 located above the battery 191 guides the sliding motion at a central portion of the mobile terminal 100 in the first direction, driving force can be stably transferred without being biased to one side.

The rack gear 203, referring to FIG. 7B, is also located adjacent to the central portion of the mobile terminal 100 in the third direction, so as to enable the stable sliding motion of the frames 101 and 102 without being inclined when the frames 101 and 102 slide.

The rack gear 203 of the driving unit 200 may be disposed on the rear surface of the first front portion 1011 to face the rear surface of the mobile terminal 100. The second frame 102 may include a slot that is formed in the first front portion 1011 to extend in the first direction to a position corresponding to the rack gear 203. Thus, the rack gear 203 can be located in the slot in the first state. The rack gear 203 may overlap the battery 191, which is mounted to the second frame 102, in the first state. In the second state, the rack gear 203 may move in the second direction along the first frame 101 and extend to be located in an empty space.

In the embodiment of the present disclosure, the components are dispersively mounted in the first frame 101 and the second frame 102, which is advantageous in that the center of gravity is stable and the battery 191 supports the variable part 151b of the display. However, there is a need of a signal connection part 185b for connecting the component mounted in the first frame 101 and the component mounted in the second frame 102. The signal connection part 185b may include an electrical signal and power source of the battery 191, and may be made of a material that is deformable in response to the movement of the frames.

The signal connection part 185b may be constituted by using a flexible printed circuit board (FPCB) or a coaxial cable. Since antenna signals cause noise when affected by external impact, a coated coaxial cable may be used.

The signal connection part 185b may be bent between the first frame 101 and the second frame 102. When the FPCB or coaxial cable is bent in a thickness direction of the mobile terminal 100 in the first state, a curvature of a bent portion may be small. Also, when a position of the bent portion changes in response to the movement of the frame, it may cause a problem in view of durability.

Therefore, the signal connection part 185b according to the present disclosure may be disposed to be overlaid in the first direction of the mobile terminal 100 in the first state, and the bent portion of the signal connection part may become open in the second state and a bent angle of the bent portion may change.

Meanwhile, the electronic device of FIGS. 7A and 7B may be a terminal that changes in size as any one frame moves relative to another frame in different directions. The electronic device may be switched to an expanded state (first state) that the size thereof increases, and a retracted/reduced state (second state) that the size decreases/is reduced. In the expanded state (first state) of the electronic device, a specific module may be externally exposed or the display may extend. For example, in the expanded state (first state), a partial region of the display may be externally exposed.

In this regard, the display may include a first region 151a that is exposed to the front surface in the retracted state, and a second region 151b that is an expanded region exposed to the front surface in the expanded state. Specifically, the display 151 includes a fixed part 151a that is fixed to the front surface of the first frame 101 and always located on the front surface of the mobile terminal 100 regardless of the state of the mobile terminal 100. The display 151 further includes a variable part 151b that is located on the front surface or the rear surface depending on whether or not the mobile terminal 100 is expanded. The fixed part 151a and the variable part 151b may be referred to as the first region 151a and the second region 151b, respectively.

In the retracted/reduced state (second state), the first region 151a corresponding to the fixed part 151a may be exposed to the front surface of the rollable device. Accordingly, a mode in which the first region 151a is exposed to the front surface of the rollable device may be referred to as a first mode (basic mode). Also, in the expanded state (first state), the first region 151a and the second region 151b corresponding to the fixed part 151a and the variable part 151b may be exposed to the front surface of the rollable device. Accordingly, a mode in which the first region 151a and the second region 151b are exposed to the front surface of the rollable device may be referred to as a second mode (expansion mode).

Hereinafter, detailed operations and functions of the mobile terminal (electronic device), which has a plurality of antennas and changes in size, according to an embodiment provided with a multi-transceiving system as illustrated in FIGS. 2B, 6A, and 6B will be described.

Figure 8A:
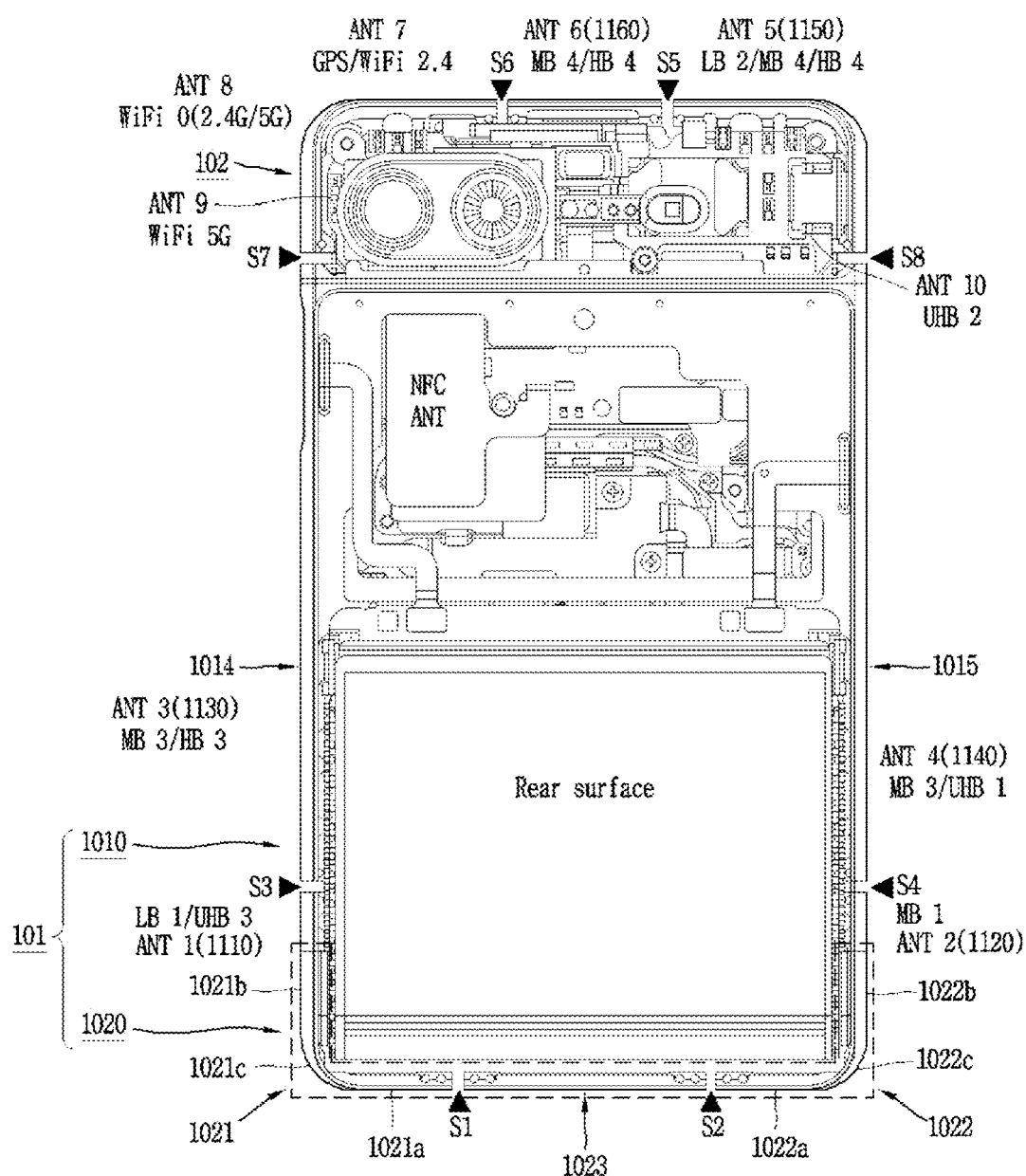
FIG. 8A illustrates a structure in which a plurality of antennas are disposed on metal rims of an electronic device.
Figure 8B:
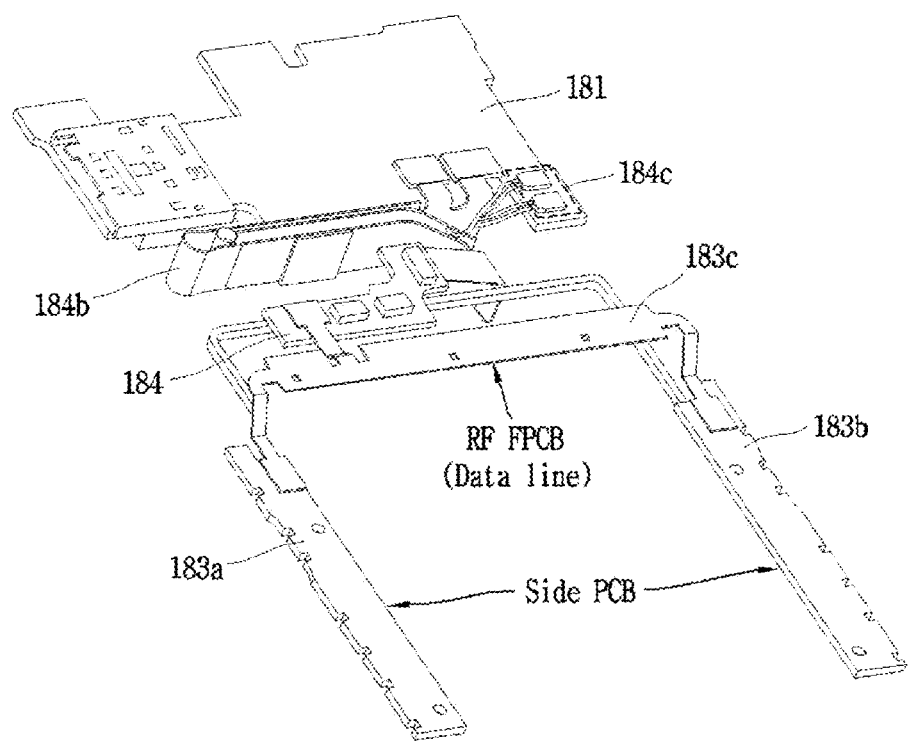
FIG. 8B illustrates a configuration in which side PCBs disclosed in the present disclosure are connected to a main PCB through an FPCB and an auxiliary PCB.

In this regard, FIG. 8A illustrates a structure in which a plurality of antennas are disposed on metal rims of an electronic device. Specifically, FIG. 8A shows a structure in which a plurality of LTE/5G Sub6 antennas and WiFi antennas are disposed on the metal rims of the electronic device. A plurality of mmWave antenna modules (see FIGS. 7A and 7B) may be disposed inside the electronic device. FIG. 8B illustrates a configuration in which side PCBs disclosed in the present disclosure are connected to a main PCB through an FPCB and an auxiliary PCB.

Referring to FIGS. 7A and 8A, the mode in which the first region 151a is exposed to the front surface of the rollable device may be referred to as a closed state because the first frame 101 is coupled to the second frame 102 in the first mode (basic mode). Referring to FIGS. 7B and 8A, the mode in which the first region 151a and the second region 151b are exposed to the front surface of the rollable device may be referred to as an open state because the first frame 101 is spaced apart from the second frame 102 by a predetermined distance in the second mode (expansion mode).

A plurality of antennas include a first antenna ANT1 and a second antenna ANT2 disposed on the bottom (lower portion) of the mobile terminal. In this regard, the first antenna ANT1 and the second antenna ANT2 are not limited to being disposed on the bottom. For example, antennas disposed on the top (upper portion) of the electronic device may alternatively be referred to as the first antenna ANT1 and the second antenna ANT2. Therefore, the first antenna ANT1 and the second antenna ANT2 may be referred to as low side antennas. The first antenna ANT1 and the second antenna ANT2 may be disposed on one side and another side of the second metal housing 1020, respectively. Also, partial regions of the first antenna ANT1 and the second antenna ANT2 may be disposed on one side and another side of the first metal housing 1010, respectively.

The plurality of antennas may include a third antenna (ANT1) 1110 and a fourth antenna (ANT2) 1120 disposed on the side surfaces of the mobile terminal. Also, the plurality of antennas may further include a third antenna (ANT3) 1130 and a fourth antenna (ANT4) 1140 disposed on the side surfaces of the mobile terminal. Therefore, the first antenna ANT1 to the fourth antenna ANT4 may also be referred to as lower side antennas.

Also, the plurality of antennas further include a fifth antenna ANT5 to an eighth antenna ANT8 disposed on the top of the mobile terminal. Therefore, the fifth antenna ANT5 to the eighth antenna ANT8 may also be referred to as upper side antennas. Also, the plurality of antennas further include a ninth antenna ANT9 to a tenth antenna ANT10 disposed inside the mobile terminal.

The first antenna ANT1 may be configured to operate at a low band (LB) and an ultra-high band (UHB) of the LTE/5G band. The second antenna ANT2 may be configured to operate in a mid-band (MB) and a high band (HB) of the LTE/5G band. Therefore, the first antenna ANT1 may be configured to transmit and/or receive at least one of LB and UHB signals of the LTE/5G band. The second antenna ANT2 may be configured to transmit and/or receive at least one of MB and HB signals.

The third antenna ANT3 may be configured to operate in MB and HB of the LTE/5G band. The fourth antenna ANT4 may be configured to operate in HB and UHB of the LTE/5G band. Therefore, the third antenna ANT3 may be configured to transmit and/or receive at least one of MB and HB signals of the LTE/5G band. The fourth antenna ANT4 may be configured to transmit and/or receive at least one of HB and UHB signals of the LTE/5G band. Therefore, MIMO operation may be performed by using two or more of the first antenna (ANT1) 1110 to the fourth antenna (ANT4) 1140 disposed on the bottom and the side surfaces of the mobile terminal. On the other hand, carrier aggregation (CA) operation may be performed by using at least one of the first antenna (ANT1) 1110 to the fourth antenna (Ant4) 1140 disposed on the bottom and the side surfaces of the mobile terminal. Also, MIMO+CA operation may be performed by using two or more of the first antenna (ANT1) 1110 to the fourth antenna (Ant4) 1140 disposed on the bottom and the side surfaces of the mobile terminal.

The fifth antenna ANT5 may be configured to operate in LB, MB, and HB of the LTE/5G band. The sixth antenna ANT6 may be configured to operate in MB and HB of the LTE/5G band. Therefore, the fifth antenna ANT5 may be configured to transmit and/or receive at least one of LB, MB, and HB signals of the LTE/5G band. The sixth antenna ANT6 may be configured to transmit and/or receive at least one of MB and HB signals of the LTE/5G band. Therefore, MIMO operation may be performed by using the fifth antenna (ANT5) 1150 and the sixth antenna (ANT6) 1160 disposed on the top and the side surfaces of the mobile terminal. On the other hand, CA operation may be performed by using at least one of the fifth antenna (ANT5) 1150 and the sixth antenna (ANT6) 1160 disposed on the top and the side surfaces of the mobile terminal. Therefore, MIMO+CA operation may be performed by using the fifth antenna (ANT5) 1150 and the sixth antenna (ANT6) 1160 disposed on the top and the side surfaces of the mobile terminal.

In another embodiment, MIMO operation may be performed by using two or more of the first antenna (ANT1) 1110 to the sixth antenna (ANT6) 1160 disposed on different regions (top, bottom, side surfaces) of the mobile terminal. On the other hand, CA operation may be performed by using at least one of the first antenna (ANT1) 1110 to the sixth antenna (ANT6) 1160 disposed on the bottom and the side surfaces of the mobile terminal. Also, MIMO+CA operation may be performed by using two or more of the first antenna (ANT1) 1110 to the sixth antenna (ANT6) 1160 disposed on the bottom and the side surfaces of the mobile terminal.

On the other hand, the seventh antenna ANT7 may operate as a GPS/WiFi antenna. The eighth antenna ANT8 may be configured to operate in a WiFi band. Specifically, the eighth antenna ANT8 may be configured to operate in WiFi bands of a first band and a second band. In this regard, the first band and the second band may be 2.4 GHz and 5 GHz bands, respectively, but are not limited thereto, and may be different WiFi bands. WiFi MIMO operation may be performed in the first band using the seventh antenna ANT7 and the eighth antenna ANT8.

The ninth antenna ANT9 disposed inside the mobile terminal may be configured to operate in a WiFi band. Specifically, the ninth antenna ANT9 may be configured to operate in a WiFi band of the second band. WiFi MIMO operation may be performed in the second band using the eighth antenna ANT8 and the ninth antenna ANT9.

On the other hand, the tenth antenna ANT10 disposed inside the mobile terminal may be configured to operate in UHB of the LTE/5G band. The eleventh antenna ANT11 disposed inside the mobile terminal may be configured to operate in UHB of the LTE/5G band. Therefore, the tenth antenna ANT10 may be configured to transmit and/or receive at least one of UHB signals of the LTE/5G band. An eleventh antenna ANT11 may be configured to operate in UHB of the LTE/5G band.

Therefore, MIMO operation may perform using two or more of the first antenna (ANT1) 1110, the fourth antenna (ANT4) 1140, the tenth antenna ANT10, and the eleventh antenna ANT11 that operate in UHB. Therefore, CA operation may perform using at least one of the first antenna (ANT1) 1110, the fourth antenna (ANT4) 1140, the tenth antenna ANT10, and the eleventh antenna ANT11 that operate in UHB. Also, MIMO+CA operation may perform using two or more of the first antenna (ANT1) 1110, the fourth antenna (ANT4) 1140, the tenth antenna ANT10, and the eleventh antenna ANT11 that operate in UHB.

Referring to FIGS. 7A, 7B, and 8A, the plurality of mmWave band antenna modules may be disposed on the side surfaces of the mobile terminal and/or inside the mobile terminal. The plurality of mmWave band antenna modules may include a first array antenna (ARRAY1) 112*a* and a second array antenna (ARRAY2) 112*b*. The first array antenna (ARRAY1) 112*a* and the second array antenna (ARRAY2) 112*b* may be disposed on a side surface of the electronic device and inside the electronic device, such that antenna elements can be disposed to radiate signals toward the side surface and the rear surface. For example, the first array antenna (ARRAY1) 112*a* and the second array antenna (ARRAY2) 112*b* may be disposed on an upper side surface of the electronic device and inside the electronic device, respectively, to radiate signals toward the upper side surface and the rear surface.

In the first array antenna (ARRAY1) 112*a* and the second array antenna (ARRAY2) 112*b*, the plurality of antenna elements may be spaced at predetermined distances. Beamforming may be performed by controlling phases of signals applied to the respective antenna elements arranged at the predetermined distances. An optimal antenna may be selected from the first array antenna (ARRAY1) 112*a* and the second array antenna (ARRAY2) 112*b*, and beamforming may be performed through the selected array antenna. As another embodiment, MIMO or diversity may be performed using both the first array antenna (ARRAY1) 112 and the second array antenna (ARRAY2) 112*b*.

In this regard, electronic devices may be configured to provide 5G communication services in various frequency bands. Recently, attempts have been made to provide 5G communication services using a Sub6 band that is a band of 6 GHz or less. In the future, however, it is also expected to provide 5G communication services by using a millimeter-wave (mmWave) band in addition to the Sub6 band for a faster data rate. Meanwhile, electronic devices supporting 4G and 5G communication services may be provided in various form factors. As an example of the form factors for the electronic device, a rollable device may be considered. In the rollable device which changes in size, wireless performance deviation may occur between a retracted state (first state) and an expanded state (second state).

Therefore, the present disclosure proposes a plurality of antenna structures disposed on a metal housing of a mobile terminal, capable of minimizing wireless performance deviation between a retracted state (first state) and an expanded state (second state). Referring to FIG. 7A to FIG. 8A, the plurality of antennas may be disposed on the metal housing of the mobile terminal that changes in size. Referring to FIGS. 7A to 8A, the mobile terminal that vertically changes in size may be referred to as a vertically rollable device. However, the retraction/expansion of the rollable device may not be limited to the vertical direction but the size may alternatively change horizontally.

Referring to FIGS. 7A and 7B, even when the mobile terminal according to the present disclosure changes in size through the signal connection part 185*b* and the support link 220, the first and second frames 101 and 102 can be electrically connected to each other. Therefore, the signal connection part 185*b* may be disposed to be overlaid in the first direction of the mobile terminal 100 in the first state, and the bent portion of the signal connection part may become open in the second state and a bent angle of the bent portion may change.

Figure 9:
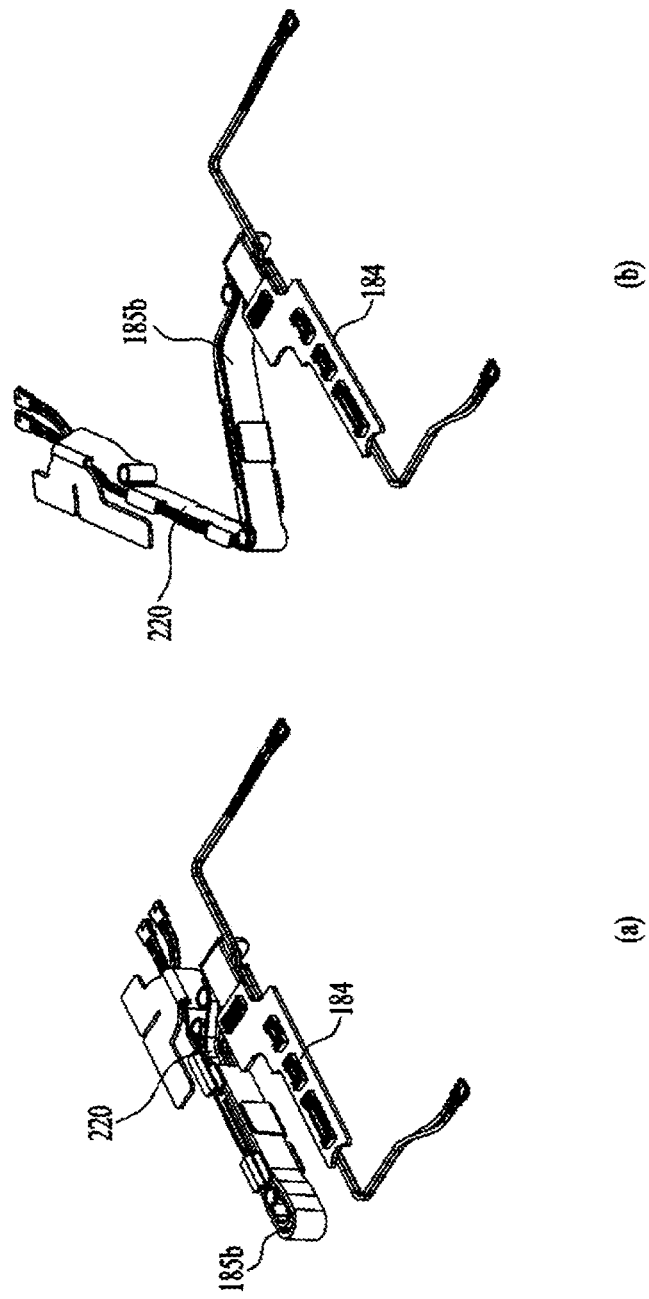
FIG. 9 is a view illustrating a signal connecting part 185b and a support link 220 mounted in a mobile terminal 100 according to the present disclosure.

FIG. 9 is a view illustrating the signal connecting part 185*b* and the support link 220 mounted in the mobile terminal 100 according to the present disclosure. The support link 220 may allow the first and second frames 101 and 102 to be coupled to each other, and thus may be referred to as a coupling link 220. Referring to FIGS. 7A to 9, when the support link 220 is pressed by strong force, the support link 220 may be bent and deformed because an expanded portion formed by expansion of the mobile terminal 100 defines an empty space therein. To support the empty space, the foldable support link 220 may be located between the first frame 101 and the second frame 102.

The support link 220 may include a first link having one end coupled to the first frame 101, and a second link having one end coupled to the second frame 102. Another end of the first link and another end of the second link may be hinge-coupled to each other, such that an angle between the first link and the second link can change depending on sliding of the frames. As illustrated in FIG. 7A, the first link and the second link may be disposed at an angle of 0° therebetween to be in contact with each other in a folded (closed) state of the mobile terminal 100.

As illustrated in FIG. 7B, the first link and the second link may be open to form an angle of about 70° in the expanded (extended) state of the mobile terminal. When being open by 180°, it is difficult to fold the links again. Also, when the support link 220 extends in a first direction, a section that is not supported may be generated in a third direction. Therefore, to increase supporting force by the support link 220 as much as possible in both the first direction and the third direction, the support link 220 may be configured to form an angle of about 90° in the second state.

As illustrated in FIG. 9, the support link may be located between the first front portion 1011 and the second rear surface 1012b in a thickness direction of the mobile terminal 100, and a width in the thickness direction may correspond to a gap between the first front portion 1011 and the second rear surface 1012b.

The support link 220 guides the folding operation of the signal connection part 185b while supporting the empty space inside the frames, formed due to the expansion of the mobile terminal 100. Since the signal connection part 185b is made of a flexible material, there is a risk that the signal connection part 185b is damaged due to being caught by the driving unit 200 or the frames 101 and 102 while the frames 101 and 102 slide. The signal connection part 185b may be coupled to the support link 220 so as to change in shape together with the support link 220. This can suppress the signal connection part 185b from being damaged during the sliding.

One side of the signal connection part 185b may be connected to the main substrate 181 mounted on the first frame 101, and another side may include an intermediate substrate 184 that collects signals of components located on the second frame 102. The battery 191, a coil antenna 114, the microphone 122b, and antenna using the side portions of the second frame 102 may be connected to the main substrate 181 through the intermediate substrate 184.

Signal interference of the coil antenna by other components does not happen and short-range wireless communication is carried out only when the coil antenna is located closest to the rear surface of the mobile terminal 100. Therefore, as illustrated in FIG. 8, the coil antenna may be located on a rear surface of the battery 191.

A plurality of microphones 122a and 122b may be provided for noise canceling. The main microphone 122b is generally located on a lower center of the mobile terminal 100. However, in the embodiment of the present disclosure, the lower portion of the mobile terminal 100 is a space in which the display 151 is rolled. Thus, it is difficult to secure a mounting space for the microphone and connect the microphone to the controller. Therefore, in the embodiment of the present disclosure, the microphone 122b may be disposed on both sides of the second frame 102 adjacent to the second direction to avoid the display 151.

A portion in which the display 151 is rolled may include a rolling bracket 1028 having a curved surface that corresponds to a curvature of the display 151. The rolling bracket 1028 may include a roller (not illustrated) that is coupled to an end portion of the second frame 102 in the first direction and rolls to support the rotation of the display 151.

Referring to FIGS. 7A to 8A, upper end antennas may be disposed on the second frame 102 that corresponds to a fixed part metal frame. Lower end antennas may be disposed on the first frame 101 that corresponds to a variable part metal frame. The first metal housing 1010 of the first frame 101 may be referred to as a slide metal part or slide metal cover. The second frame 102 that is exposed to the upper end and side surfaces of the rollable device may be referred to as a front metal part or a front metal cover.

Figure 10A:
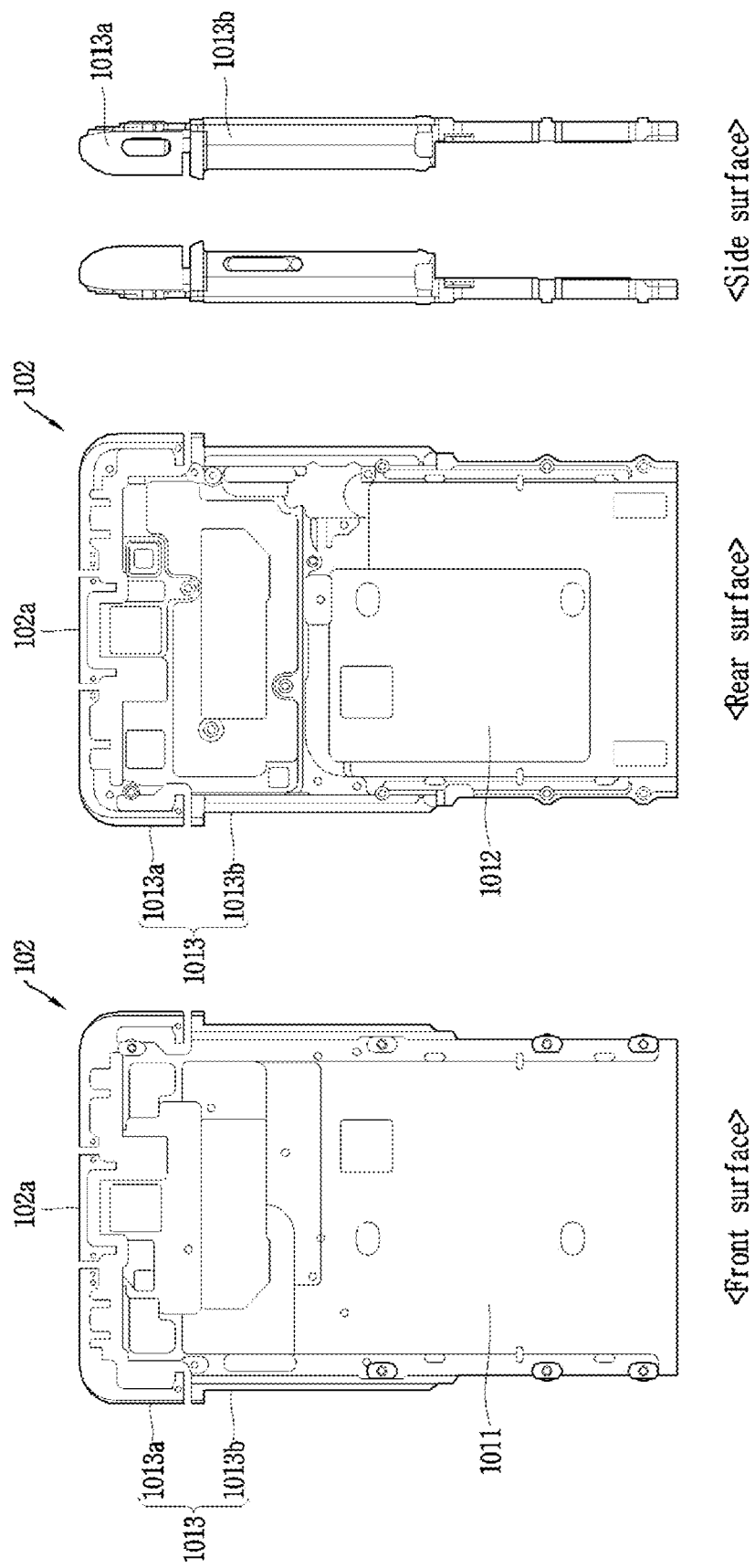
FIG. 10A illustrates front, rear, and lateral views of a front metal part. On the other hand.

In this regard, FIG. 10A illustrates front, rear, and lateral views of the front metal part. On the other hand, FIG. 10B illustrates front, rear, and lateral views of the slide metal part.

Referring to FIG. 10A, the front metal part 102 may include an upper side surface 102a, a front portion 1011, a rear portion 1012, and side portions 1013. The front portion 1011 and the rear portion 1012 may also be referred to as a front surface portion and a rear surface portion. The side portions 1013 includes a first side surface 1013a always exposed to outside, and a second side surface 1013b exposed to the outside only in the second state. A plurality of antennas may be disposed on the upper side surface 102a and the first side surface 1013a of the front metal part 102. Referring to FIGS. 8A and 9A, the fifth antenna ANT5 to the eighth antenna ANT8 may be disposed on the upper side surface 102a and the first side surface 10103a.

Figure 10B:
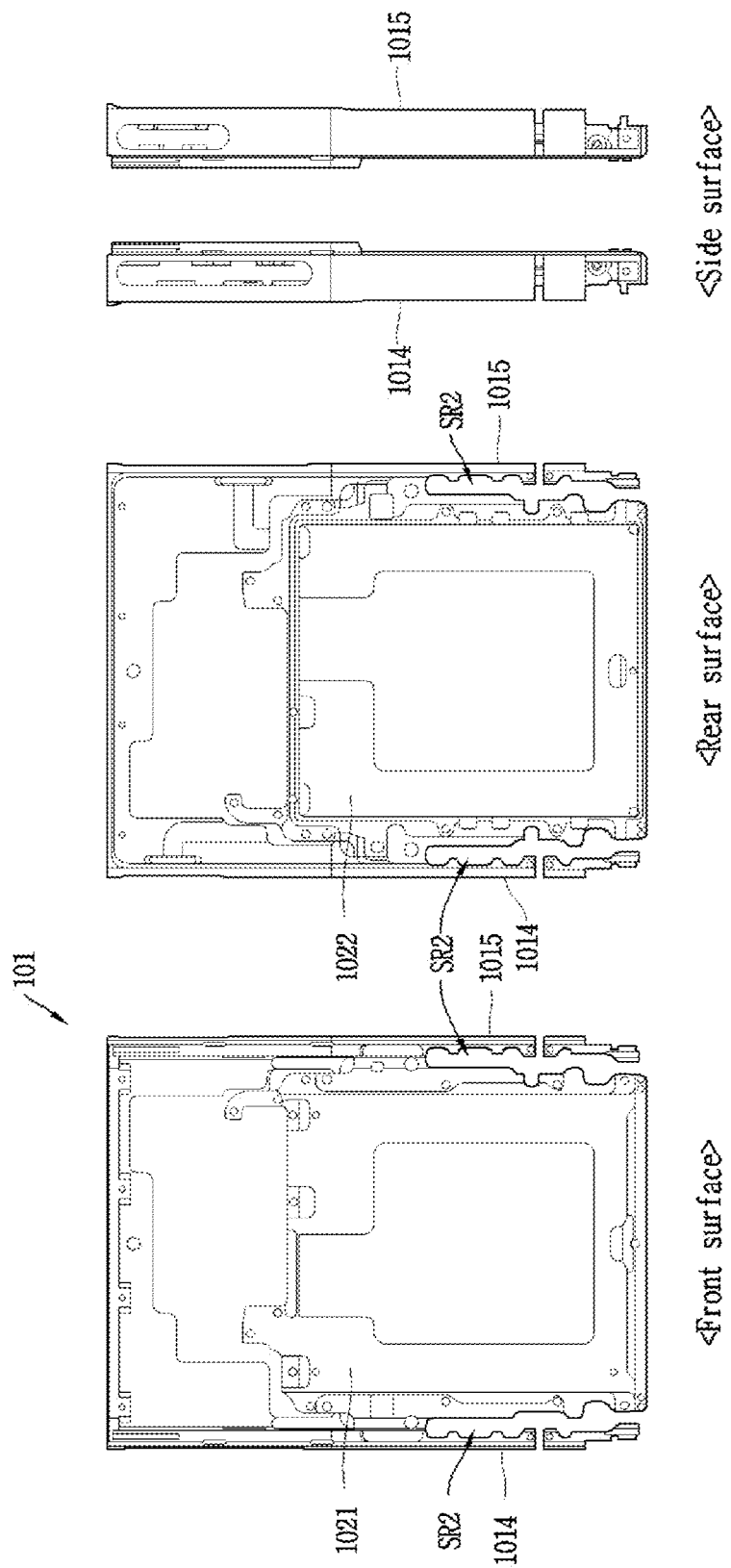
FIG. 10B illustrates front, rear, and lateral views of a slide metal part.

Referring to FIG. 10B, the slide metal part 1010 may include a front portion 1021, a rear portion 1022, and side portions 1014 and 1015. A plurality of slot regions from which a metal region has been removed may be disposed in a body region corresponding to the front portion 1021 and the rear portion 1022. The side portions 1014 and 1015 constituting a left surface and a right surface may be configured as side antennas. Referring to FIGS. 8A and 9B, the side portions 1014 and 1015 constituting the left surface and the right surface may operate as the third antenna (ANT3) 1130 and the fourth antenna (ANT4) 1140. A fourth conductive member 1014 and a fifth conductive member 1015 may operate as a third antenna (ANT3) 1130 and a fourth antenna (ANT4) 1140.

Referring to FIGS. 7A to 10B, the upper end antennas may include at least one of the fifth antenna (ANT5) 1150 to the eighth antenna (ANT8) 1180. The lower end antennas may include at least one of the first antenna (ANT1) 1110 to the fourth antenna (ANT4) 1140.

The upper end antennas disposed on the front metal part 102 corresponding to the second frame 102 hardly cause interference with the lower end antennas. This results from that the upper end antennas and the lower end antennas are disposed on the different frames and sufficiently spaced apart from each other. Also, the upper end antennas hardly exhibit antenna performance deviation due to the relative movement, namely, the open/closed states of the first frame 101 and the second frame 102. This results from non-occurrence of interference between the upper end antennas and the lower end antennas due to the relative movement of the first frame 101 and the second frame 102. However, a region where the ground is disposed may change according to the relative movement of the first frame 101 and the second frame 102. This ground condition may affect the antenna characteristics. Therefore, in the present disclosure, the antenna characteristics of the upper end antennas according to the relative movement of the first frame 101 and the second frame 102 when the upper end antennas are disposed on the second frame 102 will be described in detail.

Figure 11A:
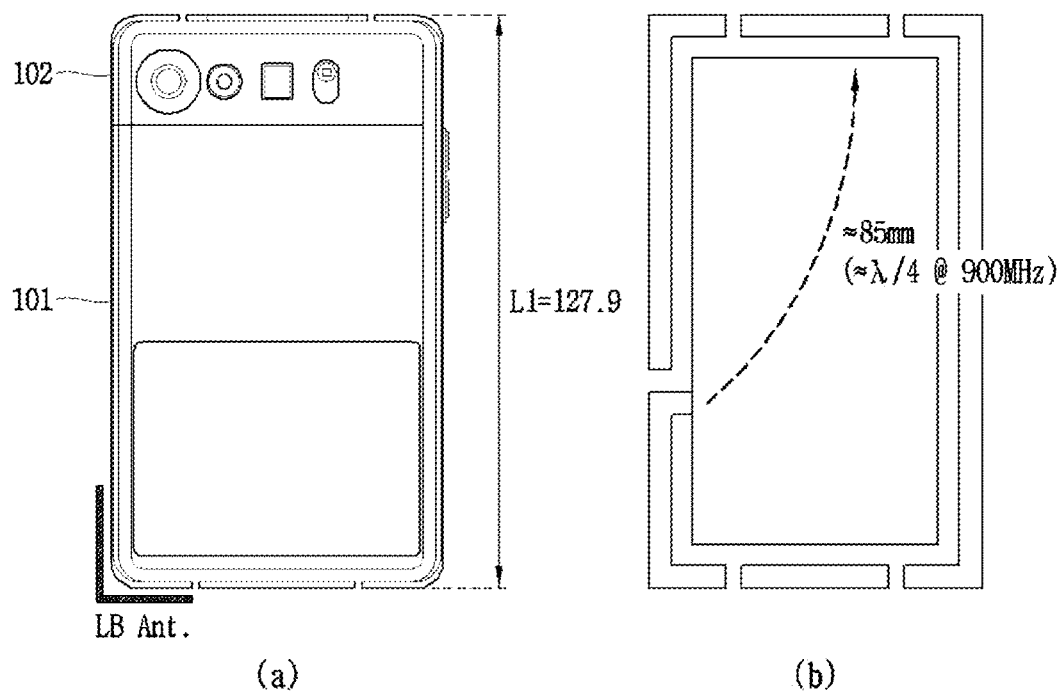
FIG. 11A is a view illustrating a mobile terminal having a first length due to a retraction and a thusly-decreased ground size.
Figure 11B:
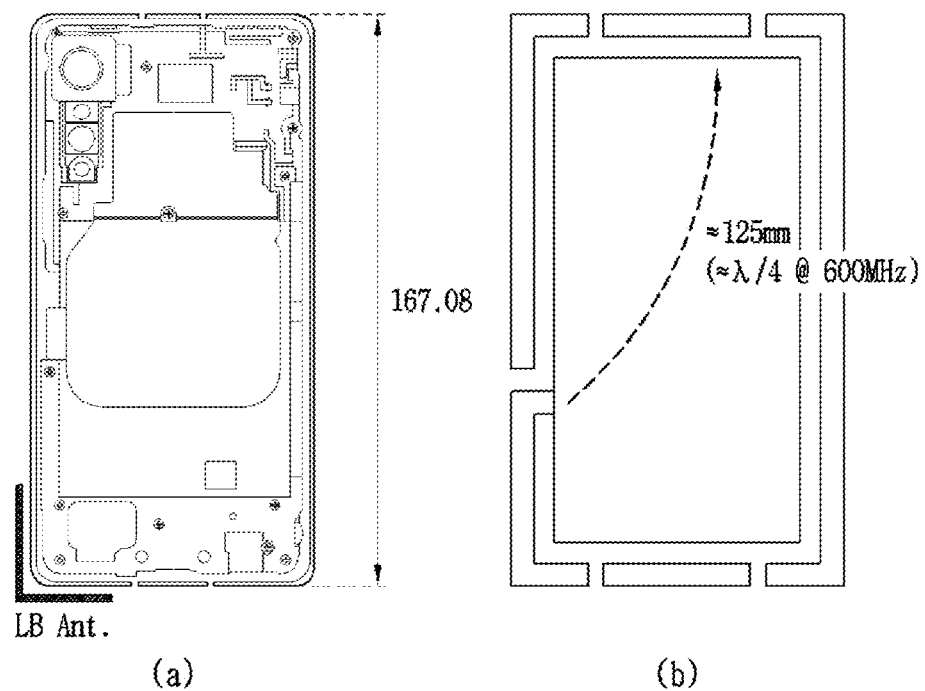
FIG. 11B is a view illustrating the mobile terminal having a second length longer than the first length and a thusly-increased ground size.

Meanwhile, when the mobile terminal changing in size according to the present disclosure is retracted, a size of a ground may be reduced and antenna radiation performance may be deteriorated. In this regard, FIG. 11A is a view illustrating a mobile terminal having a first length due to a retraction and a thusly-decreased ground size. FIG. 11B is a view illustrating the mobile terminal having a second length longer than the first length and a thusly-increased ground size.

It may be considered that FIGS. 11A and 11B illustrate the first state (closed state) and the second state (open state) of the mobile terminal that changes in size. Or, it may be considered that FIGS. 11A and 11B illustrate the first state (closed state) of the mobile terminal that changes in size and a mobile terminal having a fixed size.

Referring to (a) of FIG. 11A, a state in which the slide metal part 101 corresponding to the first frame is coupled to be adjacent to the front metal part 102 corresponding to the second frame. Accordingly, a first length of the mobile terminal in the first state (closed state) may be set to L1. As one example, the first length may be L1=127.9 mm, but is not limited thereto. A lower end antenna disposed on the lower end and one side surface of the slide metal part 101 may operate as a low band (LB) antenna. Referring to (b) of FIG. 10A, a length from an end portion of the lower end antenna as the LB antenna to an upper end of a ground may be set to L1g. As one example, the length up to the upper end of the ground may be about 85 mm, but is not limited thereto. In the case of L1g=85 mm, the length up to the upper end of the ground corresponds to about a quarter (¼) wavelength at 900 MHz. Therefore, radiation performance of the LB antenna may be deteriorated as the ground size is decreased.

Referring to (a) of FIG. 11B, a length of the size-fixed mobile terminal may be set to L2. Also, in the assumption that (a) of FIG. 11B illustrates the second state (open state) of the mobile terminal that changes in size, it may be a state in which the slide metal part 101 corresponding to the first frame is coupled with being spaced apart a predetermined distance from the front metal part 102 corresponding to the second frame. Accordingly, a second length of the mobile terminal may be set to L2. As one example, the second length may be L2=167.08 mm, but is not limited thereto. A lower end antenna disposed on the lower end and one side surface of the slide metal part 101 may operate as a low band (LB) antenna. Referring to (b) of FIG. 10B, a length from an end portion of the lower end antenna as the LB antenna to an upper end of a ground may be set to L2g. As one example, the length L1g up to the upper end of the ground may be about 125 mm, but is not limited thereto. In the case of L2g=125 mm, the length up to the upper end of the ground corresponds to about a quarter (¼) wavelength at 600 MHz. Therefore, radiation performance of the LB antenna can be maintained up to the lowest frequency (about 600 MHZ).

Figure 11C:
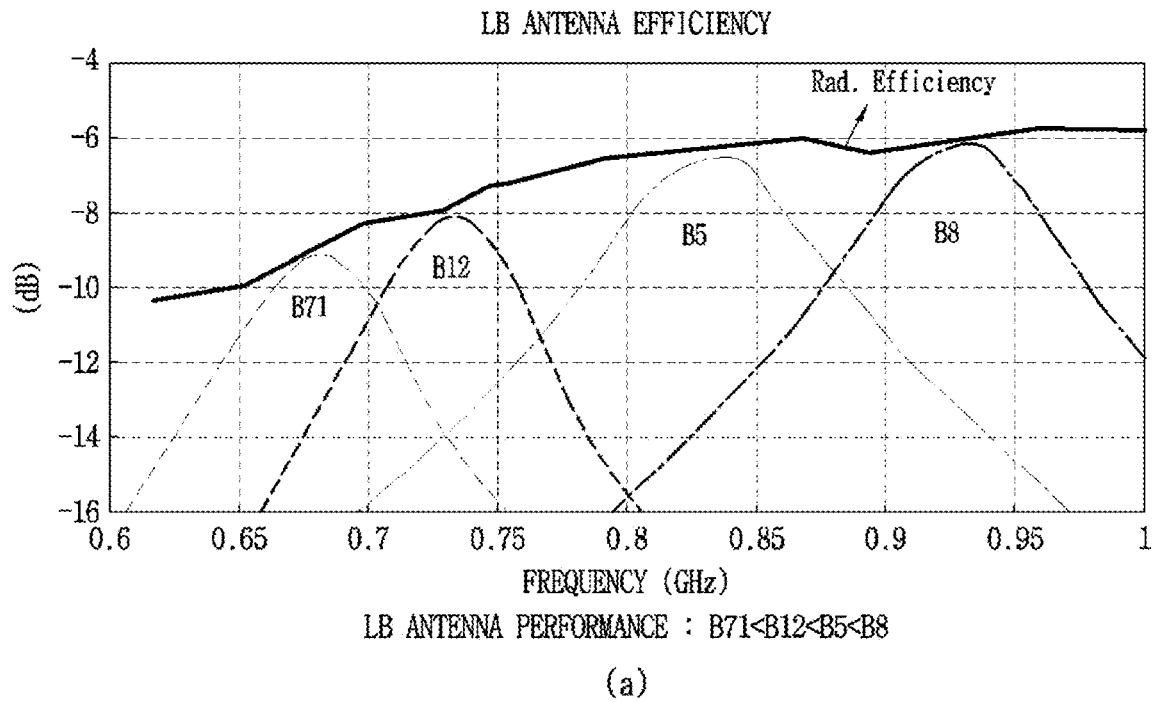
FIG. 11C shows comparison results of LB antenna efficiency according to the change of the ground size.
Figure 11C:
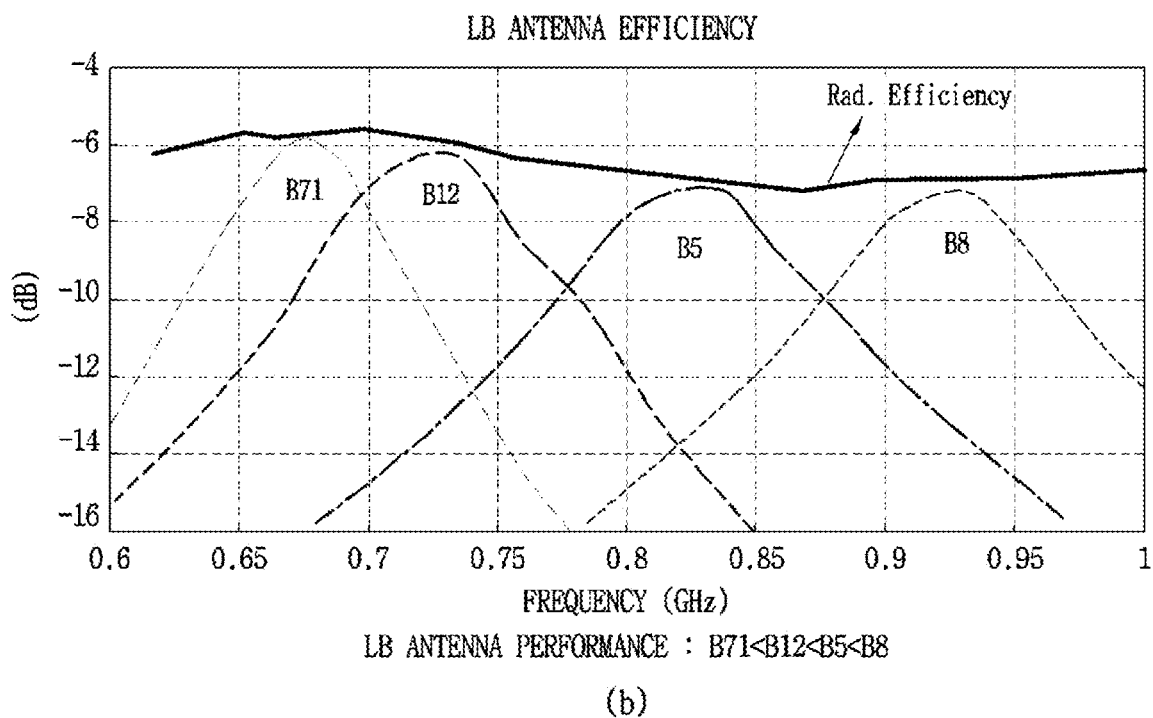

In this regard, FIG. 11C compares LB antenna efficiencies according to the change of the ground size. (a) of FIG. 11C shows the LB antenna efficiency for each frequency when the ground size is decreased. (b) of FIG. 11C shows the LB antenna efficiency for each frequency when the ground size is increased.

Referring to (a) of FIG. 11C, LB antenna efficiencies are in the order of B71<B12<B5<B8. That is, B71 band as the lowest frequency band has the lowest antenna efficiency. This results from, as illustrated in (b) of FIG. 10A, that the ground size corresponds to about the quarter (¼) wavelength at a band of about 900 MHZ, and is less than the quarter wavelength at a lower band than 900 MHZ. Therefore, B71 band that is about 600 MHz has the lowest antenna efficiency.

Referring to (b) of FIG. 11C, LB antenna efficiencies are in the order of B71>B12>B5>B8. That is, B71 band as the lowest frequency band has the highest antenna efficiency. This results from, as illustrated in (b) of FIG. 11C, that the ground size corresponds to about the quarter (¼) wavelength at a band of about 600 MHZ, and is more than the quarter wavelength at a higher band than 600 MHz. Therefore, B71 band that is about 600 MHz has the highest antenna efficiency. On the other hand, when the ground size is more than the quarter wavelength, the antenna efficiency is maintained at a predetermined level or higher. Therefore, referring to (b) of FIG. 11C, the antenna efficiencies are slightly reduced at B12, B5, and B8 bands that are higher than or equal to B71 band, but the reduction is not so great. On the other hand, referring to (a) of FIG. 11C, the antenna efficiencies are reduced at bands less than B8, and the reduction of the antenna efficiencies at the low bands happens is greatly increased. Therefore, the reduction of the ground size causes a problem that efficiencies of antennas operating at LB and VLB of 4G/5G are lowered.

To solve this problem, when the mobile terminal that changes in size according to the present disclosure is retracted, a current path is supposed to be changed on a ground to increase a ground path.

Figure 12A:
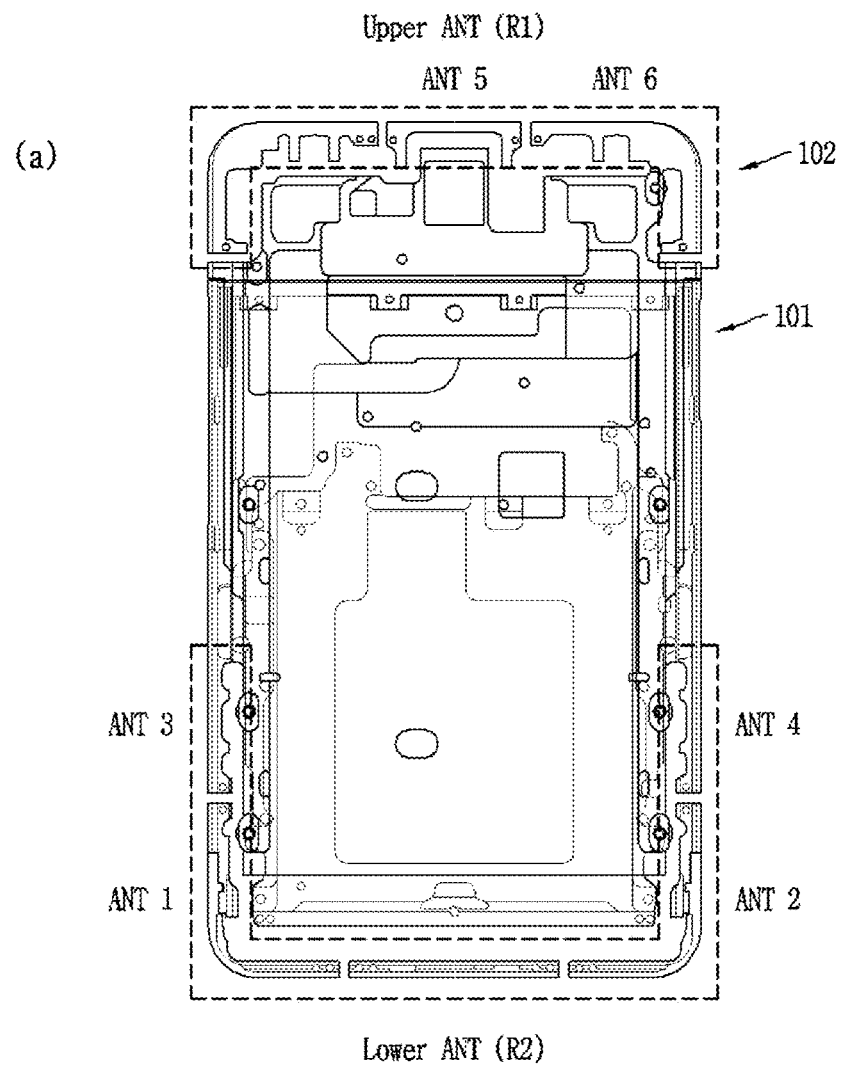
FIG. 12A is a conceptual view illustrating a metal frame coupling structure and a ground condition according to the coupling structure when first and second frames are coupled in a first state as a closed state.
Figure 12A:
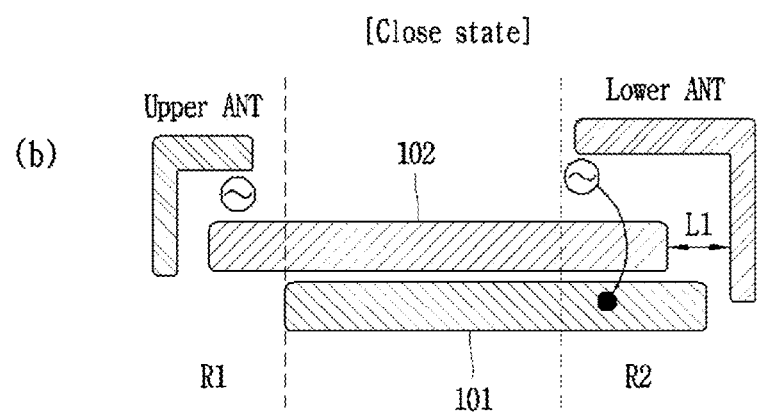
Figure 12B:
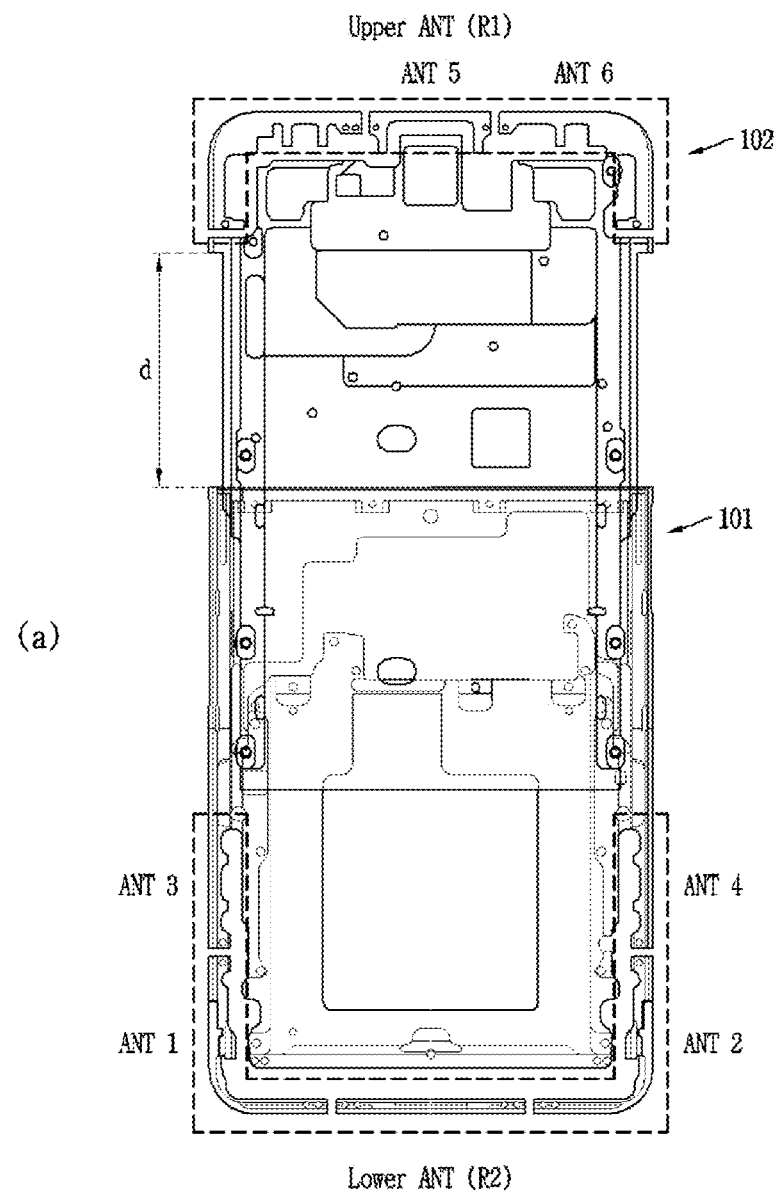
FIG. 12B is a conceptual view illustrating the metal frame coupling structure and the ground condition according to the coupling structure when the first and second frames are coupled in a second state as an open state.
Figure 12B:
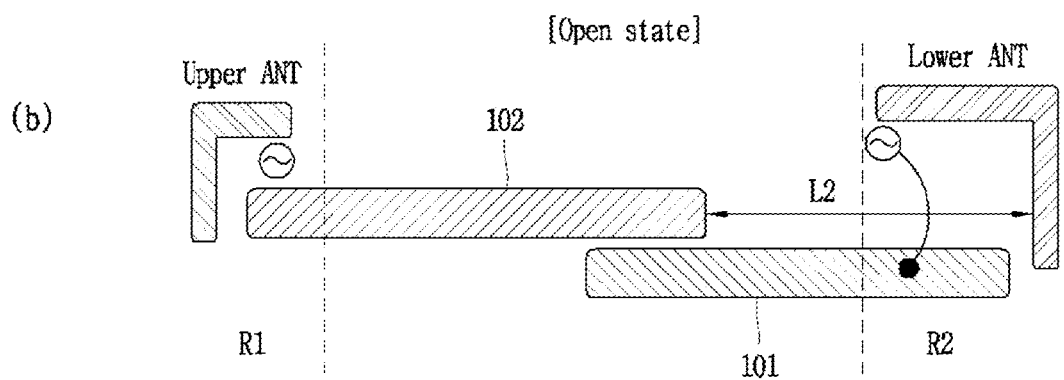

Hereinafter, a description will be given of a frame coupling structure and a change of a ground condition, in response to a change in size of a mobile terminal according to the present disclosure. In this regard, FIG. 12A is a conceptual view illustrating a metal frame coupling structure and a ground condition according to the coupling structure when the first and second frames are coupled in the first state as the closed state. FIG. 12B is a conceptual view illustrating the metal frame coupling structure and the ground condition according to the coupling structure when the first and second frames are coupled in the second state as the open state.

Referring to FIGS. 7A, 8A, and 12A, the front metal part 102 corresponding to the first frame is coupled to the slide metal part 101 in the first state that is the closed state. An upper end antenna region defined on the front metal part 102 is disposed adjacent to the slide metal part 101 that operates as a ground.

Referring to FIGS. 7B and 12B, the front metal part 102 corresponding to the second frame is coupled to the slide metal part 101 in the second state as the open state in which the two metal parts are spaced apart from each other by a predetermined distance d. The upper end antenna region defined on the front metal part 102 is spaced apart the predetermined distance d from the slide metal part 101 that operates as the ground.

Referring to (b) of FIG. 12A and (b) of FIG. 12B, the slide metal part 101 that operates as the ground is not disposed in the upper end antenna region R1 where the upper end antennas are disposed, in the first state and the second state. In the upper end antenna region R1, the front metal part 102 as the fixed part operates as the ground. Thus, there is not a great antenna characteristic variation according to the change in the ground condition in the first state and the second state. In detail, the upper end antenna region R1 does not include the slide frame, namely, the slide metal part 101 that is the ground of the lower end antennas, and is not affected by the slide metal part 101. Accordingly, antenna performance deviation is not caused due to the switching between the first state and the second state, namely, the closed state and the open state.

On the other hand, the change in the ground condition occurs in a lower end antenna region R2 where the lower end antennas are disposed, in the first state and the second state. This is because a distance between the lower end antenna disposed in the lower end antenna region R2 and the ground is changed upon switching from the first state to the second state. The distance between the lower end antenna and the ground is L1 in the first state. The distance between the lower end antenna and the ground changes to L2 in the second state, and thus the antenna performance varies.

The change of the ground condition in the lower end antenna region R2 is caused by the change of the ground adjacent to the lower end antenna. In the first state, the ground adjacent to the lower end antenna is the front metal part 102. In the second state, the ground adjacent to the lower end antenna is the slide metal part 101. Therefore, the lower end antenna region R2 includes a cover frame, namely, the front metal part 102 that is the ground of the upper end antennas, in the closed state, and thus is greatly affected by the front metal part 102 operating as the ground. This causes great antenna performance deviation is caused due to the switching between the first state and the second state, namely, the closed state and the open state.

The antenna performance variation due to the change of the ground condition may occur both in the first and second antennas ANT1 and ANT2 disposed on the lower end portion and the third and fourth antennas ANT3 and ANT4 disposed on the side portions. On the other hand, antenna characteristics of the third and fourth antennas ANT3 and ANT4 disposed on the side portions may be affected by parasitic resonance due to a slot gap between the slide metal part 101 and the front metal part 102.

As aforementioned, the reduction of the ground size causes the problem that efficiencies of the antennas operating at LB and VLB of 4G/5G are lowered. To solve this problem, when the mobile terminal that changing in size according to the present disclosure is retracted, a current path is supposed to be changed on a ground to increase a ground path.

Figure 13:
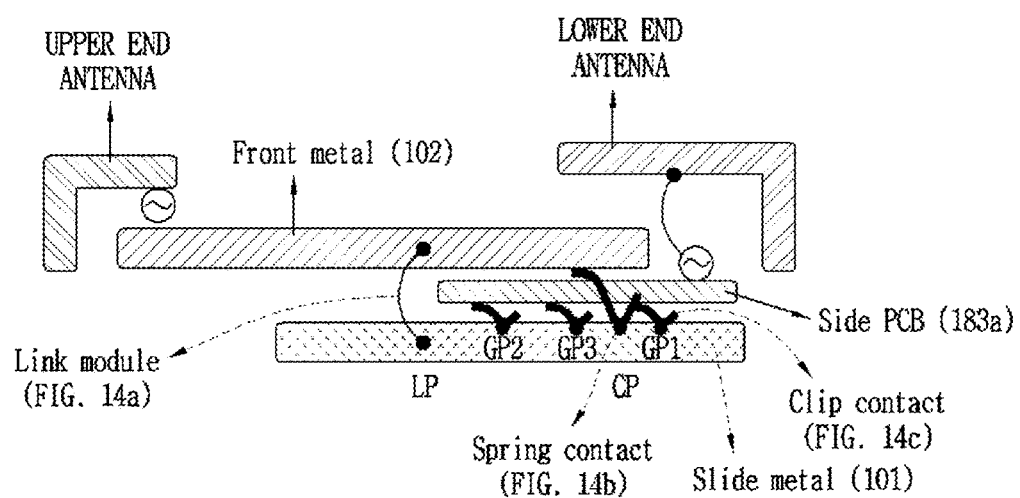
FIG. 13 is a view illustrating a contact structure between a plurality of metal frames and PCBs for maintenance of lower end antenna performance according to the present disclosure.

In this regard, FIG. 13 is a view illustrating a contact structure between a plurality of metal frames and PCBs for maintenance of lower end antenna performance according to the present disclosure. Referring to FIGS. 7A to 13, the slide metal part 101 may include a left side surface, a right side surface, and a bottom side surface defining appearance of the mobile terminal. The front metal part 102 may include an upper side surface and a front portion defining the appearance, and may be configured to be coupled to the slide metal part 101.

On the other hand, at least one side surface of the slide metal part 101 may be ground-connected to the PCB 183 received in the slide metal part 101 at a plurality of points GP1 to GP3. This can reduce a difference in lengths of ground paths caused by the relative movement between the slide metal part 101 and the front metal part 102. Therefore, antenna performance variation of the plurality of antennas according to the relative movement can be reduced. Hereinafter, a mechanism of reducing the difference in lengths of ground paths will be described in detail.

Figure 14A:
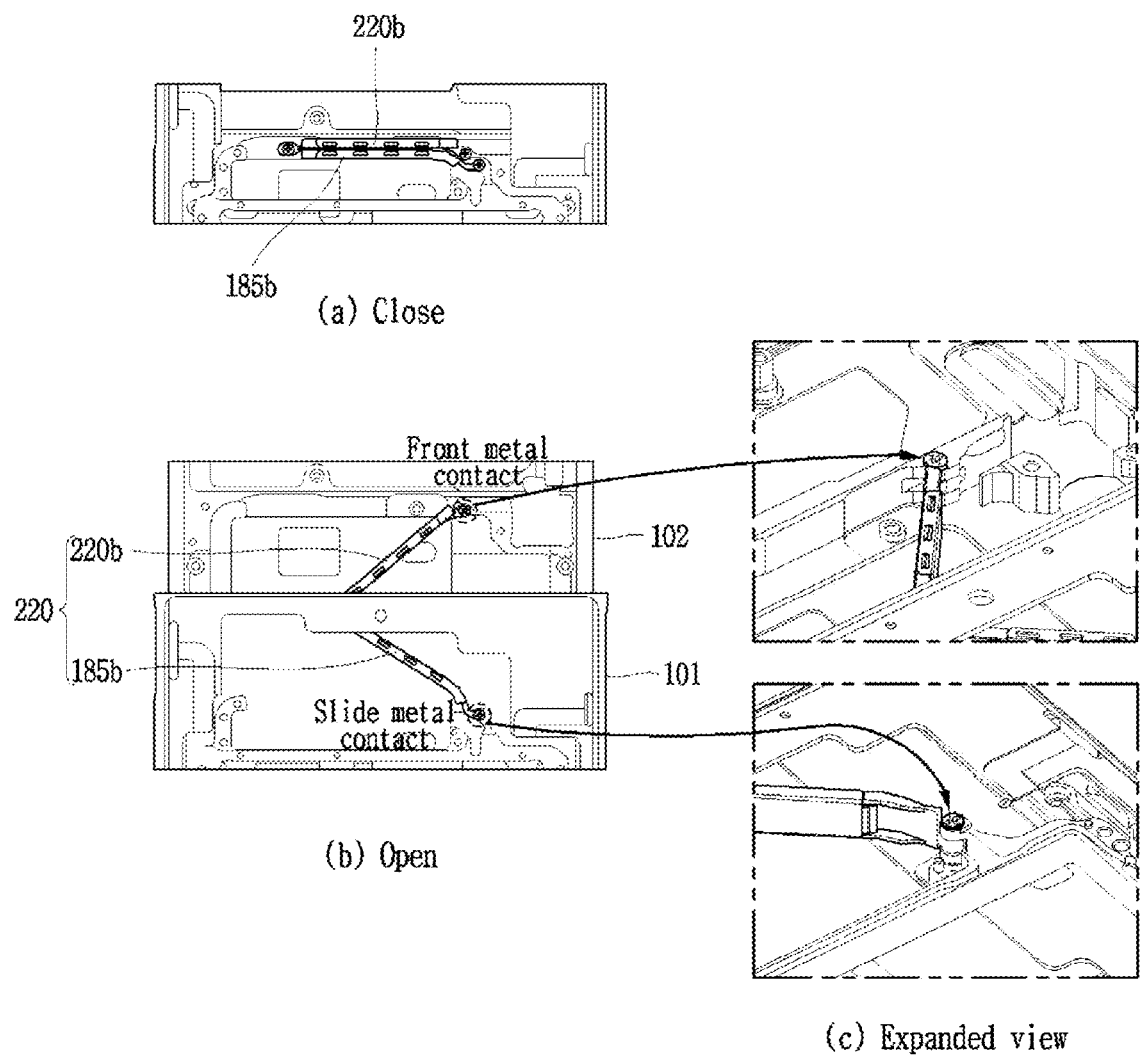
FIGS. 14A to 14C are views illustrating a coupling link structure, a spring contact structure, and a clip contact structure in relation to the contact structure between the plurality of metal frames and PCBS.
Figure 14B:
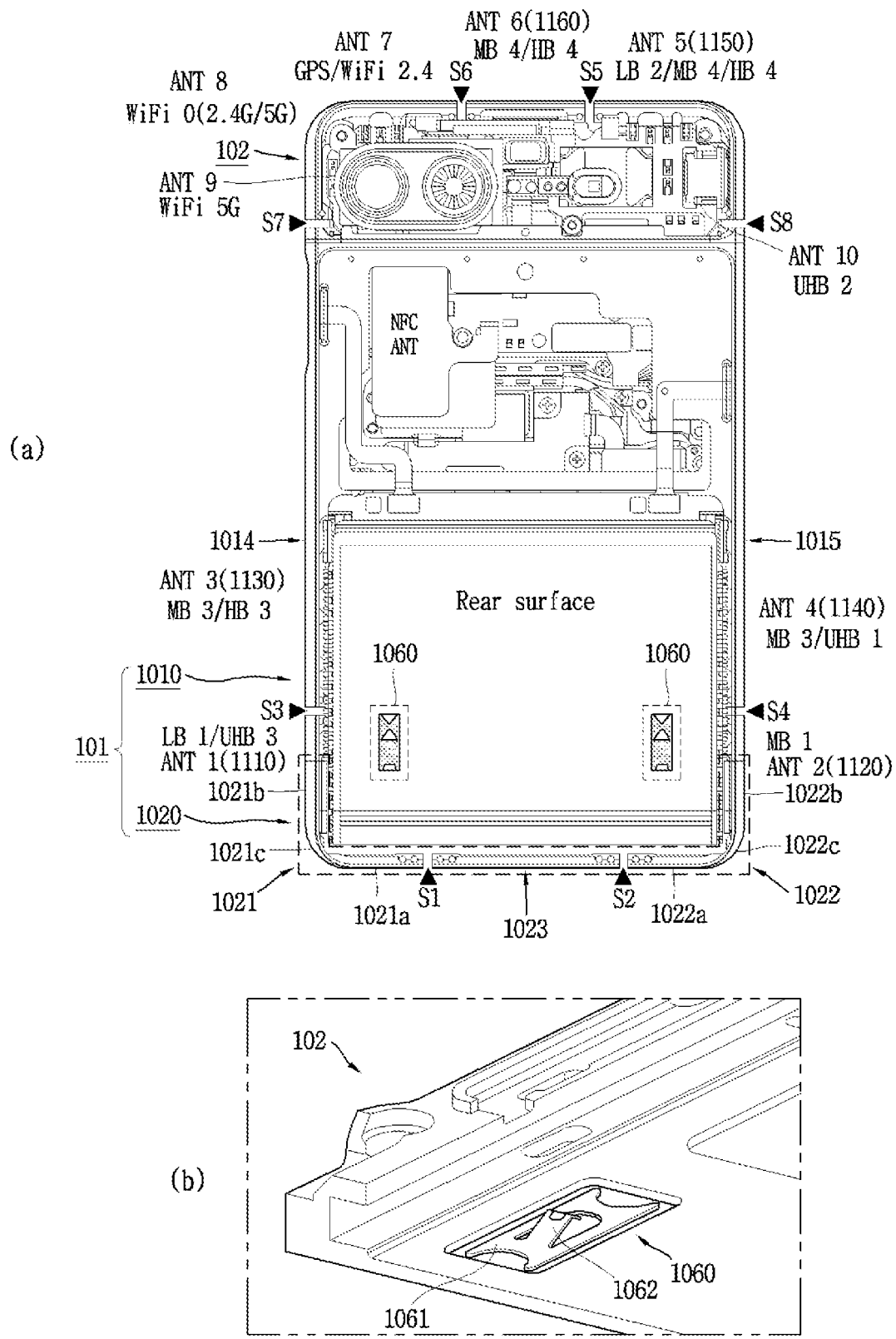
Figure 14C:
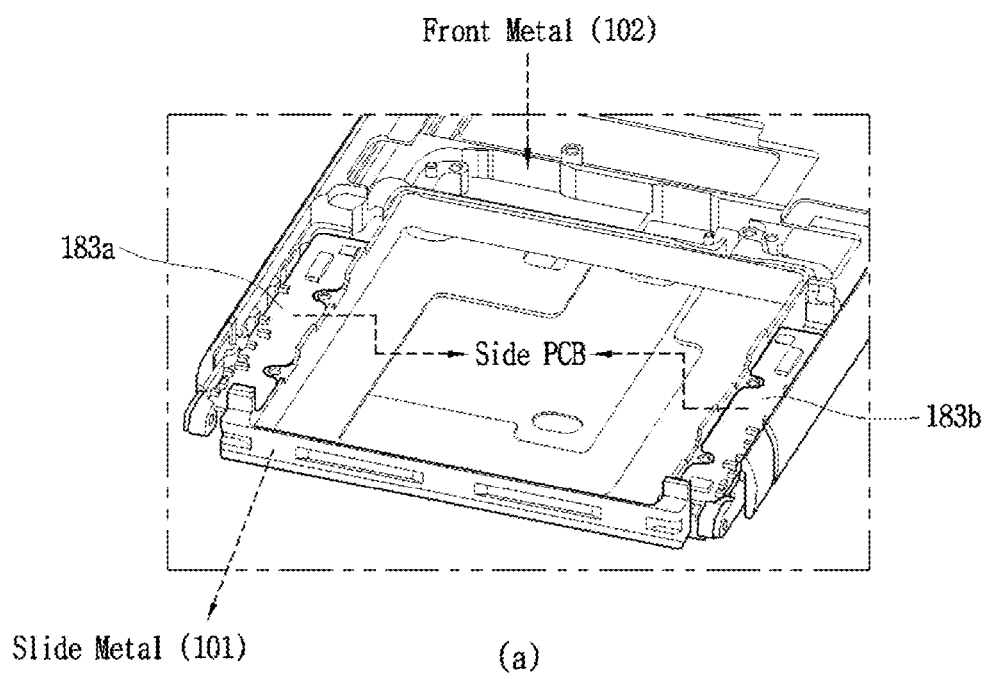
Figure 14C:
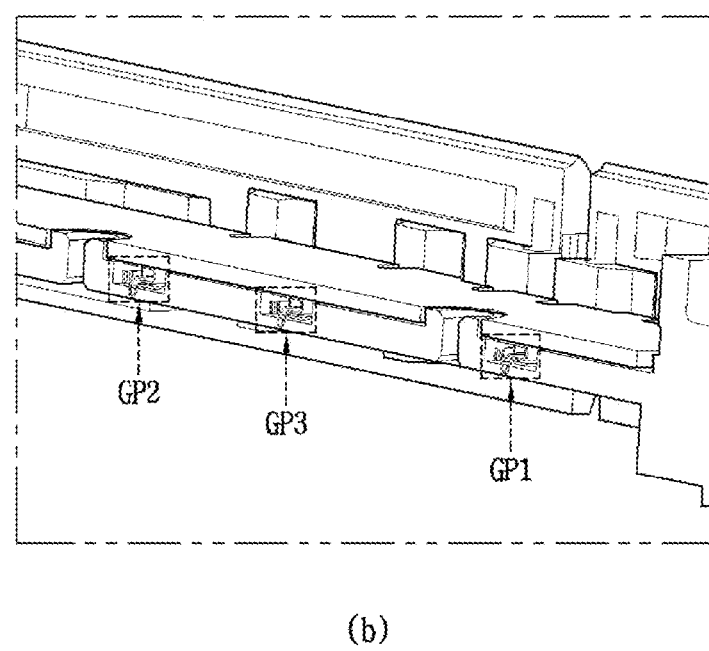

On the other hand, FIGS. 14A to 14C are views illustrating a coupling link structure, a spring contact structure, and a clip contact structure in relation to a contact structure between a plurality of metal frames and PCBS. In detail, FIG. 14A illustrates a coupling link that changes in coupling structure according to the relative movement between the slide metal part 101 corresponding to the first frame and the front metal part 102 corresponding to the second frame. The coupling link 220 is configured such that one end and another end thereof are connected to the slide metal part 101 and the front metal part 102, respectively. Also, the coupling link 220 is configured to couple the slide metal part 101 and the front metal part 102 to each other in a folded state and an unfolded state according to the relative movement between the slide metal part 101 and the front metal part 102.

Referring to FIG. 12A and (a) of FIG. 14A, in the closed state (first state), the coupling link 220 makes the slide metal part 101 and the front metal part 102 coupled to each other in a folded state substantially at an angle of 0 degree. In this regard, the coupling link 220 may include a signal connection part 185b and a support link 220b. The signal connection part 185b and the support link 220b may be referred to as a first coupling link 185b and a second coupling link 220b. Therefore, one end portion of the first coupling link 185b may be connected to the slide metal part 101. Also, one end portion of the second coupling link 220b may be connected to the front metal part 102.

Referring to FIG. 12B and (b) of FIG. 14A, in the open state (first state), the coupling link 220 makes the slide metal part 101 and the front metal part 102 coupled to each other in an unfolded state at a predetermined angle. In this regard, the coupling link 220 may include a signal connection part 185b and a support link 220b. The signal connection part 185b and the support link 220b may be referred to as a first coupling link 185b and a second coupling link 220b. Therefore, one end portion of the first coupling link 185b may be connected to the slide metal part 101. Also, one end portion of the second coupling link 220b may be connected to the front metal part 102. As the slide metal part 101 relatively moves, the one end portion of the first coupling link 185b connected to the slide metal part 101 moves in a first direction D1. On the other hand, the one end portion of the second coupling link 220b connected to the front metal part 102 may move in a second direction D2.

(c) of FIG. 14 is an enlarged view of a portion whether both end portions of the coupling link 220 are coupled to different frames in the open state (second state). One end portion of the coupling link 220 may be coupled through a screw to a screw receiving portion formed in the front portion of the front metal part 102. Another end portion of the coupling link 220 may be coupled through a screw to a screw receiving portion formed in the front portion of the slide metal part 101.

Meanwhile, FIG. 14B illustrates a structure welded on the front metal part 102 at a spring contact point between the slide metal part 101 and the front metal part 102. Referring to FIG. 8A and (a) of FIG. 13B, a plurality of antennas may be disposed on the left side surface, the right side surface, and the bottom side surface of the slide metal part 101. The third antenna (ANT3) 1130 and the fourth antenna (ANT4) 1140 may be disposed on the first metal housing 1010 forming the left side surface and the right side surface of the slide metal part 101. The first antenna (ANT1) 1110 and the second antenna (ANT2) 1120 may be disposed on the second metal housing 1020 formed to partially overlap the first metal housing 1010.

Referring to (a) of FIG. 14B and (b) of FIG. 14B, a spring contact part 1060 may be formed on the front portion of the front metal part 102 to electrically connect the slide metal part 101 and the front metal part 102 in a spring contact manner. The spring contact part 1060 may include a fixed portion 1061 and an elastic coupling portion 1062. The fixed portion 1061 may be attached to the front portion of the front metal part 102 in a welding manner. The elastic coupling portion 1062 may be connected to an inner end portion of the fixed portion 1061 in an inner region where the fixed portion 1061 is not formed, and inclined with respect to the fixed portion 1061 at a predetermined angle in a height direction. The spring contact part 1060 integrally formed with the front metal part 102 may be electrically connected to the slide metal part 101 through the elastic coupling portion 1062.

FIG. 14C illustrates a configuration in which the side PCBs 183a and 183b and the slide metal part 101 are connected to each other at a plurality of points GP1 to GP3. Referring to FIG. 14C, at least one side surface of the slide metal part 101 may be ground-connected to the PCB 183 received in the slide metal part 101 at a plurality of points GP1 to GP3. In detail, the side PCBs 183a and 183b may be placed on the slide metal part 101 to be electrically connected to the slide metal part 101 through C-clips.

Referring to FIGS. 13 to 14C, a point LP where the slide metal part 101 and the front metal part 102 are connected through the coupling link 220 is located higher than other connection points GP1 to GP3 and CP. Therefore, irrespective of the relative movement between the slide metal part 101 and the front metal part 102, the slide metal part 101 and the front metal part 102 can be stably maintained in the coupled state through the coupling link 220. Meanwhile, the slide metal part 101 and the front metal part 102 may be further coupled in a spring contact manner so as to be more stably maintained in the coupled state. Also, during the relative motion between the slide metal part 101 and the front metal part 102, the additional connecting method can reduce an affection by the change of ground paths.

A contact point CP by a spring contact method may be a point located between different connection points GP1 to GP3 on one axis. However, referring to FIGS. 14B and 14C, the contact point CP by the spring contact method is located more inward than the other connection points GP1 to GP3 on another axis. Accordingly, the slide metal part 101 and the front metal part 102 can be maintained in the contact state without collision between contacted portions during the relative movement.

To mitigate the change in lengths of the ground paths according to the change in size of the mobile terminal, a PCB ground switching method according to the present disclosure is proposed. In this regard, the configuration according to the present disclosure will be summarized as follows, but is not limited thereto.

Figure 15A:
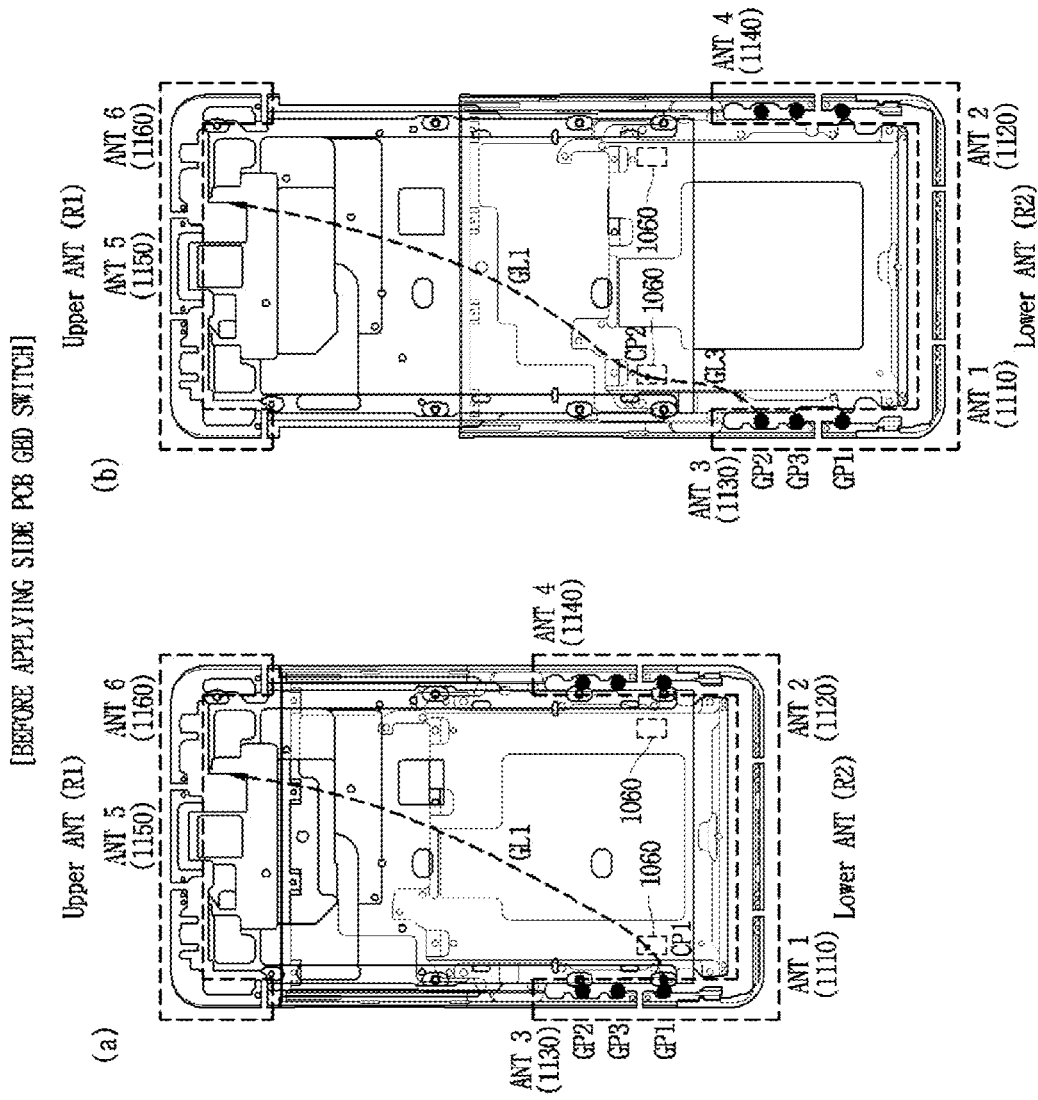
FIG. 15A is a view illustrating a change of ground paths according to a relative movement between frames when a PCB ground switching is not applied. On the other hand.

1) Slide cover metal rim and PCB structure for a lower end antenna configuration of vertical rollable device
2) Front cover metal and slide metal that are divided GND structures of device and link module connecting metals
3) Side PCBs and GND contact structure for designing lower end antennas of device
4) GND clip and switch structure for adjusting GND current path of device FIG. 15A is a view illustrating a change of ground paths according to a relative movement between frames when a PCB ground switching is not applied. On the other hand, FIG. 15B compares ground paths according to PCB ground switching for mitigating the change of the ground paths due to the relative movement between the frames.

Referring to FIGS. 13, 14C, and 15A, feed portions of the lower end antennas are disposed on the side PCBs 183a and 183b, and ground-contact is made at a plurality of points GP1 to GP3. Owing to the ground-contact at the plurality of points GP1 to GP3, the ground state between the slide metal part 101 and the side PCBs 183a and 183b may be maintained stably. However, in the closed/open state, LB resonating frequency and radiation performance deviation may occur due to a difference in ground (GND) paths of LG antennas.

Figure 15B:
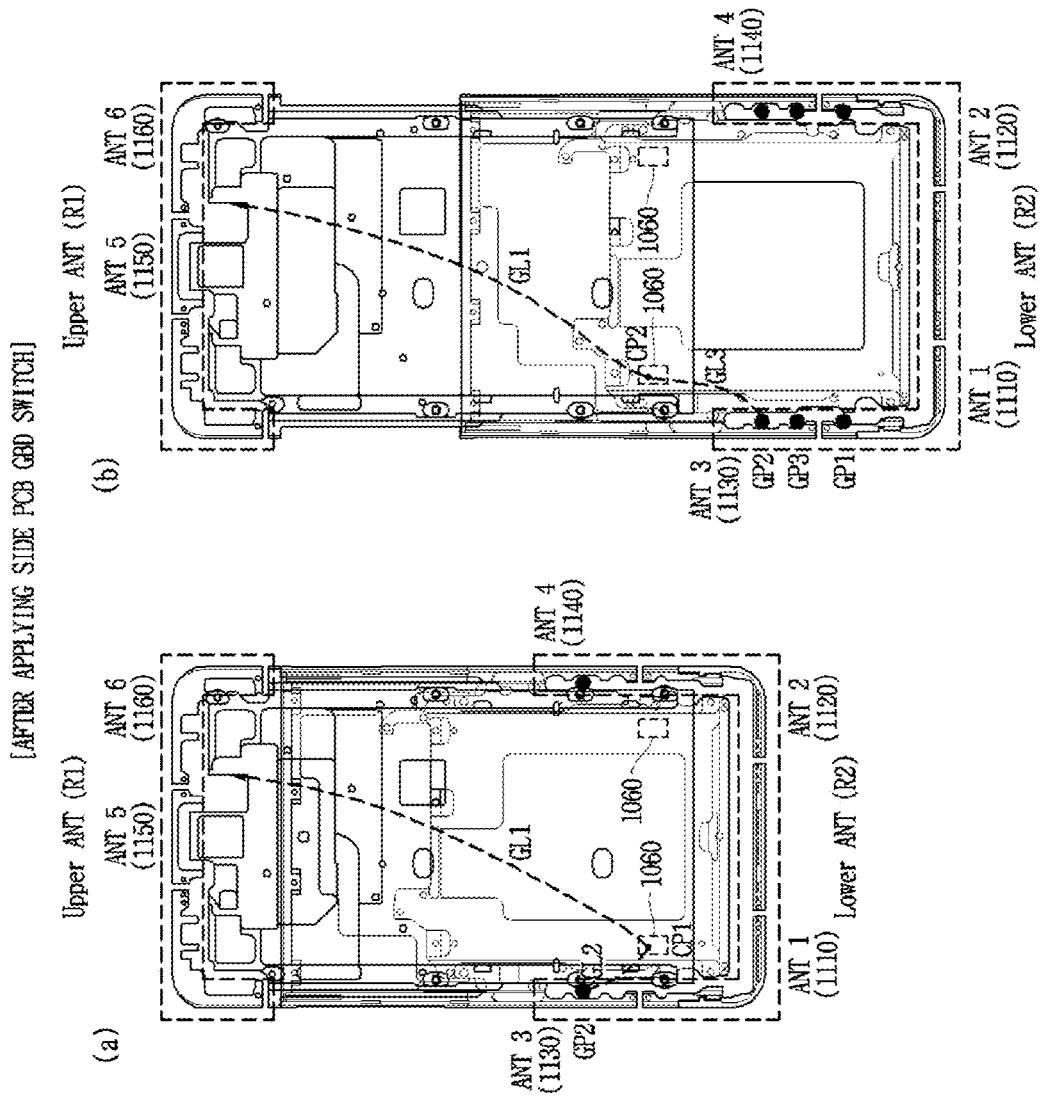
FIG. 15B is a view illustrating a comparison of ground paths according to PCB ground switching for mitigating the change of the ground paths due to the relative movement between the frames.

Referring to FIGS. 13, 14C, and 15B, switches may be applied to GND contact portions of the side PCBs 183a and 183b of the lower end antennas. The GND contact state of the side PCBs 183a and 183b may partially be released (switched off), and thus the GND path in the closed state can be implemented to be similar to that in the open state.

Figure 16A:
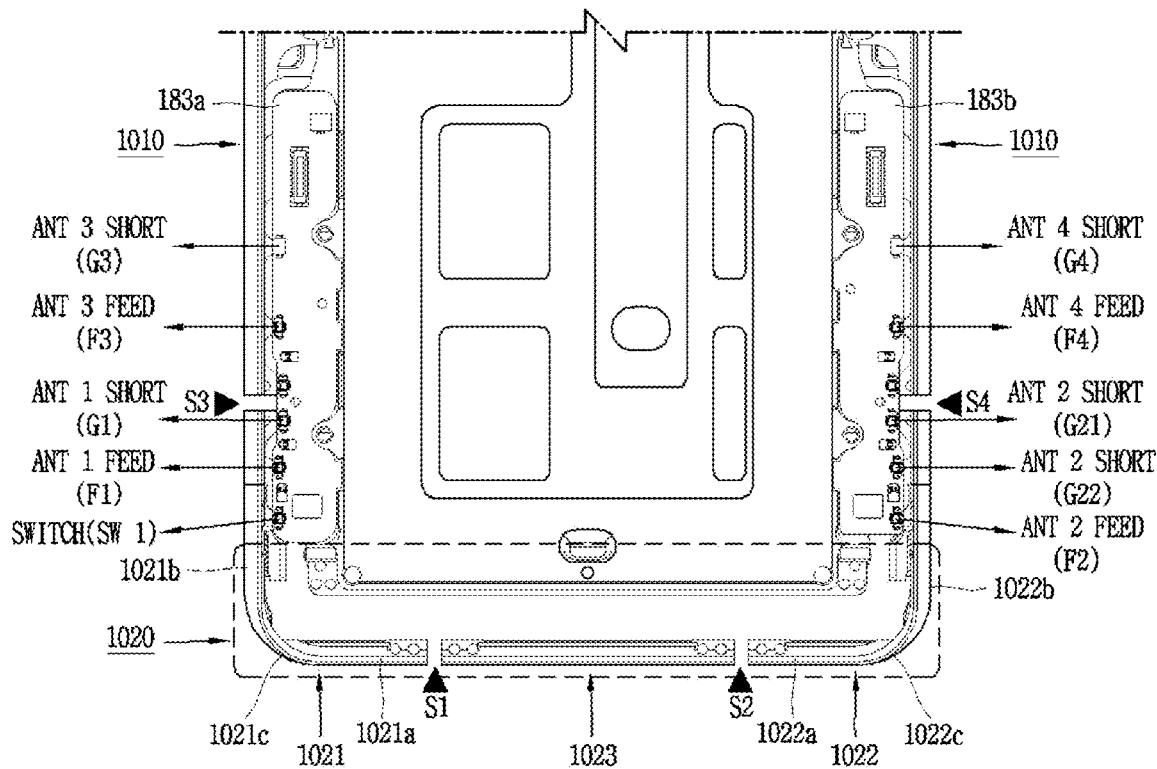
FIG. 16A is a view illustrating an antenna disposition structure disposed in a lower end antenna region and a connection structure between feed portions and ground portions of side PCBs received in a slide metal part in accordance with one embodiment.

In the meantime, FIG. 16A is a view illustrating an antenna disposition structure disposed in a lower end antenna region and a connection structure between feed portions and ground portions of side PCBs received in a slide metal part in accordance with one embodiment. Referring to FIG. 16A, the lower end antennas may include the first antenna ANT1 and the second antenna ANT2. The lower end antennas may include the first antenna ANT1 to the fourth antenna ANT4.

A feed portion F1 and a ground portion G1 may be connected FROM THE SECOND PCB 183a to a first portion of the first metal housing 1010. The contact portion having tension may be disposed between the first portion and the second sub member 1021b. The second PCB 183a may further include a switch SW1 that is configured to adjust an operating frequency of the first antenna ANT1.

The feed portion F1 may be electrically connected to the first metal housing 1010 at a first point. The ground portion G1 may be electrically connected at a second point adjacent to an end portion of the first metal housing 1010. The switch SW1 may be electrically connected to the second sub member 1021b of the second metal housing 1020.

Meanwhile, the feed portion and the ground portion may be formed on both sides of the first metal housing 1010 by the second PCB 183a and the third PCB 183b. The feed portion F1 and the ground portion G1 of the first antenna ANT1 may be connected to one side of the first portion of the first metal housing 1010 from the second PCB 183a. Also, a feed portion F2, a first ground portion G21, and a second ground portion G22 of the second antenna ANT2 may be connected to another side of the first portion of the first metal housing 1010 from the third PCB 183a. Accordingly, the first antenna ANT1 may be implemented by using partial regions of the first metal housing 1010 and the second metal housing 1020. The first antenna ANT1 may be disposed in a region between slits S1 and S3. Also, the second antenna ANT2 may be implemented by using the partial regions of the first metal housing 1010 and the second metal housing 1020. The second antenna ANT2 may be disposed in a region between slits S2 and S4.

A feed portion F3 and a ground portion G3 of the third antenna ANT3 may be connected to one side of the first portion of the first metal housing 1010 from the second PCB 183a. Also, a feed portion F4 and a ground portion G4 of the fourth antenna ANT4 may be connected to another side of the first portion of the first metal housing 1010 from the third PCB 183a. The third antenna ANT3 may be spaced apart from the first antenna ANT1 by the slit S3. The fourth antenna ANT4 may be spaced apart from the second antenna ANT2 by the slit S4.

Referring to FIGS. 2A, 3A, and 7 to 16A, the mobile terminal that changes in size may include the display 151, the plurality of PCBs 181, 183a, and 183b, and the processor 1400, 1450.

The display 151 may include a first region 151a that is exposed to the front surface in the retracted state of the mobile terminal, and a second region 151b that is an expanded region exposed to the front surface in the expanded state of the mobile terminal. The first PCB 181 may include the wireless communication unit 1250, and may be electrically connected to the side PCBs 183a and 183b. The second PCB 183a may be electrically connected to the first PCB 181 and received in one side surface of the slide metal part 101. The third PCB 183b may be electrically connected to the second PCB 183a and received in another side surface of the slide metal part 101.

The slide metal part 101 may be configured by a plurality of metal housings which are coupled to be partially overlaid on each other. The slide metal part 101 may include the first metal housing 1010 and the second metal housing 1020, and the first metal housing 1010 and the second metal housing 1020 may be coupled to be overlaid in a partial region. The first metal housing 1010 includes a left side surface and a right side surface defining the appearance of the mobile terminal. The second metal housing 1020 may include a left side surface, a right side surface, and a bottom side surface defining the appearance. A first conductive member 1021 and a second conductive member 1022 of the second metal housing may be configured to have a plurality of sub members.

Each of the first conductive member 1021 and the second conductive member 1022 may include a first sub member 1021a, 1022a disposed on the bottom side surface, and a second sub member 1021b, 1022b disposed on the left lateral side surface or the right side surface. Also, each of the first conductive member 1021 and the second conductive member 1022 may include a corner region 1021c, 1022c that is formed between the first sub member 1021a, 1022a and the second sub member 1021b, 1022b. The left side surface and the right side surface of the first metal housing 1010 and the second sub members 1021b and 1022b of the second metal housing 1020 may overlap each other. The overlapped first metal housing may not be exposed externally but the second sub member 1021b, 1022b may be exposed externally to operate as an antenna.

The first conductive member 1021 and the second conductive member 1022 disposed in the lower end antenna region R2 may operate as the first antenna (ANT1) 1110 and the second antenna (ANT2) 1120. In detail, the first conductive member 1021 may operate as the first antenna ANT1 through the feed portion F1, and may be connected to the ground at the first point GP1 through the second PCB 183a and the switch SW1. The second conductive member 1021 may operate as the second antenna ANT2 through the second feed portion F2. A third conductive member 1023 may be disposed between the first conductive member 1022 and the second conductive member 1022 to be spaced apart by slits S1 and S2.

Figure 16B:
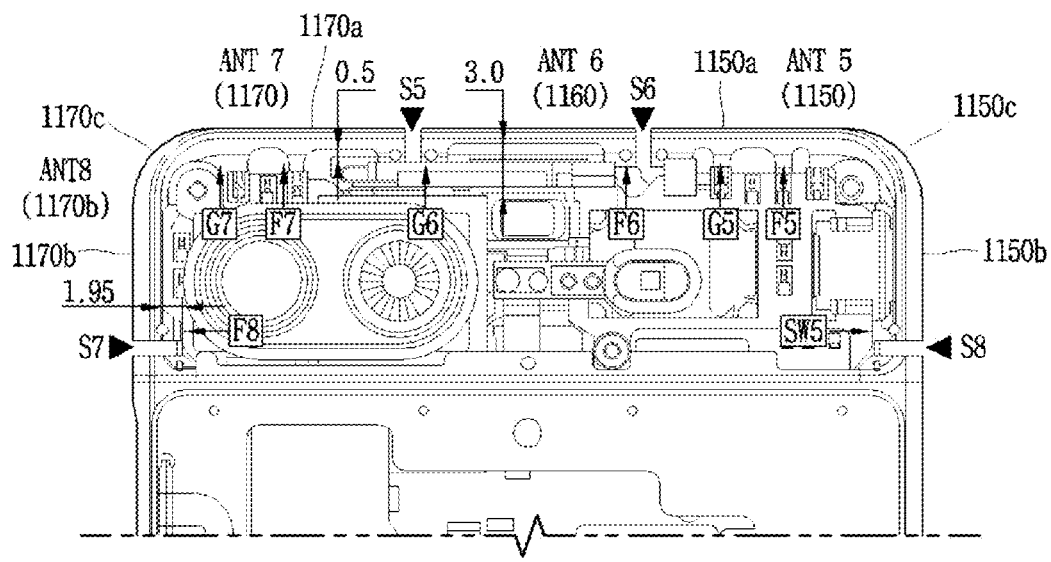
FIG. 16B illustrates an antenna disposition structure and positions of feed portions and ground portions according to the structure in a state, in which PCBs and electronic components are disposed inside the mobile terminal.

In the meantime, FIG. 16B illustrates an antenna disposition structure in a state, in which PCBs and electronic components are disposed inside the mobile terminal, and positions of feed portions and ground portions according to the structure.

A fifth conductive member 1150 and a sixth conductive member 1160 operate as the fifth antenna ANT5 and the sixth antenna ANT6, respectively. A seventh conductive member 1170 is fed at different points to operate as the seventh antenna ANT7 and the eighth antenna ANT8. A slit S5 may be disposed between the fifth conductive member 1150 and the sixth conductive member 1160. A slit S6 may be disposed between the sixth conductive member 1160 and the seventh conductive member 1170. A gap between the slits S5 and S6 may be designed as about 1.5 mm, but is not limited thereto.

The fifth conductive member 1150 and the seventh conductive member 1170 constituting the upper end antennas may be implemented in a symmetrical shape in left and right directions, but are not limited thereto. In this regard, second sub members 1150b and 1170b may be symmetrical with each other in the left and right directions, for the sake of manufacturing. On the other hand, the lengths of the first sub members 1150a and 1170a may be independently designed for optimizing antenna characteristics.

The upper end antennas operate as the fifth antenna (ANT5) 1150 to the seventh antenna (ANT7) 1170. The upper end antennas may alternatively operate as the fifth antenna ANT5 to the eighth antenna (ANT8) 1180. In this case, the eighth antenna (ANT8) 1180 may share a partial antenna region with the seventh antenna (ANT7) 1170. The upper end antennas may be physically spaced apart from one another by a plurality of slits S5 and S6. End portions of the upper end antennas may be physically spaced apart from the slide metal part 101 by a plurality of slits S7 and S8.

The fifth conductive member 1150 to the seventh conductive member 1170 that are disposed on the upper side surface 102a of the front metal part 102 and separated by the slits may operate as the fifth antenna ANT5 to the seventh antenna ANT7. The fifth antenna (ANT5) 1150 includes a first sub member 1150a disposed on the upper side surface, a second sub member 1150b disposed on one side surface (right side surface), and a corner region 1150c. The sixth antenna (ANT6) 1160 is configured as the sixth conductive member 1160 that is separated by the slits S5 and S6 from the fifth conductive member 1150 and the seventh conductive member 1170. The seventh antenna (ANT7) 1170 includes a first sub member 1170a disposed on the upper side surface, a second sub member 1170b disposed on another side surface (left side surface), and a corner region 1170c. The upper end antennas including the fifth antenna (ANT5) 1150 to the seventh antenna (ANT7) 1170 may be disposed on the upper side surface 102a of the front metal part 102.

The fifth antenna (ANT5) 1150 may be electrically connected to an upper PCB 182, which is received in the front metal part 102, through a feed portion F5 at a first point of the first sub member 1150a. The fifth antenna (ANT5) 1150 may be electrically connected to the upper PCB 182 through an inductor L5 at a second point. Also, the fifth antenna (ANT5) 1150 may be electrically connected to the upper PCB 182 through a switch SW5 at one point of the right side surface thereof, such that an operating band of the fifth antenna (ANT5) 1150 can be adjusted. The sixth antenna (ANT6) 1160 may be electrically connected to the upper PCB 182, which is received in the front metal part 102, through a feed portion F6 and a ground portion G6 at both end portions of the sixth conductive member 1160.

The seventh antenna (ANT7) 1170 may be electrically connected to the upper PCB 182, which is received in the front metal part 102, through a feed portion F7 at one point of the first sub member 1170a. The seventh antenna (ANT7) 1170 may be electrically connected to a ground portion G7 at a second point of the corner region 1170c. The eighth antenna ANT8 may be disposed on the left side surface of the front metal part 102 to be adjacent to the seventh antenna ANT7. The eighth antenna ANT8 may be electrically connected to the upper PCB 182 through a feed portion F8 at one point of the second sub member 1070b. The eighth antenna ANT8 may be electrically connected to the ground portion G7 at the second point of the corner region 1170c.

Therefore, the seventh antenna (ANT7) 1170 and the eighth antenna ANT8 may have the common ground structure to be electrically connected to the ground portion G7 at the same second point of the corner region 1170c. Accordingly, the seventh antenna ANT7 that is a GPS/WiFi antenna may be configured in a ground junction structure with the eighth antenna ANT8 that is a WiFi antenna. That is, a region of an integrally-connected conductive member may be partitioned based on a ground so as to implement different antennas. In the meantime, the sixth antenna ANT6 may be electrically connected to the ground portion G6 through a lumped matching element such as an L/C element. This can reduce interference between the sixth antenna ANT6 and the seventh antenna ANT7.

The third antenna ANT3 and the fourth antenna ANT4 corresponding to the side antennas may be disposed on the lower end antenna region R2. The mobile terminal may further include a fourth conductive member 1014 disposed on the left side surface of the first metal housing 1010 and a fifth conductive member 1015 disposed on the right side surface. The fourth conductive member 1014 and the fifth conductive member 1015 may operate as the third antenna ANT3 and the fourth antenna ANT4, respectively. The fourth conductive member 1014 may be connected to the ground at the second point GP2 through the second PCB 183a and a second switch. Therefore, the first point GP1 and the second point GP2 among the ground contact points may selectively be connected through the switches. This can mitigate the change in lengths of the ground paths according to the relative movement between the frames.

The processor 1400, 1450 may be operably coupled to the wireless communication unit 1250, and determine whether the display region is in the first or second state that is a retracted or expanded according to the relative movement between the frames. In the first state (closed state), the processor 1400, 1450 may control the switch SW1 such that the slide metal part 101 is not electrically connected at the first point GP1 to the front metal part 102 through the second PCB 183a. Also, the processor 1400, 1450 may control the switch SW2 such that the slide metal part 101 is electrically connected at the second point GP2 to the front metal part 102 through the second PCB 183a. Therefore, the slide metal part 101 and the front metal part 102 are electrically connected only at the second point GP2.

In the first state (closed state), the length of the ground path may be determined as the sum of a first length GL1 and a second length GL2. The first length GL1 is a length from the first contact point CP1 by the spring contact part 1060 to one point of the upper side surface of the front metal part 102 in the first state. The second length GL2 is a length from the second point GP2 to the first contact point CP.

In the second state (open state), the processor 1400, 1450 may control the switch SW1 such that the slide metal part 101 is electrically connected at the first point GP1 to the front metal part 102 through the second PCB 183a. Also, the processor 1400, 1450 may control the second switch SW2 such that the slide metal part 101 is electrically connected at the second point GP2 to the front metal part 102 through the second PCB 183a. Therefore, the slide metal part 101 and the front metal part 102 are electrically connected at the first point GP1 and the second point.

In the second state (open state), the length of the ground path may be determined as the sum of a first length GL1 and a third length GL3. The first length GL1 is a length from the second contact point CP2 by the spring contact part 1060 to one point of the upper side surface of the front metal part 102 in the second state. Since the spring contact part 1060 is formed on the front metal part 102, the first contact point CP1 and the second contact point CP2 are substantially the same. Therefore, the first length GL1 is substantially the same in the first state and the second state. The third length GL3 is a length from the second point GP2 to the first contact point CP2.

An upper limit of a movement distance between the frames in the second state may be set such that a difference between the second length GL2 and the third length GL3 is less than a threshold value. Or, the upper limit of the movement distance between the frames in the second state may be set such that the second length GL2 and the third length GL3 are substantially the same. To this end, the second point GP2 may be located between the first contact point CP1 by the spring contact part 1060 in the first state and the second contact point CP2 by the spring contact part 1060 in the second state. Accordingly, the difference between the second length GL2 and the third length GL3 may be set to be less than the threshold value, thereby compensating for the difference in lengths of the ground paths according to the movement between the frame.

Meanwhile, the number of ground contacts between the frames may increase to stabilize a ground condition. To this end, the fourth conductive member 1014 may be further connected to the ground at the third point GP3 through the second PCB 183a and a third switch. Therefore, by selectively configuring a ground connection at the third point GP3 between the first point GP1 and the second point GP2, the ground condition can be stabilized and the change in the lengths of the ground paths according to the relative movement between the frames can be compensated for. In this regard, some of the switches to be connected to the first point GP1 to the third point GP3 may be integrated or omitted.

In the first state (closed state), the processor 1400, 1450 may control the third switch SW3 such that the slide metal part 101 is not electrically connected to the front metal part 102 at the third point GP3 through the second PCB 183a. In the second state (open state), the processor 1400, 1450 may control the third switch SW3 such that the slide metal part 101 is electrically connected to the front metal part 102 at the third point GP3 through the second PCB 183a.

In this regard, in the second state, the processor 1400, 1450 may control the slide metal part 101 to be electrically connected to the front metal part 101 through the second PCB 183a at the second point GP2 as an upper point among the first point GP1 to the third point GP3. Also, in the second state, the processor 1400, 1450 may control the slide metal part 101 to be electrically connected to the front metal part 101 through the second PCB 183a at all of the first point GP1 to the third point GP3. Accordingly, the difference in the lengths of the ground paths according to the movement between the frames can be compensated for while improving stability of the ground connection. To this end, in the second state, the processor 1400, 1450 may control the first switch SW1, the second switch SW2, and the third switch SW3 such that the slide metal part 101 is electrically connected to the front metal part 101 through the second PCB 183a at the first point GP1, the second point GP2, and the third point GP3.

Referring to FIGS. 15A and 15B, the connection with the slide metal part 101 at the plurality of points GP1 to GP3 may be performed through the second PCB 183a at one side, but it is not limited thereto. Referring to FIG. 16A, the connection with the slide metal part 101 at the plurality of points GP1 to GP3 may be performed through the third PCB 183b at another side. Or, the connection with the slide metal part 101 at the plurality of points GP1 to GP3 may be performed through the second and third PCB 183a and 183b at both sides.

Figure 17:
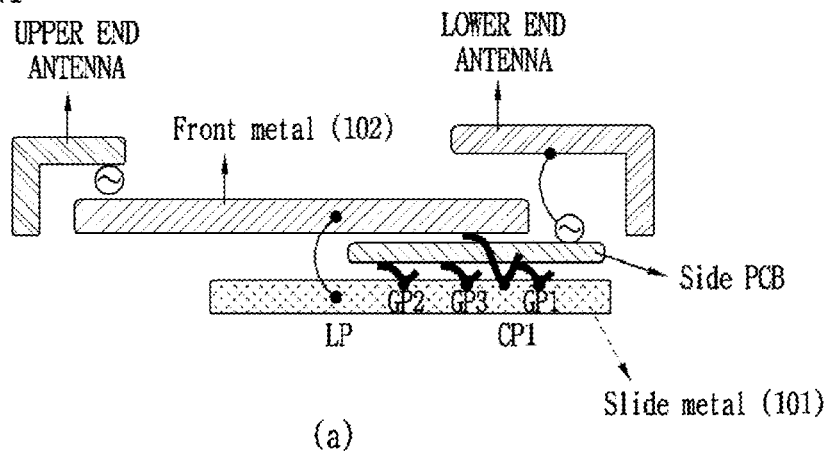
FIG. 17 is a view illustrating a principle that a difference in path length occurs according to a ground-contact between a PCB and a slide metal part and a principle for compensating for the difference in path length in a closed/open state.
Figure 17:
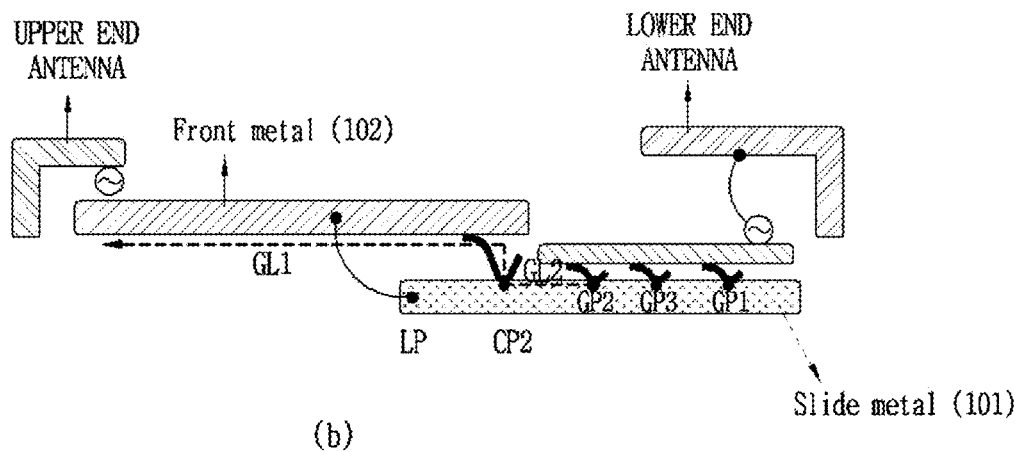
Figure 17:
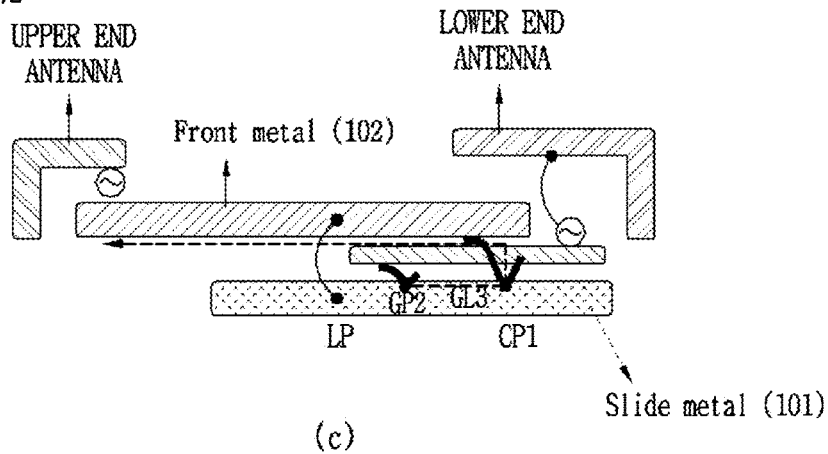

The connection structure between the plurality of frames and PCBs disclosed in the present disclosure may be configured by the coupling link and different types of connection structures. FIG. 17 is a view illustrating a principle that a difference in path length occurs according to a ground-contact between a PCB and a slide metal part and a principle for compensating for the difference in path length in a closed/open state.

Referring to (a) of FIG. 15A and (a) of FIG. 17, in the closed state, the slide metal part 101 is connected to the PCB 183a at all of the first point GP1 to the third point GP3, and thus the ground path is set to have the first length GL1. Although the GND structure is stable by virtue of the connection at the plurality of points, the length of the GND path is shortened. This may cause deterioration of LB antenna performance and antenna performance deviation according to the open/closed state.

Referring to (b) of FIG. 15A and (b) of FIG. 17, in the open state, when the slide metal part 101 is connected to the PCB 183a at all of the first point GP1 to the third point GP3, the length of the ground path increases. The length of the ground path is set to the sum of the first length GL1 and the third length GL3. As the length of the ground path is increased by the third length GL3, the antenna performance deviation is caused according to the open/closed state.

Referring to (a) of FIG. 15B and (c) of FIG. 17, the slide metal part 101 is connected to the PCB 183a only at the second point GP2 in the closed state. Accordingly, the difference in the lengths of the ground paths can be compensated for by the second length GL2 that is the length from a first connection portion Clip1 to the first contact point CP1. Therefore, as the length of the ground path is increased by the second length GL2 even in the closed state, the antenna performance deviation according to the open/closed state can be compensated for. Accordingly, the GND path deviation can be improved by varying the GND contact condition in the closed/open state by use of the switches disposed on the side PCBs. This can result in improving the LB antenna performance and performance deviation according to the closed/open state, in the closed state.

Figure 18:
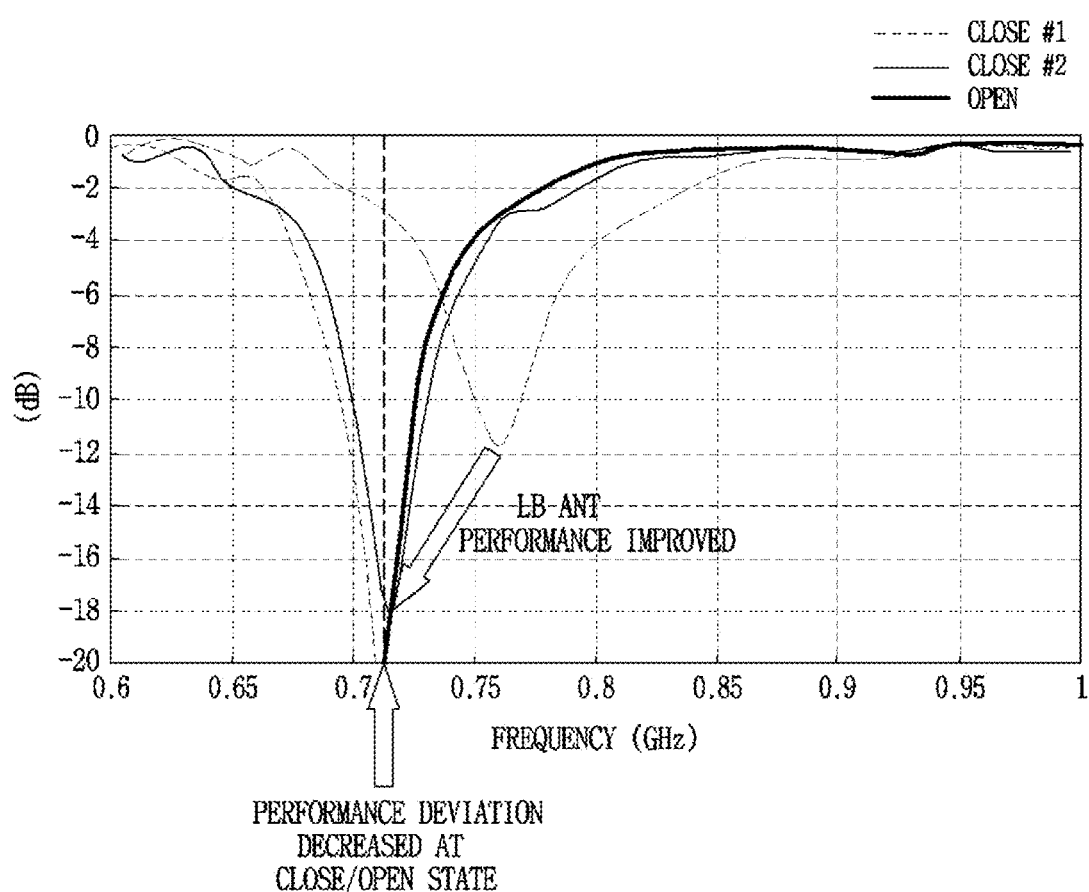
FIG. 18 illustrates comparison results of LB antenna performance between the closed/open state according to (a) to (c) of FIG. 17 and a closed state in which a switching state has changed.

FIG. 18 illustrates comparison results of LB antenna performance between the closed/open state according to (a) to (c) of FIG. 17 and a closed state in which a switching state has changed. In the closed state before the compensation for the ground path ((a) of FIG. 17, CLOSE #1), a resonating frequency has a value of 750 MHz or higher. On the other hand, in the open state ((b) of FIG. 17, OPEN), the resonating frequency has a value of about 700 MHZ. Accordingly, in the closed state before performing the ground path compensation (CLOSE #1), LB antenna performance deterioration and performance deviation occur in the closed/open state. On the other hand, in the closed state after performing the ground path compensation ((c) of FIG. 17, CLOSE #2), the resonating frequency has a value of about 700 MHz. This results in improving the LB antenna performance and performance deviation according to the closed/open state, in the closed state.

Figure 19A:
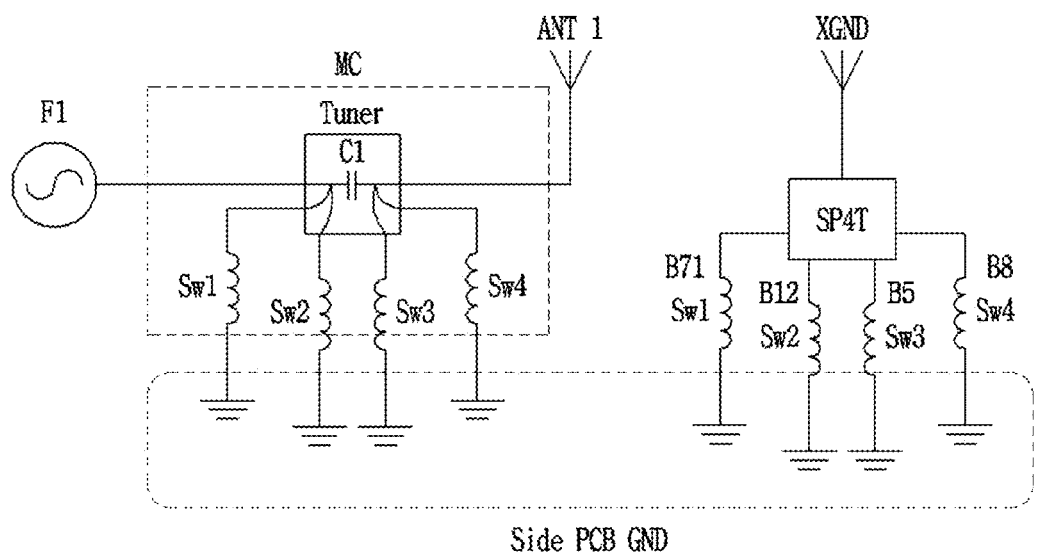
FIG. 19A illustrates an antenna switch topology for compensating for a difference in lengths of ground paths. On the other hand.

Hereinafter, an antenna switch topology for compensating for the difference in lengths of the ground paths will be described. In this regard, FIG. 19A illustrates an antenna switch topology for compensating for the difference in lengths of the ground paths. On the other hand, FIG. 19B illustrates an antenna switch topology between the side PCB and the slide metal part in the closed/open state.

Referring to FIGS. 15B, 16A, and 19A, the first antenna ANT1 may be electrically connected to the feed portion F1 through a matching circuit MC. Also, the first antenna ANT1 may be electrically connected to the ground of the side PCB 183a through a switch configuration within the matching circuit MC. In this regard, the third antenna ANT3 as well as the third antenna ANT1 may be configured similarly to the antenna switch topology of FIG. 19A. Therefore, LB resonating frequency switching is allowed by using an impedance tuner of the antenna and switches SW1 to SW4 of XGND.

Meanwhile, the second antenna ANT2 disposed on another side of the slide metal part 101 may be electrically connected to the feed portion F2 through a matching circuit MC. Also, the second antenna ANT2 may be electrically connected to the ground of the side PCB 183b through a switch configuration within the matching circuit MC. In this regard, the fourth antenna ANT4 as well as the second antenna ANT2 may be configured similarly to the antenna switch topology of FIG. 19A.

Figure 19B:
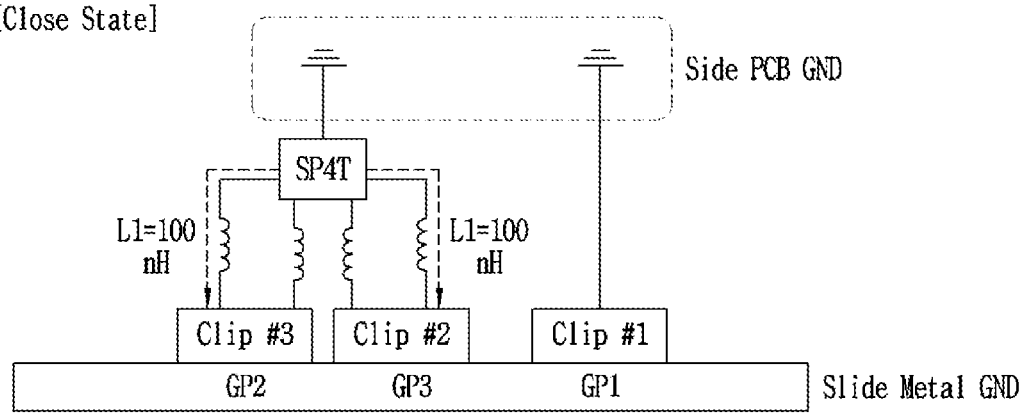
FIG. 19B illustrates an antenna switch topology between a side PCB and a slide metal part in a closed/open state.

On the other hand, to maintain antenna performance at a predetermined level according to the relative movement between the frames, a ground switch topology as illustrated in FIG. 19B may be applied. In the closed state of (a) of FIG. 19B, the ground of the second PCB may be electrically connected to a first connection portion Clip1 at the second point GP2 through a signal line. The ground of the second PCB may be electrically connected to a second connection portion Clip2 and a third connection portion Clip3 through an SP4T switch and a matching circuit at the first point GP1 and the third point GP3, respectively.

Referring to FIGS. 2B to 18 and (a) of FIG. 19B, in the first state, the processor 1400, 1450 may control the SP4T switch to be connected to the second connection portion Clip2 and the third connection point Clip3 through a first inductor L1 of the matching circuit at the third point GP3 and the second point GP2. The first inductor L1 may operate as an open circuit at an operating band of the first antenna ANT1 and operate as a short circuit at DC. Therefore, a switch may be designed to be applied to a GND contact clip of the antenna, to adjust a GND path in the open/closed state. In the closed state, by using the inductor and the like in the switch, RF signal isolation and DC GND stabilization can be designed.

Referring to FIGS. 2B to 18 and (b) of FIG. 19B, in the second state, the processor 1400, 1450 may control the SP4T switch to be connected to the second connection portion Clip2 and the third connection point Clip3 through a second inductor L2 of the matching circuit at the third point GP3 and the second point GP2. The second inductor L2 may operate as a short circuit at an operating band of the first antenna ANT1 and at DC. Here, the second inductor L2 may be replaced with a signal line.

Figure 20A:
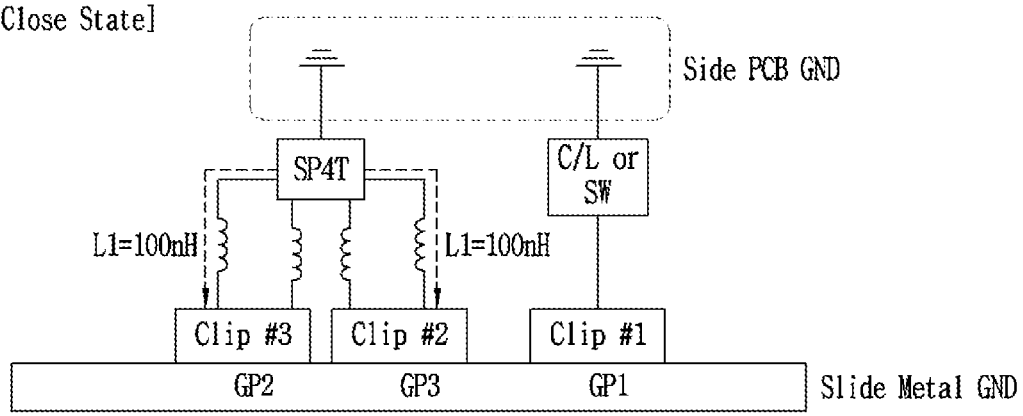
FIG. 20A illustrates a switch connection structure, to which an SP4T switch is applied, between a side PCB and a slide metal part.
Figure 20A:
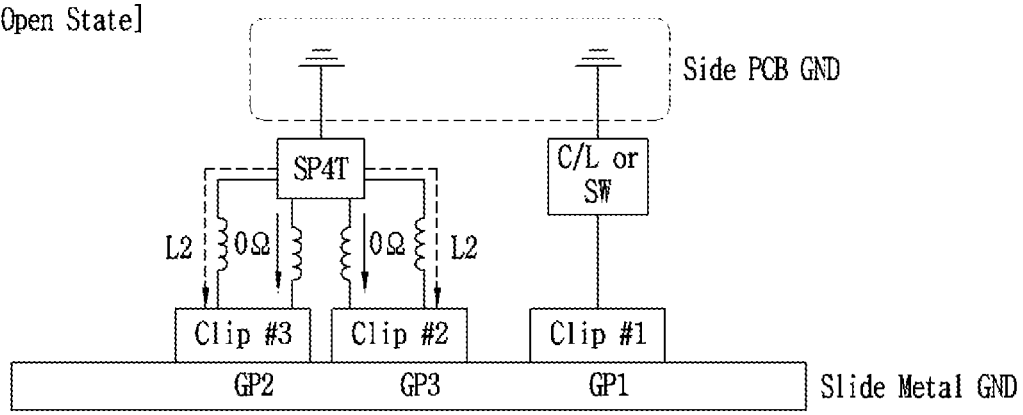
Figure 20B:
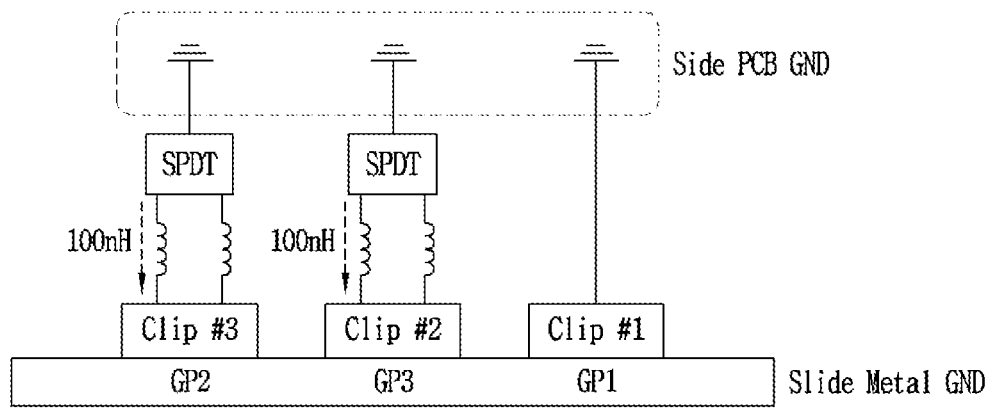
FIG. 20B illustrates a switch connection structure, to which SPDT switches are applied, a tuning circuit, and a switch line structure between the slide PCB and the slide metal part.
Figure 20B:
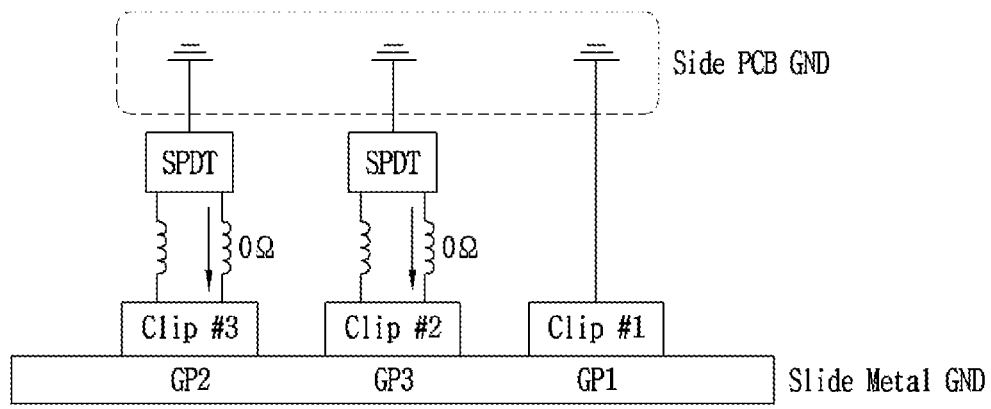
Figure 21A:
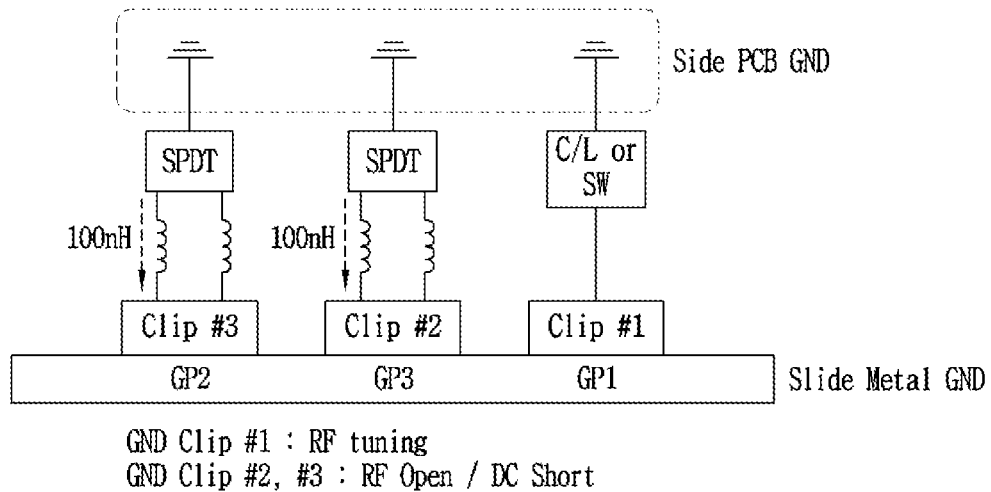
FIG. 21A illustrates a switch connection structure, to which SPDT switches are applied, a tuning circuit, and a switch line structure between the side PCB and the slide metal part.
Figure 21A:
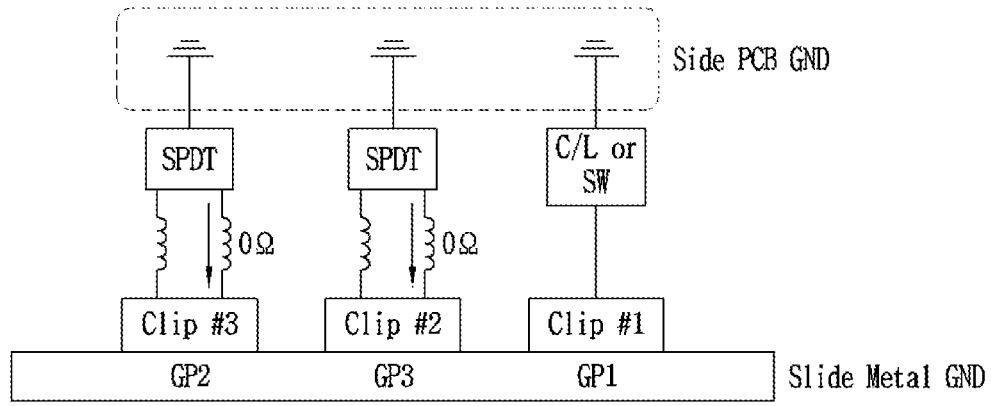
Figure 21B:
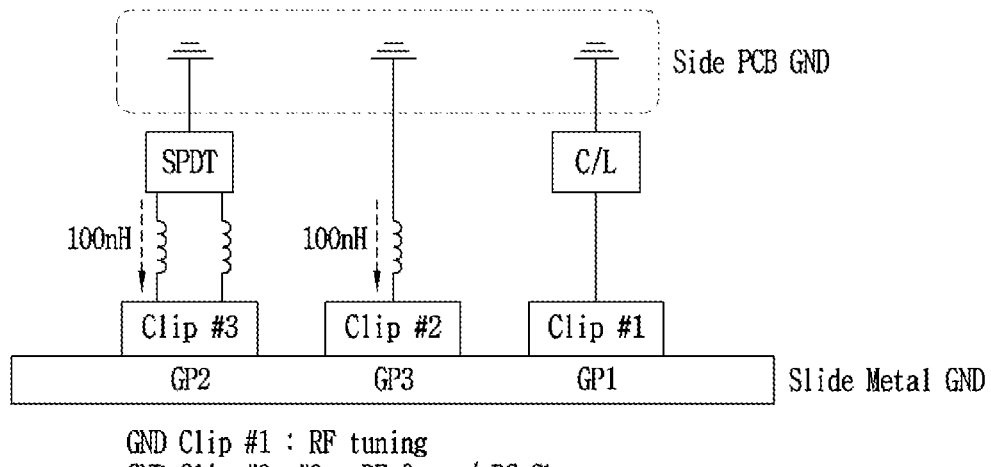
FIG. 21B illustrates a switch connection structure, to which only one SPDT switch is applied, and a tuning circuit structure between the side PCB and the slide metal part.
Figure 21B:
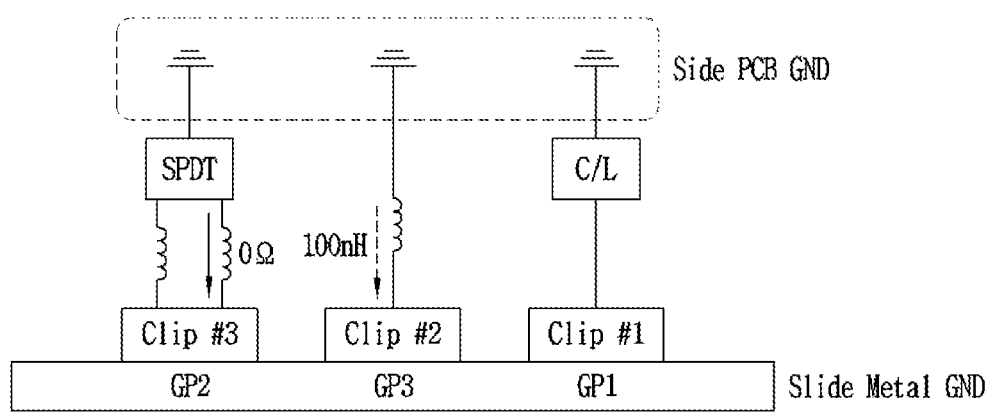

According to another embodiment, the SP4T between the side PCB and the slide metal part 101 may be replaced with an SPDT switch. Also, the signal line between the side PCB and the slide metal part 101 may be configured by applying a tuning circuit or may be replaced with a switch line. In this regard, FIG. 20A illustrates a switch connection structure, to which an SP4T switch is applied, between the side PCB and the slide metal part. FIG. 20B illustrates a switch connection structure, to which SPDT switches are applied, a tuning circuit, and a switch line structure between the slide PCB and the slide metal part. On the other hand, FIG. 21A illustrates a switch connection structure, to which the SPDT switches are applied, a tuning circuit, and a switch line structure between the side PCB and the slide metal part. FIG. 21B illustrates a switch connection structure, to which only one SPDT switch is applied, and a tuning circuit structure between the side PCB and the slide metal part.

Referring to FIG. 20A, the ground of the second PCB may be electrically connected to the first connection portion Clip1 at the second point GP2 through a signal line. The ground of the second PCB may be electrically connected to the second connection portion Clip2 and the third connection portion Clip3 through the SP4T switch and a matching circuit at the first point GP1 and the third point GP3, respectively. When using the SP4T switch, a physical switch configuration can be separated at the first point GP1 and the third point GP3 to independently control the ground connection state. Also, by considering antenna performance or reception performance taken into account external environments, the ground may be connected at all of the first point GP1 to the third point GP3 or independently connected. In this regard, matching circuits connected to the first connection portion Clip1 and the third connection portion Clip3 may be referred to as a first matching circuit MC1 and a third matching circuit MC3.

Referring to FIGS. 2B to 18 and (a) of FIG. 20A, in the first state, the processor 1400, 1450 may control the SP4T switch to be connected to the second connection portion Clip2 and the third connection point Clip3 through the first inductor L1 of the matching circuit at the first point GP1 and the third point GP3. The matching circuit including the first inductor L1 may operate as an open circuit at the operating band of the first antenna ANT1 and operate as the short circuit at DC.

Referring to FIGS. 2B to 18 and (b) of FIG. 20A, in the first state, the processor 1400, 1450 may control the SP4T switch to be connected to the second connection portion Clip2 and the third connection point Clip3 through the second inductor L2 of the matching circuit at the first point GP1 and the third point GP3. The matching circuit including the second inductor L2 may operate as the short circuit at the operating band of the first antenna ANT1 and at DC. Here, the second inductor L2 may be replaced with a signal line.

Referring to FIGS. 20B and 21A, in the closed/open state, the ground of the second PCB may be electrically connected to the first connection portion through the switch and/or the first matching circuit MC1 at the second point GP2. The switch may be disposed in the first matching circuit MC1 to adjust the operating band of the first antenna ANT1. Or, the switch may be disposed separately from the first matching circuit MC1 to change the connection state at the second point GP2.

Referring to FIG. 20B, the ground connection state may change at the first point GP1 and the third point GP3 by using the SPDT switches. Referring to FIG. 21A, the ground connection state may change at the first point GP1 and the third point GP3 by using the SPDT switches. In this case, the switches of the second and third connection portions Clip2 and Clip3 may be physically separated and controlled by tuning a lumped element C/L or switch on the first connection portion Clip1.

Referring to FIGS. 2B to 19 and FIGS. 20B and 20A, when the ground of the second PCB is connected to the first connection portion Clip1 at the second point GP2 through the switch, the processor 1400 may control the first matching circuit MC1 according to the operating band of the first antenna ANT1. Therefore, the antenna resonating frequency and the ground can be turned by adding the lumped element C/L and the switch to the first connection portion Clip1. In this regard, matching circuits connected to the first connection portion Clip1, the second connection portion Clip2, and the third connection portion Clip3 may be referred to as a first matching circuit MC1, a second matching circuit MC2, and a third matching circuit MC3.

Referring to FIG. 21B, the first connection portion Clip1 may be connected to the ground for the purpose of RF tuning. The second connection portion Clip2 may be connected to the ground for the purpose of open/DC short. The third connection portion Clip3 is connected to the ground for the purpose of RF open/DC short through the SPDT switch in the closed state. On the other hand, the third connection portion Clip3 is connected to the ground for the purpose of RF & DC short through the SPDT switch in the open state. To reduce the number of switches, one lumped element fixed to the second connection portion Clip2 may be applied to implement RF open/DC short regardless of the closed/open state.

In this regard, the ground of the second PCB may be electrically connected to the first connection portion Clip1 at the second point GP2 through the first matching circuit MC1. The ground of the second PCB may be electrically connected to the second connection portion Clip2 at the third point GP3 through the first inductor L1. On the other hand, the ground of the second PCB may be electrically connected to the third connection portion Clip1 at the first point GP1 through the SPDT switch and the third matching circuit MC3.

Referring to FIGS. 2B to 18 and FIG. 21B, in the first state, the processor 1400, 1450 may control the SPDT switch such that the ground of the second PCB is electrically connected to the third connection portion Clip3 at the first point GP1 through the first inductor L1 of the third matching circuit MC3. Accordingly, the first inductor L1 may be selected and the third matching circuit MC3 may operate as an open circuit at the operating band of the first antenna and operate as a short circuit at DC.

In the second state, the processor 1400, 1450 may control the SPDT switch such that the ground of the second PCB is electrically connected to the third connection portion Clip3 at the first point GP1 through the second inductor L2 of the third matching circuit MC3. The second inductor L2 may be selected and the third matching circuit MC3 may operate as a short circuit at the operating band of the first antenna and at DC.

Hereinafter, a change of antenna radiation efficiency according to a change of ground switch topology in a closed/open state will be described. Referring to (a) and (b) of FIG. 19B, the first inductor L1 or the second inductor L2 is selected in the closed/open state. Therefore, when the first inductor L1 is selected in the closed state (CLOSE #1), the RF ground connection is released at the first and third points GP1 and GP3, and the length of the ground path is elongated as illustrated in (c) of FIG. 17. On the other hand, when the second inductor L2 is selected in the closed state (CLOSE #2), the RF ground connection is carried out at the first and third points GP1 and GP3, and the length of the ground path is shortened as illustrated in (a) of FIG. 17.

Figure 22A:
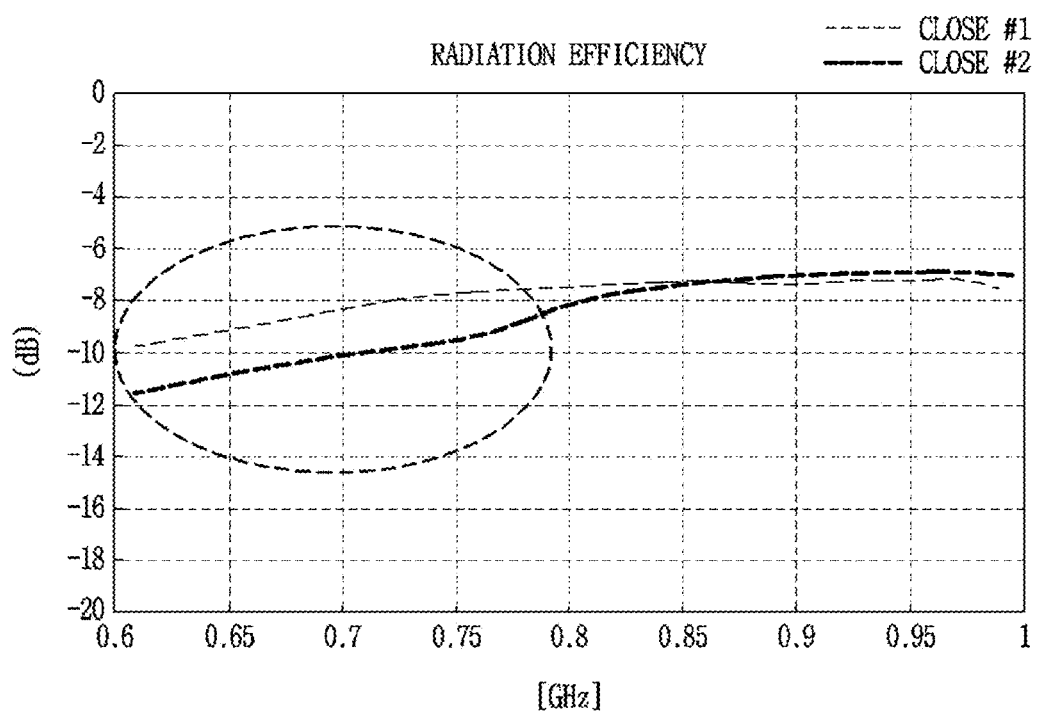
FIG. 22A illustrates radiation efficiency change according to a change of a ground condition in a closed state.

FIG. 22A illustrates a radiation efficiency change according to a change of a ground condition in the closed state. Therefore, radiation efficiency is increased by virtue of the elongated length of the ground path in CLOSE #1 in which the first inductor L1 playing an RF open role is selected. On the other hand, radiation efficiency is decreased due to the shortened length of the ground path in CLOSE #2 in which the second inductor L2 playing an RF short role is selected. Therefore, the radiation efficiency of VLB (600 to 750 MHz) can be improved by varying the GND condition of the antenna.

Figure 22B:
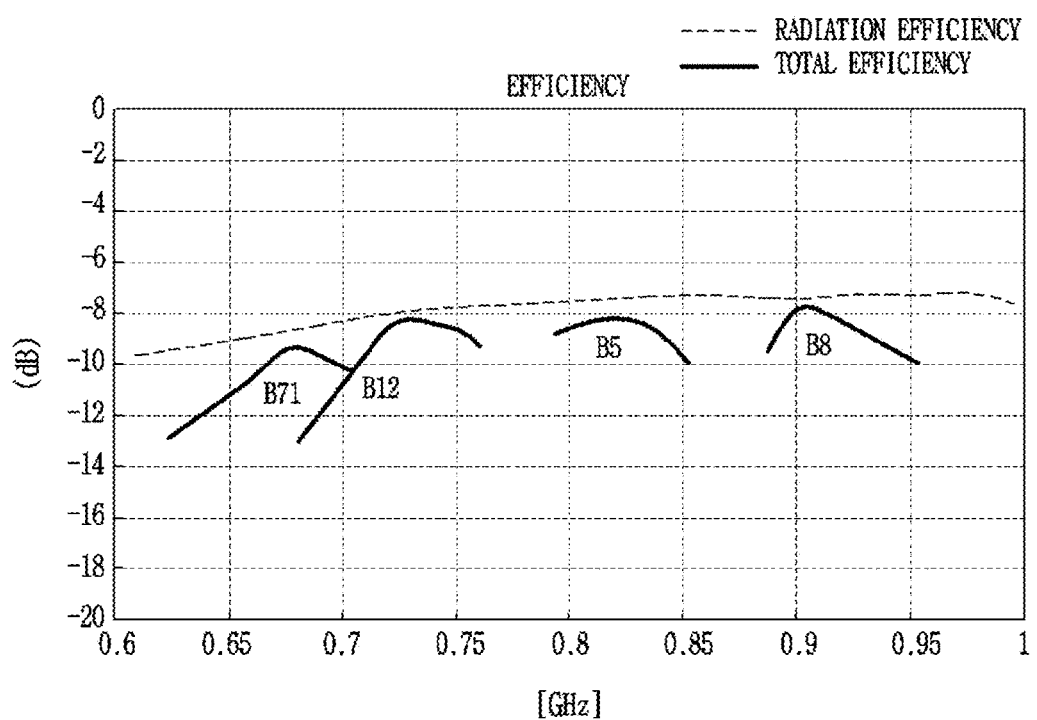
FIG. 22B compares radiation efficiencies for each band, in a closed state, when applying a GND condition and an LB antenna band switching, in a closed state.
Figure 23:
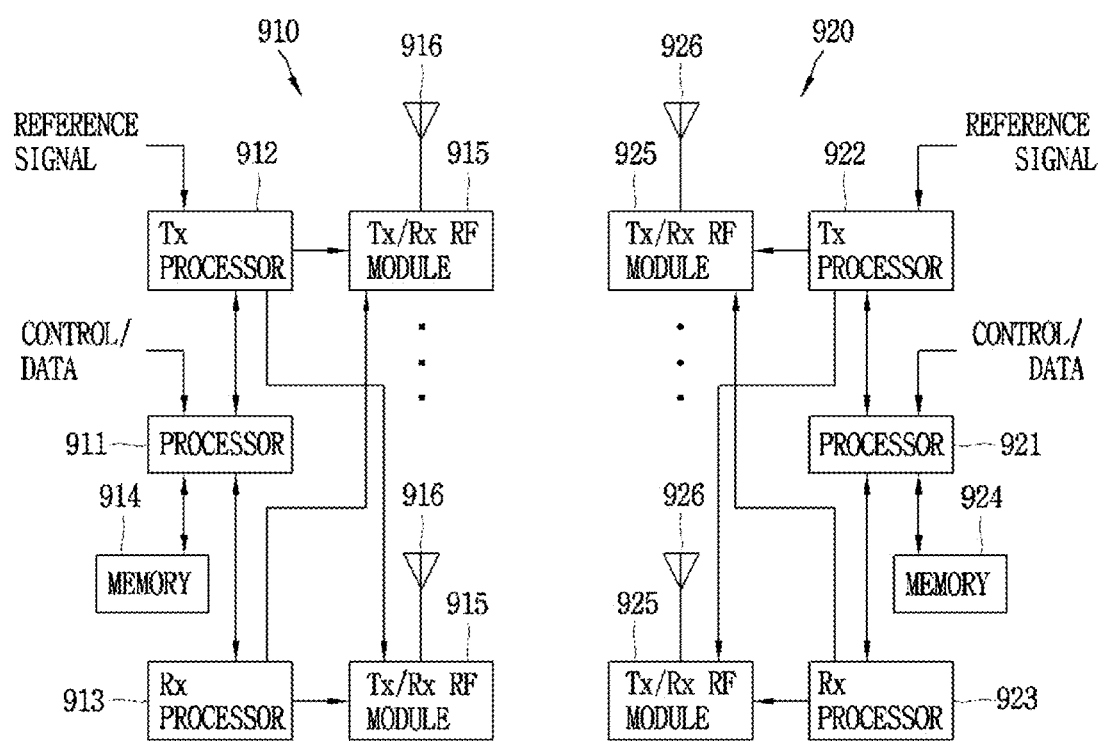
FIG. 23 is an exemplary block diagram of a wireless communication system that is applicable to methods proposed in the present disclosure.

FIG. 22B compares radiation efficiencies for each band, in a closed state, when applying a GND condition and an LB antenna band switching. The matching circuit MC and the switch of FIG. 19A may be applied to the LB antenna. On the other hand, the first matching circuit MC1 that is the variable matching circuit of FIGS. 20B and 21A may be applied to the second point GP2. The first matching circuit MC1 that is the variable matching circuit may be a matching circuit for each band applied to the ground of FIG. 19A.

Referring to FIGS. 16A and 19A to 22B, in the closed state, the GND condition may be applied and the LB antenna band switching may be applied to both the feed portion F1 and the ground portion G1, to optimize the efficiency characteristic for each band. Therefore, the matching circuits of the feed portion F1 and the ground portion G1 may be switched to optimize the antenna efficiency characteristics in B71, B12, B5, and B8 bands.

The electronic device may further include a transceiver circuit 1250 and a baseband processor 1400. The transceiver circuit 1250 may be operably coupled to the first antenna module and the second antenna module. The transceiver circuit 1200 may be configured to control the first antenna module and the second antenna module. In this regard, the transceiver circuit 1250 may switch on or off signals applied to the first antenna module and the second antenna module or control magnitudes of such signals.

The baseband processor 1400 corresponding to a modem may be operably coupled to the transceiver circuit 1250. The baseband processor 1400 may perform MIMO through the first antenna module and the second antenna module.

In this regard, the baseband processor 1400 may control the transceiver circuit 1250 to perform UL-MIMO by transmitting a first signal and a second signal. Also, the baseband processor 1400 may control the transceiver circuit 1250 to perform DL-MIMO by receiving the first signal and the second signal.

When the quality of a signal received through the first antenna module or the second antenna module is lower than or equal to a threshold value, the corresponding antenna module may be switched to another connectivity. For example, when the quality of a signal received through the first antenna module or the second antenna module is lower than or equal to a threshold value, the corresponding antenna module may be switched to another communication system, namely, switching between 4G and 5G communication systems may be performed.

In this regard, when the first signal received through the first antenna module is lower than or equal to the threshold value, the baseband processor 1400 may release a MIMO mode and switch to the dual connectivity state. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the first antenna module may be made. Therefore, the electronic device can be switched to an EN-DC state. Meanwhile, when 4G MIMO is performed through the first antenna module and the second antenna module, switching to the 5G communication system through the first antenna module may be made. Therefore, the electronic device can be switched to an EN-DC state.

As another example, the baseband processor 1400 may release the MIMO mode and switch to a dual connectivity state when the second signal received through the second antenna module is lower than or equal to the threshold value. The baseband processor 1400 may control the transceiver circuit 1250 to switch to the dual connectivity state through the first antenna module and the second antenna module.

In this regard, when 5G MIMO is performed through the first antenna module and the second antenna module, switching to the 4G communication system through the second antenna module may be made. Therefore, the electronic device can be switched to an EN-DC state. Meanwhile, when 4G MIMO is performed through the first antenna module and the second antenna module, switching to the 5G communication system through the second antenna module may be made. Therefore, the electronic device can be switched to an EN-DC state.

As described above, the electronic device may operate in the EN-DC state of maintaining a connectivity state with both the 4G communication system and the 5G communication system. In this regard, a first antenna module and a second antenna module may be configured to operate in a first communication system and a second communication system, respectively. Here, the first and second communication systems may be a 4G communication system and a 5G communication system, but the present disclosure is not limited thereto.

On the other hand, when quality of a signal received through an antenna module in the EN-DC state is less than or equal to a threshold value, the baseband processor 1400 may control the transceiver circuit to receive a signal of another communication system through the antenna module. In this regard, the baseband processor 1400 may determine whether the quality of the first signal of the first communication system received through the first antenna module is lower than or equal to the threshold value. When the quality of the first signal is less than or equal to the threshold value, the baseband processor 1400 may control the transceiver circuit 1250 to receive the second signal of the second communication system through the first antenna module.

In this regard, when the first communication system and the second communication system use the same band, an operating frequency of the transceiver circuit 1250 may be set equally, and only magnitude and phase of a signal may be controlled. On the other hand, when the first communication system and the second communication system use different bands, magnitude and phase of a signal may be controlled while changing the operating frequency of the transceiver circuit 1250.

As another example, the baseband processor 1400 may determine whether the quality of the second signal of the second communication system received through the second antenna module is lower than or equal to the threshold value. When the quality of the second signal is less than or equal to the threshold value, the baseband processor 1400 may control the transceiver circuit 1250 to receive the first signal of the first communication system through the second antenna module.

In this regard, when the first communication system and the second communication system use the same band, an operating frequency of the transceiver circuit 1250 may be set equally, and only magnitude and phase of a signal may be controlled. On the other hand, when the first communication system and the second communication system use different bands, magnitude and phase of a signal may be controlled while changing the operating frequency of the transceiver circuit 1250.

Meanwhile, the electronic device may be allocated with time/frequency resources for MIMO or EN-DC from the base station. In this regard, the baseband processor 1400 may determine whether a resource including a specific time section and a frequency band is allocated as a DL-MIMO resource through blind decoding for a PDCCH region and a corresponding resource region. The baseband processor 1400 may control the transceiver circuit 1250 to receive the first signal through the first antenna module and the second signal through the second antenna module in the allocated specific resource.

In this regard, the first signal of the first communication system and the second signal of the second communication system may be received through the first antenna module and the second antenna module, respectively, thereby switching to the EN-DC state or maintaining the current state. Alternatively, 4G DL MIMO may be performed by receiving the first signal and the second signal of the 4G communication system through the first antenna module and the second antenna module. Alternatively, 5G DL MIMO may be performed by receiving the first signal and the second signal of the 5G communication system through the first antenna module and the second antenna module.

As another example, the first signal of the first communication system and the second signal of the second communication system may be transmitted through the first antenna module and the second antenna module, respectively, thereby switching to the EN-DC state or maintaining the current state. Alternatively, 4G UL MIMO may be performed by transmitting the first signal and the second signal of the 4G communication system through the first antenna module and the second antenna module. Alternatively, 5G UL MIMO may be performed by transmitting the first signal and the second signal of the 5G communication system through the first antenna module and the second antenna module.

A dual connectivity state may be specified such that the electronic device is operated in an EN-DC, NGEN-DC, or NR-DC configuration as illustrated in FIG. 1C. EN-DC or NGEN-DC band combinations may include at least one E-UTRA operating band. Specifically, operating bands for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

A UE channel bandwidth for EN-DC may be defined. In this regard, a UE channel bandwidth for intra-band EN-DC in FR1 may be defined. Channel arrangements for DC may be defined. In this regard, channel spacing for intra-band EN-DC carriers may be defined.

The configuration for EN-DC may be defined. Specifically, configurations for intra-band contiguous EN-DC, intra-band non-contiguous EN-DC, inter-band EN-DC in FR1, inter-band EN-DC including FR2, inter-band EN-DC including FR1 and FR2, and inter-band EN-DC between FR1 and FR2 may be defined.

As an example, UL EN-DC configuration may be defined for 2, 3, 4, 5, or 6 bands in FR1. In this regard, the UL EN-DC configuration for 2, 3, 4, 5, or 6 bands in FR1 may be made of a combination of EUTRA and NR configurations. This EN-DC, NGEN-DC, or NR-DC configuration may also be defined for downlink (DL) as well as uplink (UL).

Transmitter power may be defined in relation to EN-DC. UE maximum output power and UE maximum output power reduction may be defined for each configuration of the above-described EN-DCs. UE additional maximum output power reduction may be defined in relation to EN-DC. Configured output power for EN-DC and configured output power for NR-DC may be defined.

The foregoing description has been given of the configuration that the electronic device having the plurality o9f transceivers and antennas according to the embodiment performs the MIMO and/or the CA. In this regard, the electronic devices that performs the MIMO and/or the CA may operate in an EN-DC configuration so as to be in an EN-DC state with eNB and gNB. Hereinafter, a wireless communication system including an electronic device performing MIMO and/or CA operations and a base station will be described. In this regard, FIG. 19 illustrates a block diagram of a wireless communication system that is applicable to methods proposed herein.

Figure 19B:
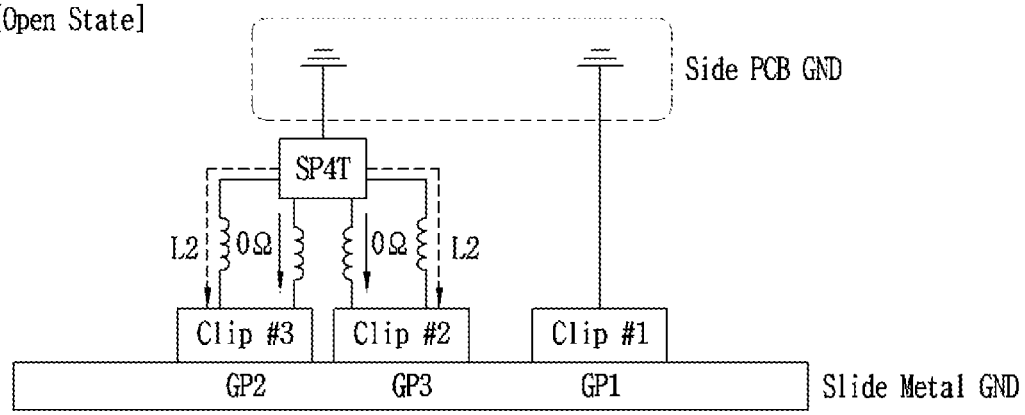

Referring to FIG. 19, the wireless communication system includes a first communication device 910 and/or a second communication device 920. The term 'A and/or B' may be interpreted as having the same meaning as 'at least one of A and B'. The first communication device may denote a base station and the second communication device may denote a terminal (or the first communication device may denote the terminal and the second communication device may denote the base station).

The base station (BS) may be replaced with a term such as a fixed station, a Node B, an evolved-NodeB (eNB), a Next Generation NodeB (gNB), a base transceiver system (BTS), an access point (AP), or a general NB (gNB), a 5G system, a network, an AI system, a road side unit (RSU), robot or the like. In addition, the terminal may be fixed or have mobility, and may be replaced with a term, such as user equipment (UE), a mobile station (MS), a user terminal (UT), a mobile subscriber station (MSS), a subscriber station (SS), an advanced mobile station (AMS), a wireless terminal (WT), a machine-type communication (MTC) device, a machine-to-machine (M2M) device, a device-to-device (D2D) device, a vehicle, a robot, an AI module, or the like.

The first communication apparatus and the second communication apparatus each may include a processor 911, 921, a memory 914, 924, one or more Tx/Rx radio frequency modules 915, 925, a Tx processor 912, 922, an Rx processor 913, 923, and an antenna 916, 926. The processor may implement the aforementioned functions, processes, and/or methods. More specifically, in DL (communication from the first communication apparatus to the second communication apparatus), an upper (high-level) layer packet from a core network may be provided to the processor 911. The processor implements the function of an L2 layer. In DL, the processor may provide multiplexing between a logical channel and a transport channel and radio resource allocation to the second communication apparatus 920, and may be in charge of signaling to the second communication apparatus. The Tx processor 912 may implement various signal processing functions for an L1 layer (i.e., a physical layer). The signal processing function may facilitate forward error correction (FEC) in the second communication apparatus, and include coding and interleaving. The encoded and modulated symbols are divided into parallel streams, and each stream is mapped to an OFDM subcarrier, and multiplexed with a reference signal (RS) in a time and/or frequency domain, and combined together using an Inverse Fast Fourier Transform (IFFT) to create a physical channel carrying a time-domain OFDMA symbol stream. The OFDM stream may be spatially precoded to generate multiple spatial streams. The spatial streams may be provided to different antennas 916 via individual Tx/Rx modules (or transceiver) 915, respectively. The Tx/Rx modules may modulate RF carrier waves into the spatial streams for transmission. The second communication apparatus may receive a signal through the antenna 926 of each Tx/Rx module (or transceiver) 925. Each Tx/Rx module may demodulate information modulated to an RF carrier, and provide it to the RX processor 923. The RX processor may implement various signal processing functions of Layer 1. The RX processor may perform spatial processing with respect to the information in order to recover an arbitrary spatial stream destined for the second communication apparatus. When a plurality of spatial streams are destined for the second communication device, the spatial streams may be combined into a single OFDMA symbol stream by a plurality of RX processors. The RX processor may transform the OFDMA symbol stream from a time domain to a frequency domain by using Fast Fourier Transform (FFT). A frequency domain signal may include an individual OFDMA symbol stream on a subcarrier for each OFDM signal. Symbols on each subcarrier and a reference signal may be recovered and demodulated by determining the most probable signal placement points transmitted by the first communication device. These soft decisions may be based on channel estimate values. The soft decisions may be decoded and deinterleaved to recover data and control signal originally transmitted over the physical channel by the first communication device. The corresponding data and control signal may then be provided to the processor 921.

UL (communication from the second communication apparatus to the first communication apparatus) may be processed in the first communication apparatus 910 in a similar manner to that described with respect to the receiver function in the second communication apparatus 920. The Tx/Rx modules 925 may receive signals via the antennas 926, respectively. The Tx/Rx modules may provide RF carriers and information to the RX processor 923, respectively. The processor 921 may be associated with the memory 924 that stores program codes and data. The memory may be referred to as a computer-readable medium.

Hereinafter, technical effects of an electronic device having a plurality of antennas operating according to the present disclosure will be described.

According to the present disclosure, in an electronic device whose form factor varies, an antenna design space limitation can be overcome.

According to the present disclosure, in a rollable device in which a display rolls to one side, an antenna design space limitation can be overcome.

According to the present disclosure, in a vertical rollable device, a wireless platform design structure including an antenna disposition can be provided.

According to the present disclosure, separated metal rims can be used for implementing a display sliding part, thereby overcoming an antenna design space limitation and securing antenna performance of a predetermined level or higher.

According to the present disclosure, antenna performance at a low band (LB) can be secured even when a rollable device is reduced in size.

According to the present disclosure, antenna performance at a low band (LB) can be improved by elongating a GND current path in a closed state of a relatively small vertical device.

According to the present disclosure, wireless performance deviation can be improved by varying a GND condition of an antenna in an open/closed state.

Further scope of applicability of the present disclosure will become apparent from the following detailed description. It should be understood, however, that the detailed description and specific examples, such as the preferred implementation of the invention, are given by way of illustration only, since various changes and modifications within the spirit and scope of the invention will be apparent to those skilled in the art.

With regard to the present disclosure described above, the design of an antenna including processors 180, 1250, and 1400 and a controller for controlling the same in an electronic device 180 having a plurality of antennas, and a control method thereof may be implemented as codes readable by a computer on a medium written by a program. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor 180 of the terminal. Therefore, the detailed description should not be limitedly construed in all of the aspects, and should be understood to be illustrative. The scope of the invention should be determined by reasonable interpretation of the appended claims and all changes that come within the equivalent scope of the invention are included in the scope of the disclosure.

The invention claimed is:

1. A mobile terminal that changes in size, the mobile terminal comprising:
   a slide metal part including a left side surface, a right side surface, and a bottom side surface defining appearance of the mobile terminal;
   a front metal part including an upper side surface and a front portion defining the appearance of the mobile terminal and coupled to the slide metal part; and
   a coupling link having one end and another end connected to the slide metal part and the front metal part, to couple the slide metal part and the front metal part to each other in a folded state and an unfolded state according to a relative movement between the slide metal part and the front metal part,
   wherein a plurality of antennas are disposed on the left side surface, the right side surface, and the bottom side surface of the slide metal part, and
   at least one side surface of the slide metal part is connected to a printed circuit board (PCB) received in the slide metal part at a plurality of ground contact points, to reduce a difference in lengths of ground paths according to the relative movement so as to decrease a change in antenna performance of the plurality of antennas according to the relative movement,
   wherein a spring contact part is disposed on the front portion of the front metal part to electrically connect the slide metal part and the front metal part in a spring contact manner, and
   a contact point where the spring contact part is in contact with the slide metal part is higher than the plurality of ground contact points as the slide metal part moves in a downward direction.

2. The mobile terminal of claim 1, wherein
   a first contact point where the spring contact part is in contact with the slide metal part is a point located between the plurality of ground contact points in a first state in which a display region is expanded.

3. The mobile terminal of claim 2, wherein the slide metal part comprises:
   a first metal housing having the left side surface and the right side surface defining the appearance of the mobile terminal; and
   a second metal housing having the left lateral side surface, the right lateral side surface, and the bottom side surface defining the appearance—a first conductive member and a second conductive member of the second metal housing each including a first sub member disposed on the bottom side surface and a second sub member disposed on the left or right lateral side surface.

4. The mobile terminal of claim 3, further comprising:
   a first printed circuit board (PCB) having a wireless communication unit;
   a second PCB electrically connected to the first PCB and received in one side surface of the slide metal part;
   a third PCB electrically connected to the second PCB and received in another side surface of the slide metal part; and a display having a first region that is exposed to a front surface in a retracted state of the mobile terminal, and a second region that is an expanded region exposed to the front surface in an expanded state of the mobile terminal.

5. The mobile terminal of claim 4, wherein the first conductive member operates as a first antenna through a feed portion, and is connected to a ground at a first point through the second PCB and a switch,
the second conductive member operates as a second antenna through a second feed portion, and
the mobile terminal further comprises a third conductive member disposed between the first conductive member and the second conductive member with being spaced by slits.

6. The mobile terminal of claim 5, further comprising a fourth conductive member disposed on the left side surface of the first metal housing, and a fifth conductive member disposed on the right side surface,
wherein the fourth conductive member and the fifth conductive member operate as a third antenna and a fourth antenna, respectively, and
the fourth conductive member is connected to a ground at a second point through the second PCB and a second switch.

7. The mobile terminal of claim 6, further comprising a processor operably coupled to the wireless communication unit, and configured to determine whether the mobile terminal is in a first or second state in which the display region is retracted or expanded according to the relative movement, and
the processor, in the first state, controls the switch such that the slide metal part is not electrically connected to the front metal part at the first point through the second PCB, and
controls the second switch such that the slide metal part is electrically connected to the front metal part at the second point through the second PCB.

8. The mobile terminal of claim 7, wherein the length of the ground path, in the first state, is determined as a sum of a first length from a first contact point by the spring contact part in the first state to one point of the upper side surface of the front metal part and a second length from the second point to the first contact point.

9. The mobile terminal of claim 8, further comprising a processor operably coupled to the wireless communication unit, and configured to determine whether the mobile terminal is in a first or second state in which the display region is retracted or expanded according to the relative movement, and
the processor, in the second state, controls the switch such that the slide metal part is electrically connected to the front metal part at the first point through the second PCB, and
controls the switch such that the slide metal part is electrically connected to the front metal part at the second point through the second PCB.

10. The mobile terminal of claim 9, wherein the length of the ground path, in the second state, is determined as a sum of a first length from a second contact point by the spring contact part in the second state to one point of the upper side surface of the front metal part and a third length from the first point to the second contact point, and
the second point is disposed between a first contact point by the spring contact part in the first state and the second contact point by the spring contact part in the second state, such that a difference between the second length and the third length is less than a threshold value.

11. The mobile terminal of claim 9, wherein the fourth conductive member is further connected to a ground at a third point through the second PCB and a third switch, and
the processor, in the first state, controls the third switch such that the slide metal part is not electrically connected to the front metal part at the third point through the second PCB.

12. The mobile terminal of claim 9, wherein the fourth conductive member is further connected to a ground at a third point through the second PCB and a third switch, and
the processor, in the second state, controls the switch, the second switch, and the third switch such that the slide metal part is electrically connected to the front metal part through the second PCB at the first point, the second point, and the third point.

13. The mobile terminal of claim 11, wherein a ground of the second PCB is electrically connected to a first connection portion at the second point through a signal line, and
electrically connected to a second connection port and a third connection portion through an SPDT switch and a matching circuit at the first point and the third point, respectively, and
the processor, in the first state, controls the SPDT switch to be connected to the second connection port and the third connection portion at the first point and the third point through a first inductor of the matching circuit, such that the matching circuit operates as an open circuit at an operating band of the first antenna and as a short circuit at DC.

14. The mobile terminal of claim 11, wherein a ground of the second PCB is electrically connected to a first connection portion at the second point through a signal line, and
electrically connected to a second connection port and a third connection portion through an SPDT switch and a matching circuit at the first point and the third point, respectively, and
the processor, in the second state, controls the SPDT switch to be connected to the second connection port and the third connection portion at the first point and the third point through a second inductor of the matching circuit, such that the matching circuit operates as a short circuit at an operating band of the first antenna and at DC.

15. The mobile terminal of claim 11, wherein a ground of the second PCB is electrically connected to a first connection portion at the second point through a signal line, and
electrically connected to a second connection port and a third connection portion through an SP4T switch and a matching circuit at the first point and the third point, respectively, and
the processor, in the first state, controls the SP4T switch to be connected to the second connection port and the third connection portion at the first point and the third point through a first inductor of the matching circuit, such that the inductor operates as an open circuit at an operating band of the first antenna and as a short circuit at DC.

16. The mobile terminal of claim 11, wherein a ground of the second PCB is electrically connected to a first connection portion at the second point through a signal line, and
electrically connected to a second connection port and a third connection portion through an SP4T switch and a matching circuit at the first point and the third point, respectively, and the processor, in the second state, controls the SP4T switch to be connected to the second connection port and the third connection portion at the first point and the third point through a second inductor of the matching circuit, such that the second inductor operates as a short circuit at an operating band of the first antenna and at DC.

17. The mobile terminal of claim 13, wherein the ground of the second PCB is electrically connected to a first connection portion at the second point through a switch and a first matching circuit, and the processor controls the first matching circuit according to the operating band of the first antenna when the ground of the second PCB is connected to the first connection portion at the second point through the switch.

18. The mobile terminal of claim 16, wherein a ground of the second PCB is electrically connected to a first connection portion at the second point through a first matching circuit, is electrically connected to a second connection portion at the third point through an inductor, and is electrically connected to a third connection portion at the first point through an SPDT switch and a third matching circuit.

19. The mobile terminal of claim 18, wherein the processor, in the first state, controls the SPDT switch such that the ground of the second PCB is electrically connected to the third connection portion at the first point through a first inductor of the third matching circuit, such that the third matching circuit operates as an open circuit at an operating band of the first antenna and as a short circuit at DC.

20. The mobile terminal of claim 18, wherein the processor, in the second state, controls the SPDT switch such that the ground of the second PCB is electrically connected to the third connection portion at the first point through a second inductor of the third matching circuit, such that the third matching circuit operates as a short circuit at an operating band of the first antenna and at DC.

* * * * *